Nov. 11, 1958 H. F. WELSH ET AL 2,860,325
INFORMATION TRANSLATING APPARATUS
Filed March 31, 1952 30 Sheets-Sheet 1

INVENTORS
HERBERT F. WELSH
JOHN P. ECKERT, JR.
EDWIN I. BLUMENTHAL
BY
ATTORNEY

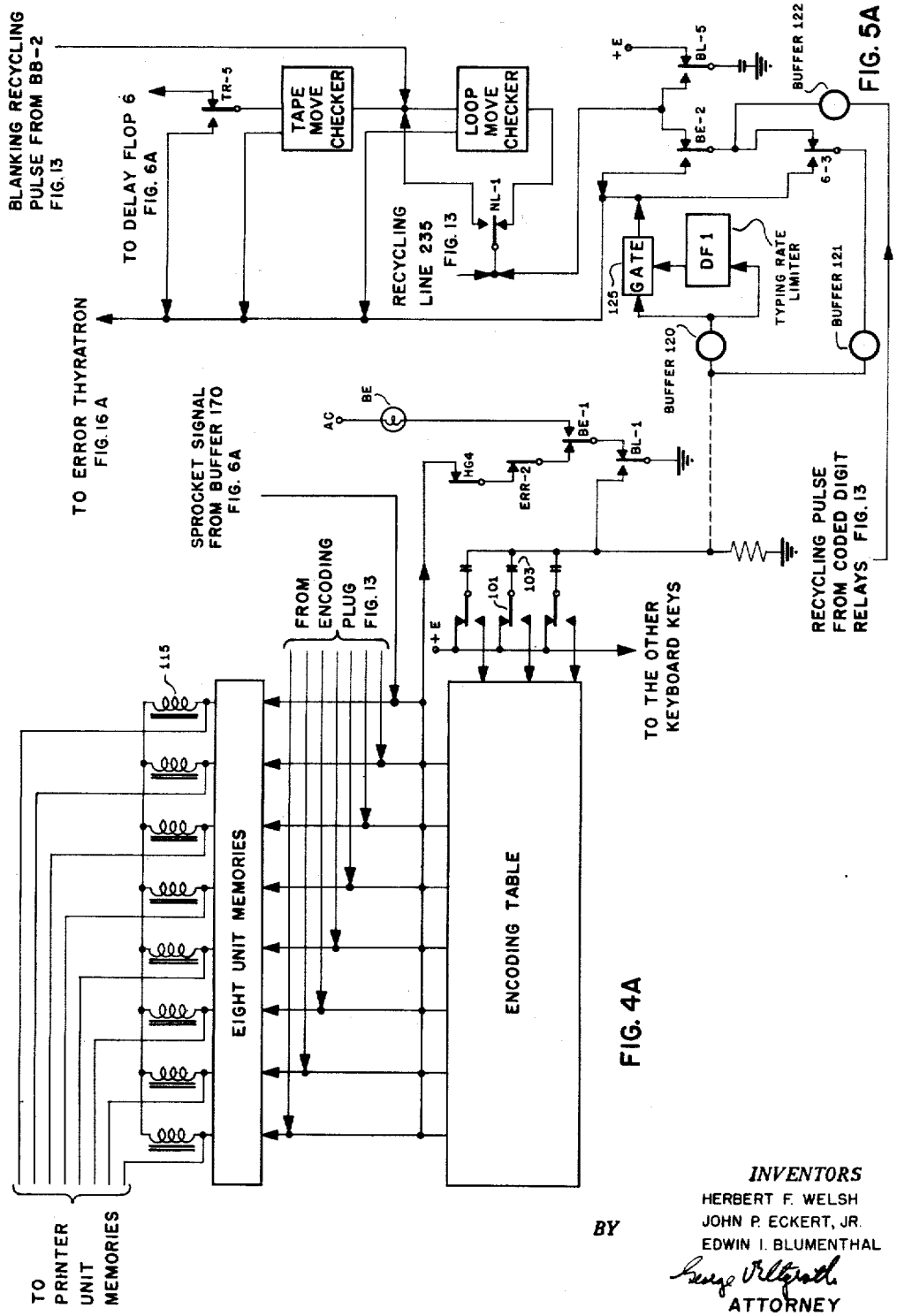

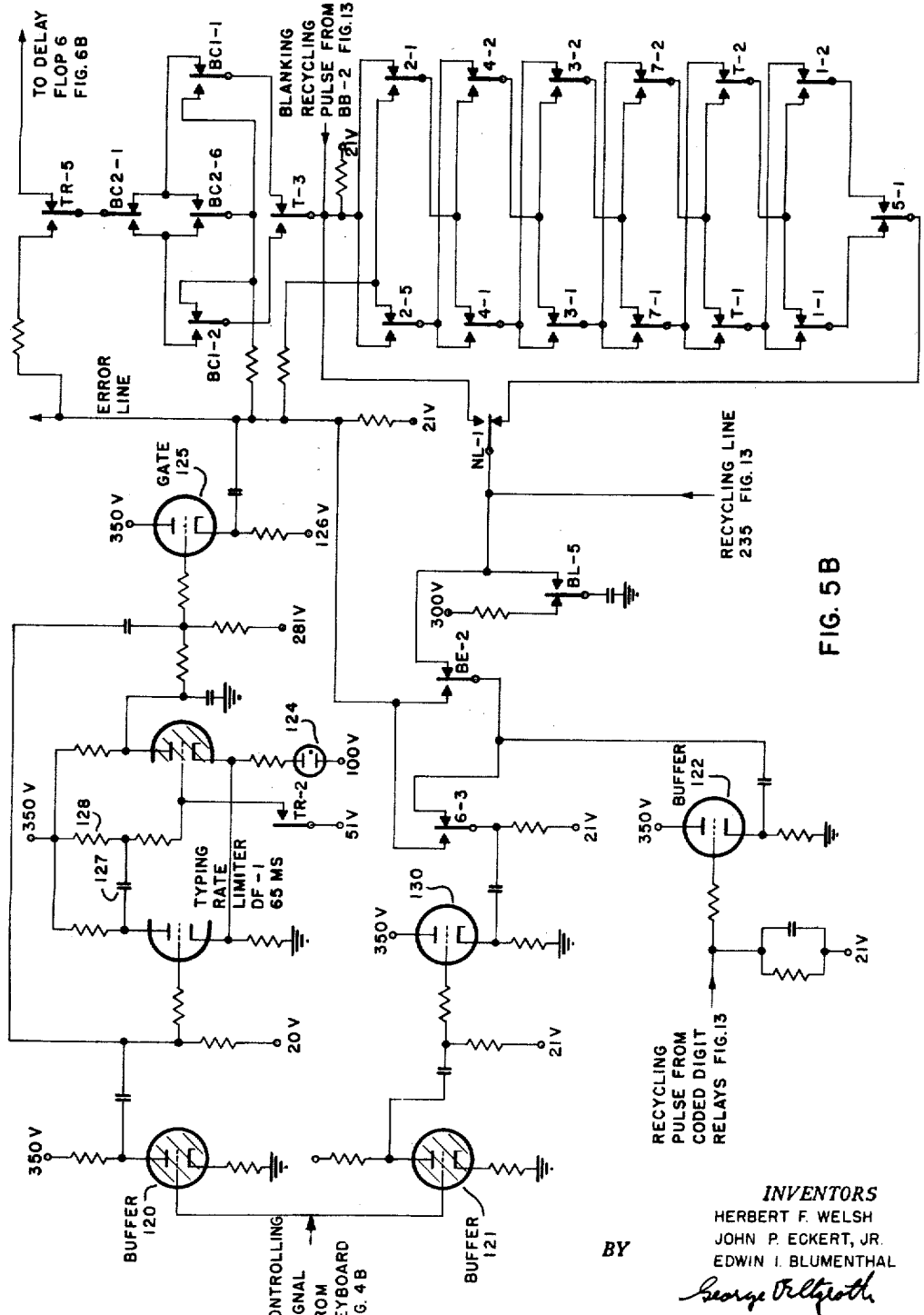

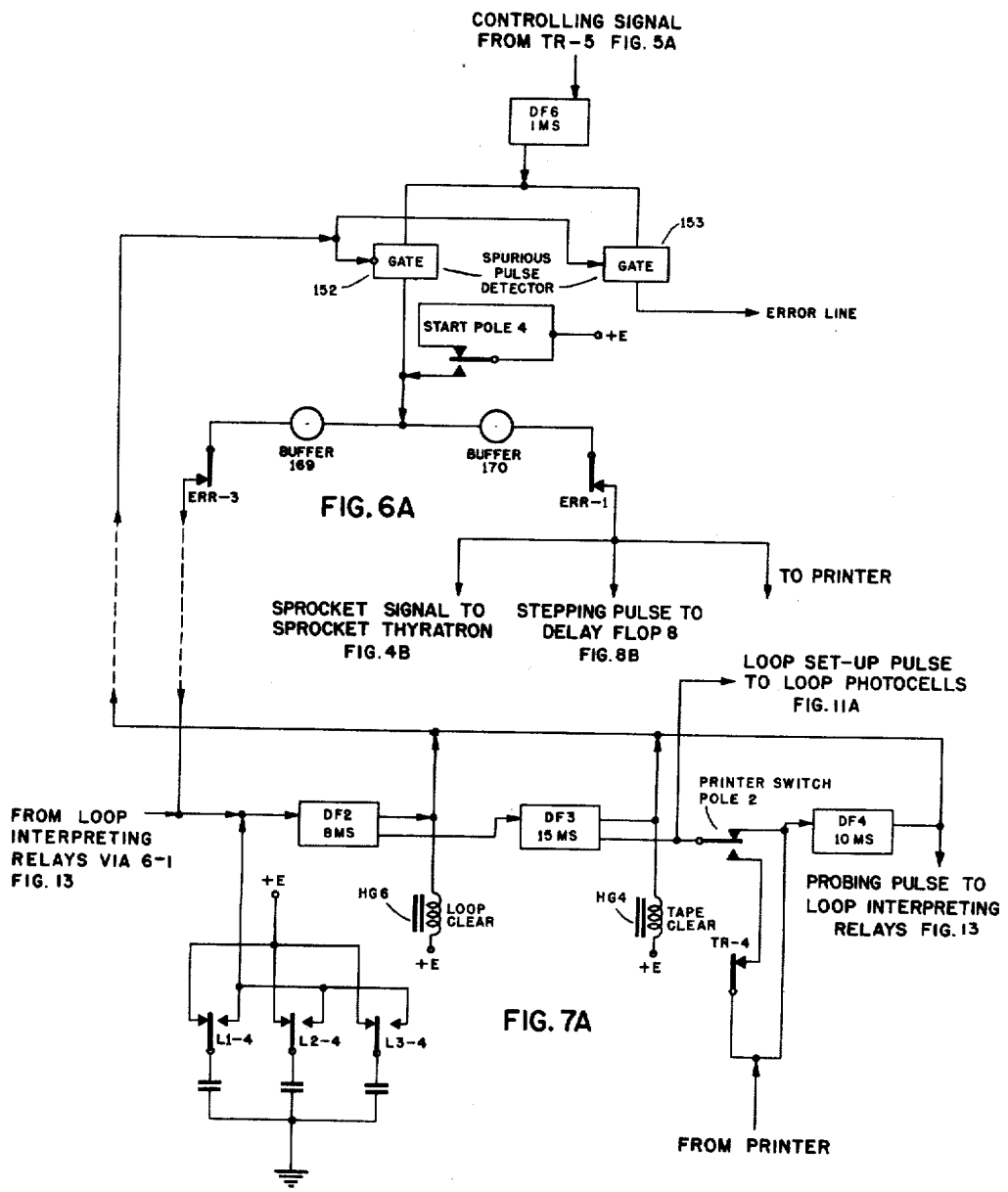

INVENTORS
HERBERT F. WELSH
JOHN P. ECKERT, JR.
EDWIN I. BLUMENTHAL

BY

ATTORNEY

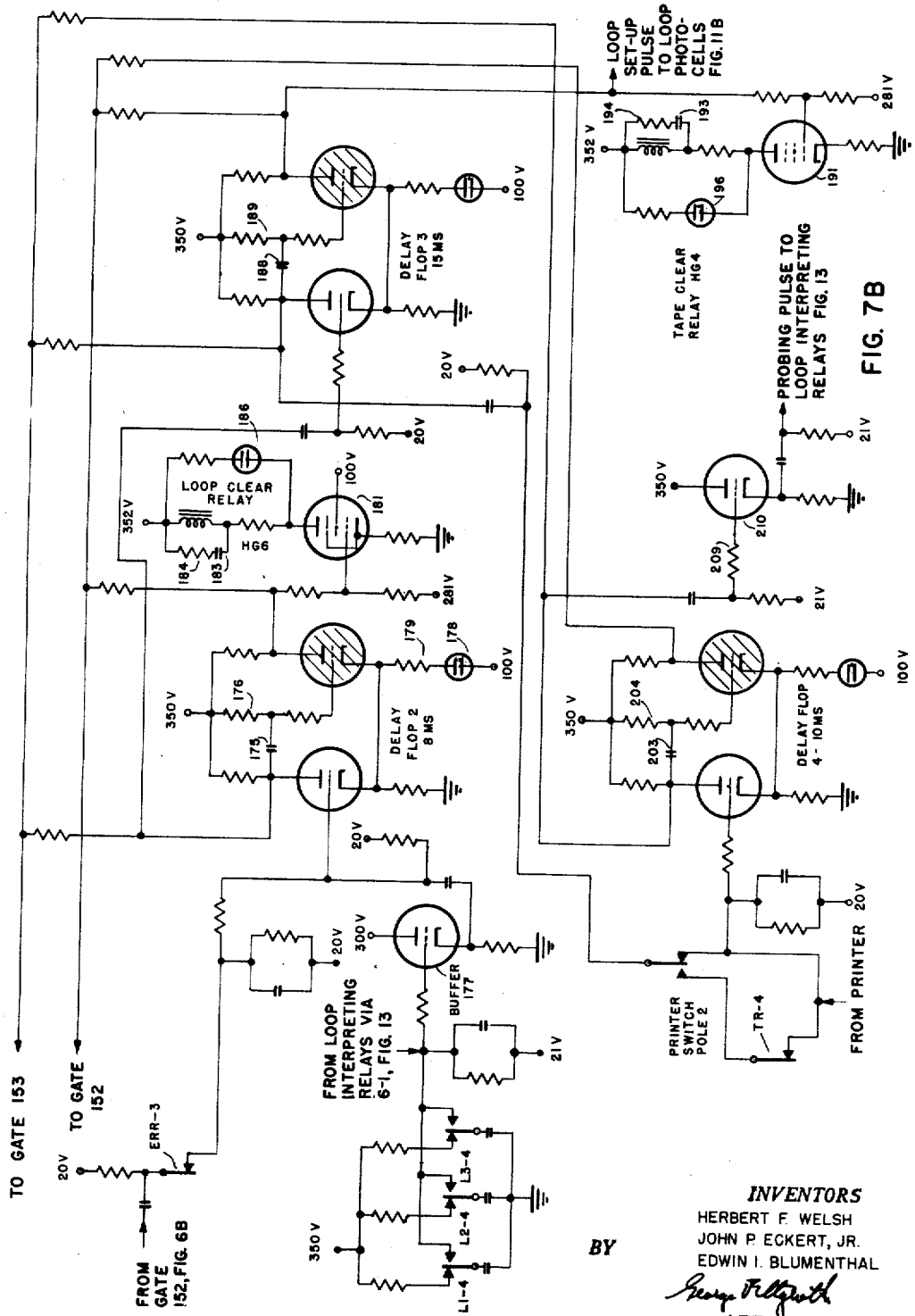

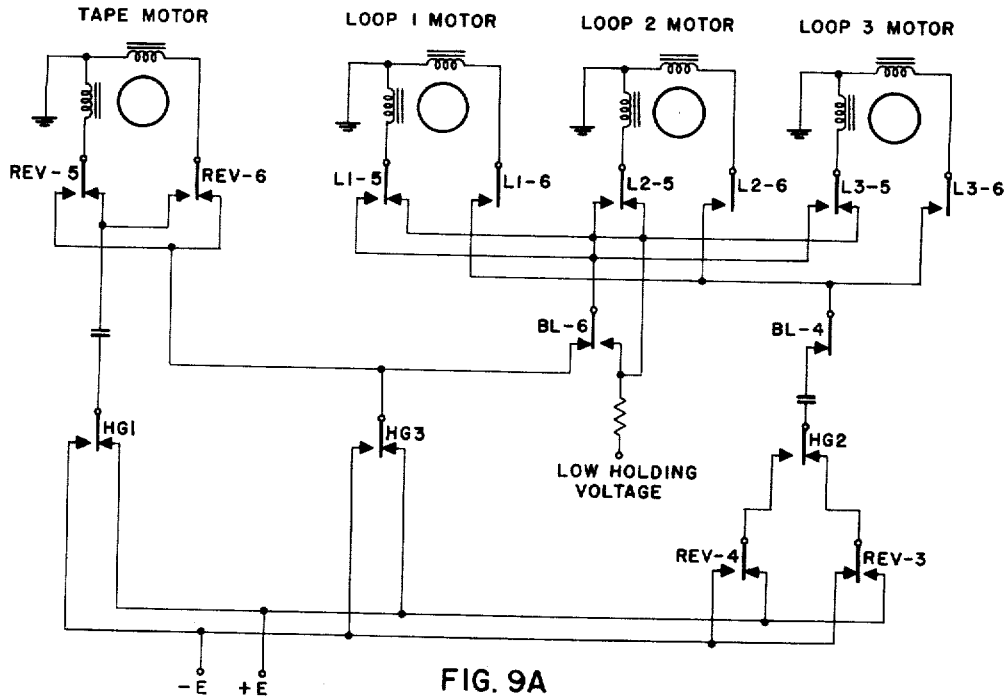
FIG. 9A
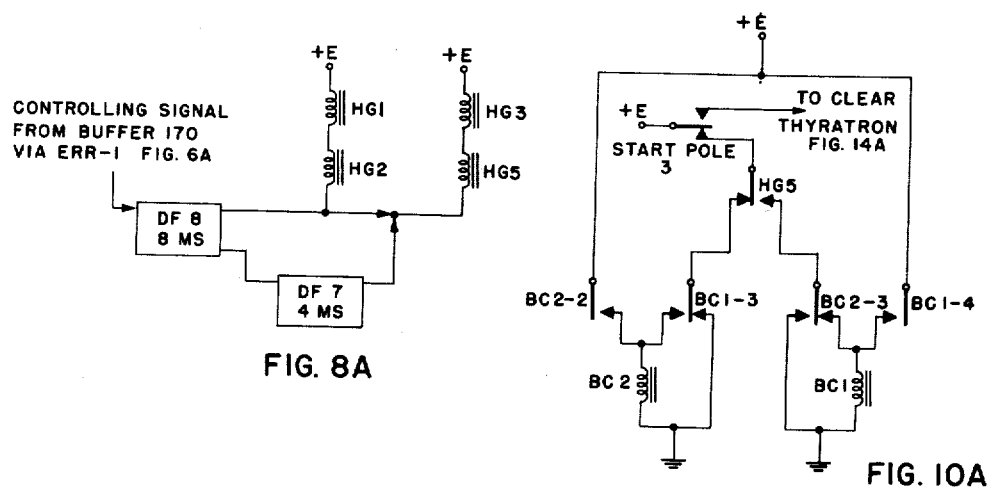
FIG. 8A
FIG. 10A
INVENTORS
HERBERT F. WELSH
JOHN P. ECKERT, JR.
EDWIN I. BLUMENTHAL
BY
*George Villaroth*
ATTORNEY

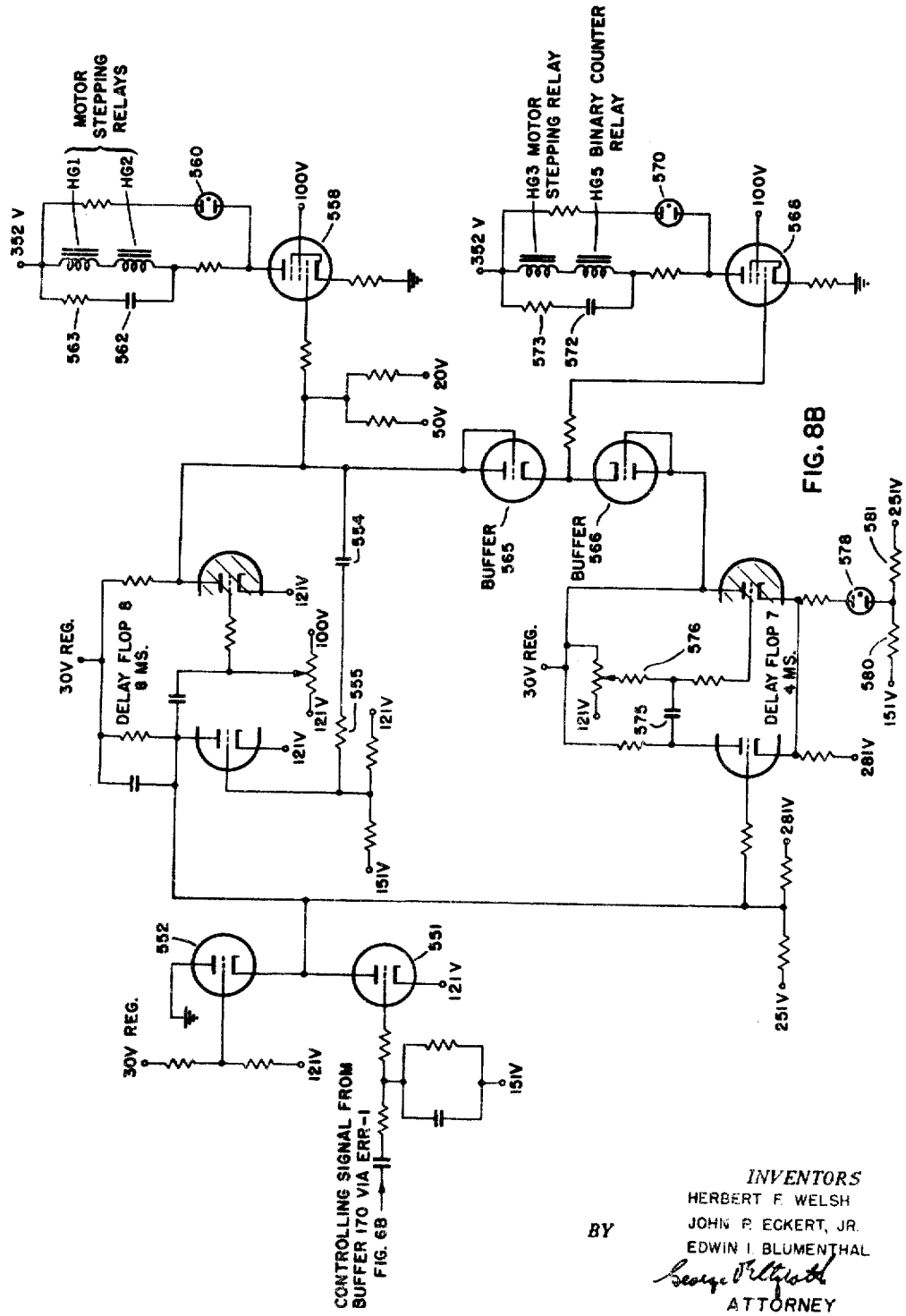

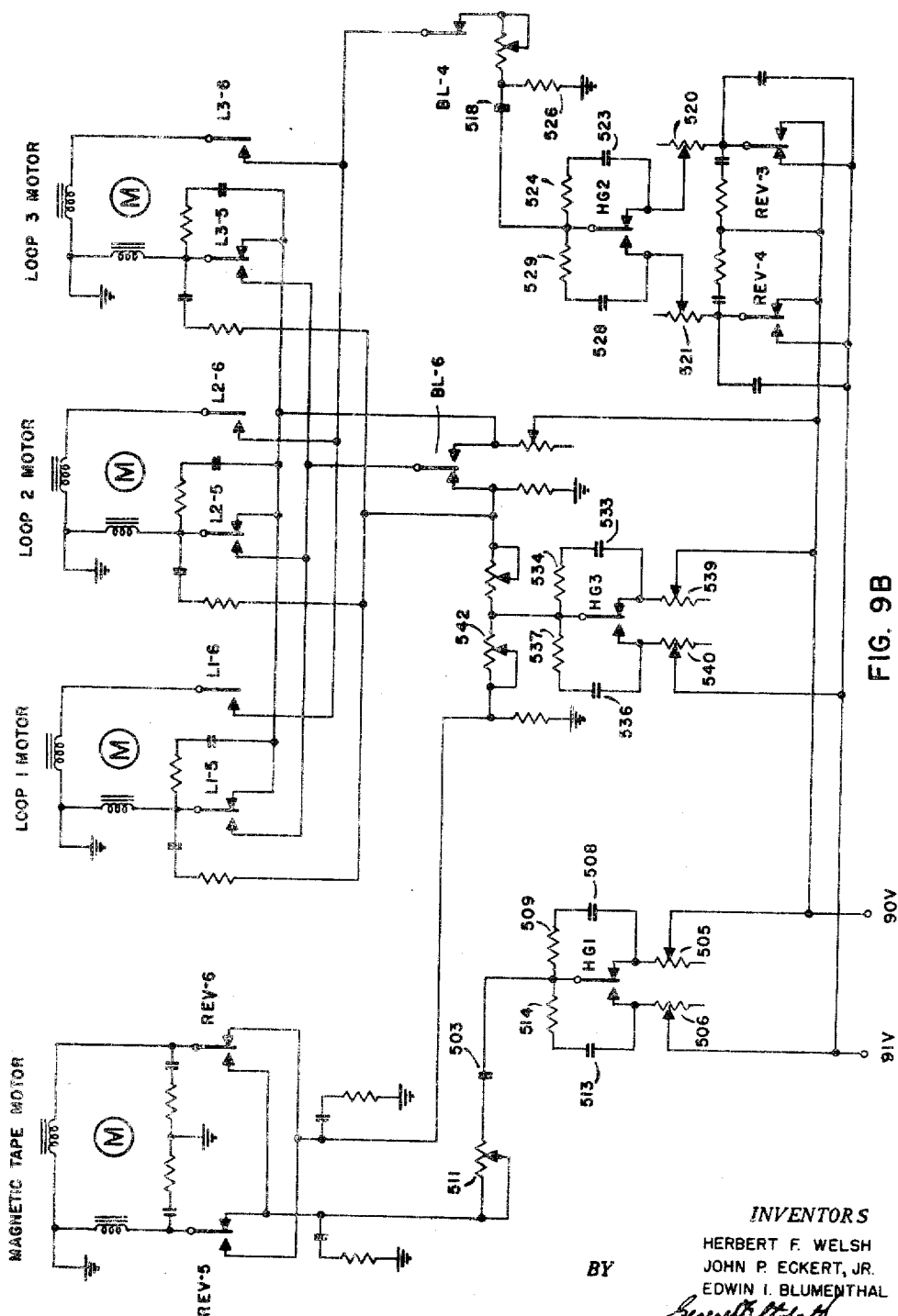

INVENTORS
HERBERT F. WELSH
JOHN P. ECKERT, JR
EDWIN I. BLUMENTHAL
BY
ATTORNEY

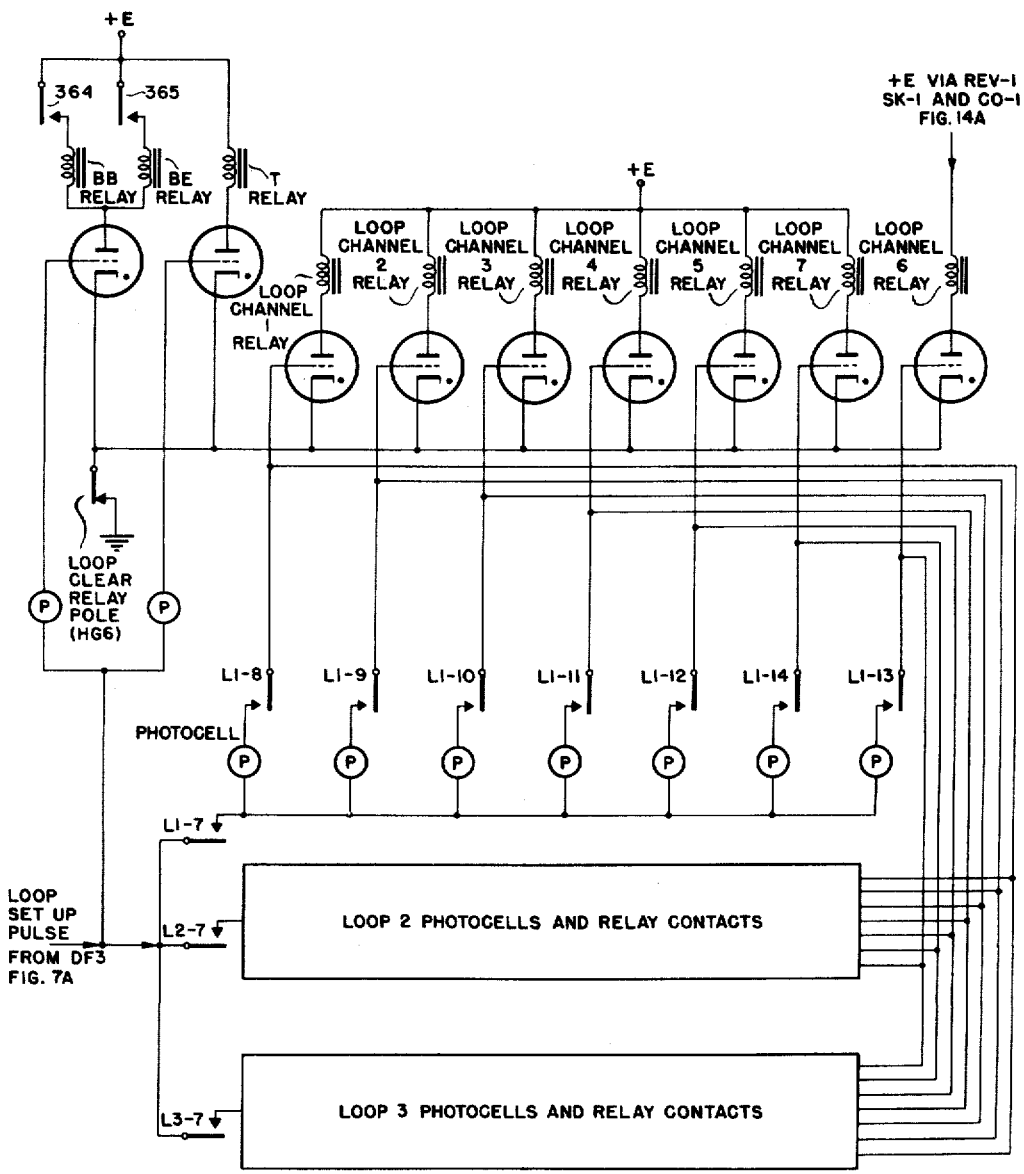
FIG. IIA

Nov. 11, 1958     H. F. WELSH ET AL     2,860,325
INFORMATION TRANSLATING APPARATUS

Filed March 31, 1952     30 Sheets-Sheet 14

FIG. 11B

INVENTORS
HERBERT F. WELSH
JOHN P. ECKERT, JR.
EDWIN I. BLUMENTHAL
BY
ATTORNEY

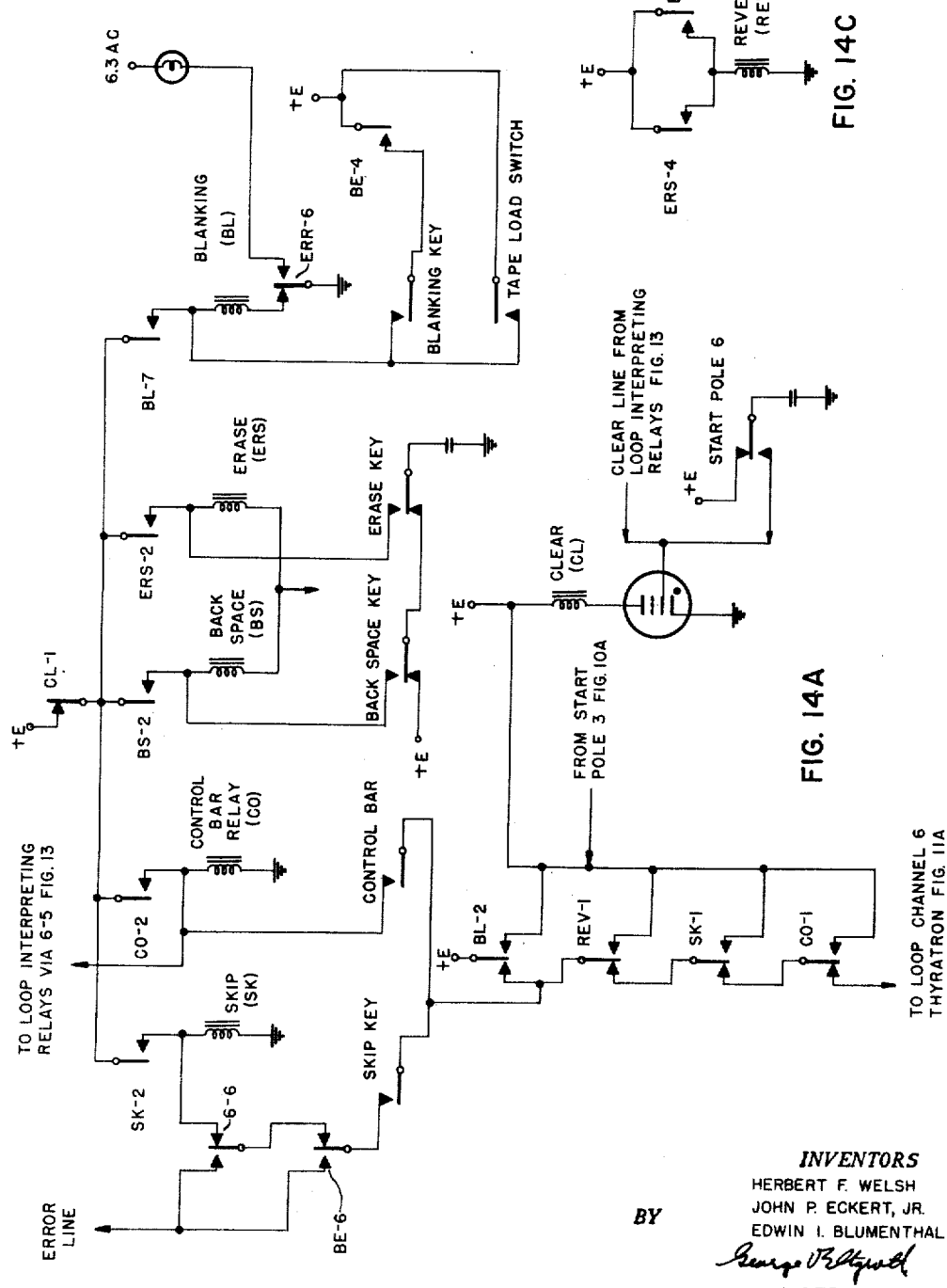

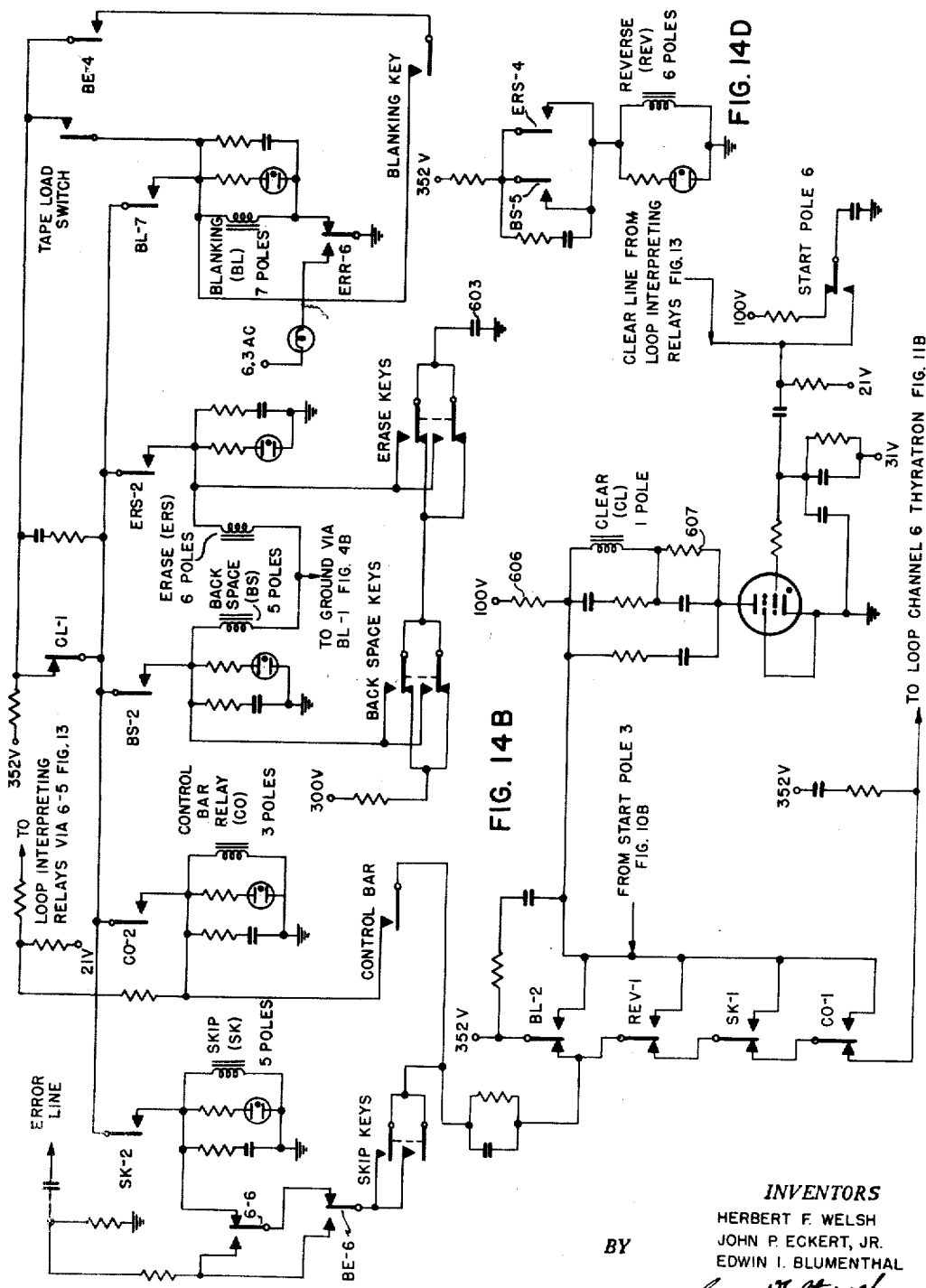

*INVENTORS*
HERBERT F. WELSH
JOHN P. ECKERT, JR.
EDWIN I. BLUMENTHAL

BY

*ATTORNEY*

Nov. 11, 1958  H. F. WELSH ET AL  2,860,325
INFORMATION TRANSLATING APPARATUS
Filed March 31, 1952  30 Sheets-Sheet 20

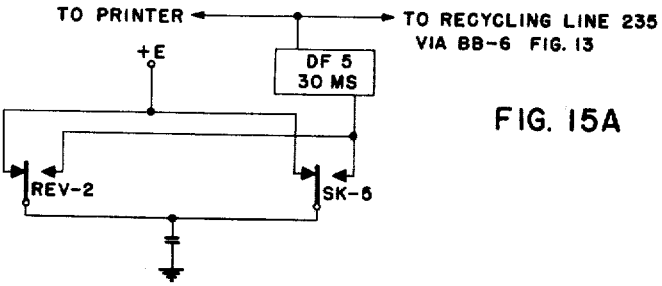

FIG. 15A

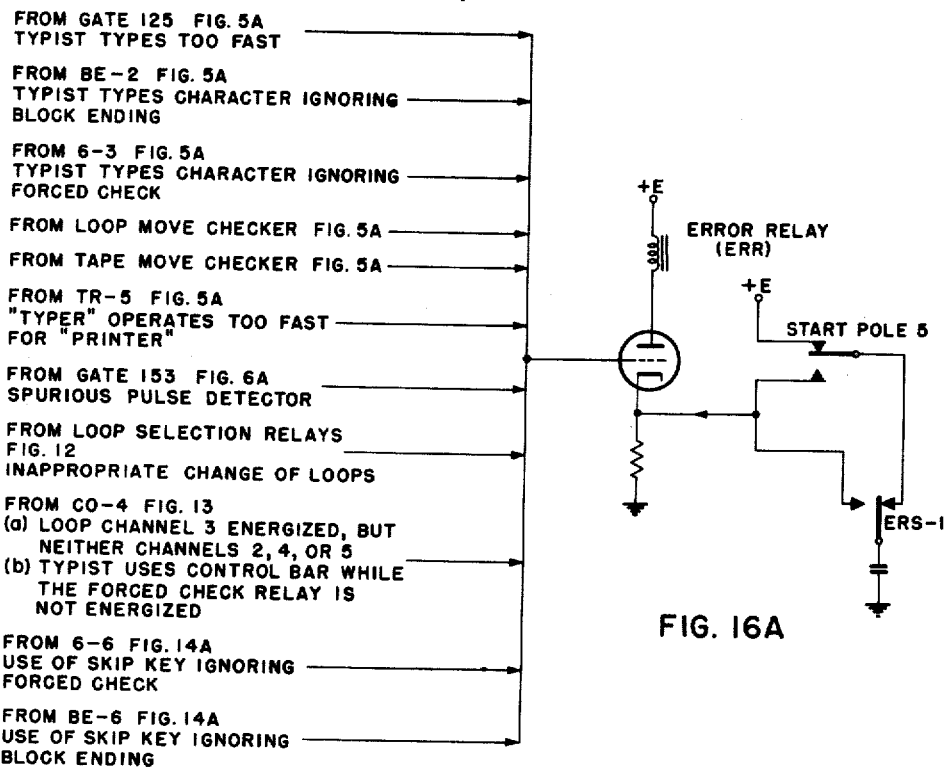

FIG. 16A

FROM GATE 125 FIG. 5A
TYPIST TYPES TOO FAST

FROM BE-2 FIG. 5A
TYPIST TYPES CHARACTER IGNORING
BLOCK ENDING

FROM 6-3 FIG. 5A
TYPIST TYPES CHARACTER IGNORING
FORCED CHECK

FROM LOOP MOVE CHECKER FIG. 5A

FROM TAPE MOVE CHECKER FIG. 5A

FROM TR-5 FIG. 5A
"TYPER" OPERATES TOO FAST
FOR "PRINTER"

FROM GATE 153 FIG. 6A
SPURIOUS PULSE DETECTOR

FROM LOOP SELECTION RELAYS
FIG. 12
INAPPROPRIATE CHANGE OF LOOPS

FROM CO-4 FIG. 13
(a) LOOP CHANNEL 3 ENERGIZED, BUT
    NEITHER CHANNELS 2, 4, OR 5
(b) TYPIST USES CONTROL BAR WHILE
    THE FORCED CHECK RELAY IS
    NOT ENERGIZED

FROM 6-6 FIG. 14A
USE OF SKIP KEY IGNORING
FORCED CHECK

FROM BE-6 FIG. 14A
USE OF SKIP KEY IGNORING
BLOCK ENDING

INVENTORS
HERBERT F. WELSH
BY  JOHN P. ECKERT, JR.
EDWIN I. BLUMENTHAL
ATTORNEY

Nov. 11, 1958    H. F. WELSH ET AL    2,860,325
INFORMATION TRANSLATING APPARATUS
Filed March 31, 1952    30 Sheets-Sheet 21

INVENTORS
HERBERT F. WELSH
JOHN P. ECKERT
EDWIN I. BLUMENTHAL
BY
ATTORNEY

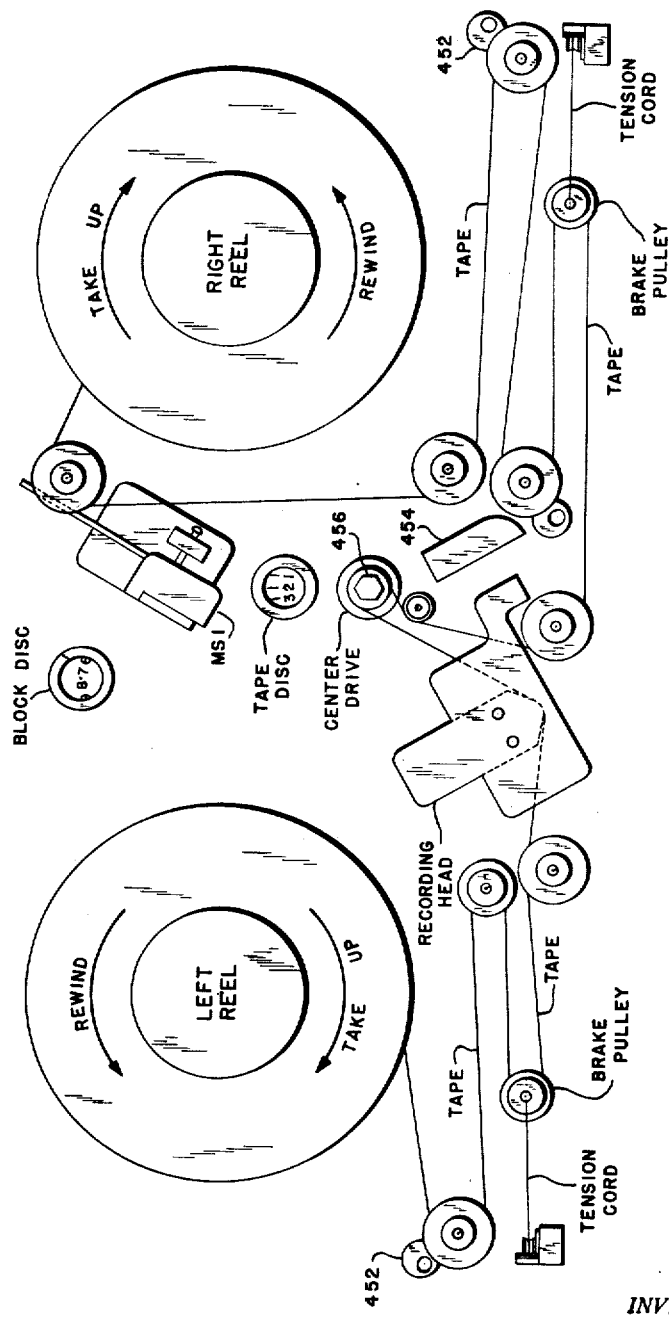

INVENTORS
HERBERT F. WELSH
JOHN P. ECKERT, JR.
EDWIN I. BLUMENTHAL
ATTORNEY

United States Patent Office

2,860,325
Patented Nov. 11, 1958

2,860,325

INFORMATION TRANSLATING APPARATUS

Herbert F. Welsh, Philadelphia, John Presper Eckert, Jr., Gladwyne, and Edwin I. Blumenthal, Philadelphia, Pa., assignors to Sperry Rand Corporation, New York, N. Y., a corporation of Delaware Application March 31, 1952, Serial No. 279,712

32 Claims. (Cl. 340—347)

This invention relates generally to the recording and storing of coded information for use in electrical typewriter systems, electrical computer systems and the like, and more particularly to the input of such information into any of these systems, and to the use of partly or fully automatic controlling, filling-in and erasing devices which permit only such recordings to be made as are in accordance with the programming of the operation.

There have been a number of high speed electronic computers and input devices connected thereto having the property of being able to carry out an arbitrary sequence of controlling instructions and further capable of modifying those instructions in accordance with conditions encountered in performance of the various operations. While the computers of this type and the input devices connected thereto so far produced have represented considerable improvements in speed of performance over existing apparatus, yet they required unduly large aggregates of apparatus and they were further not adapted for ready and convenient changeover from problem to problem. A further disadvantage of the prior art devices has arisen from the limited speed with which data may be introduced into them.

Many of the prior art devices, if not all, have employed what may be characterized as "parallel" approach to computation in which individual apparatus capable of performing mathematical operations is provided within the computer to handle the information present in each digit space. When handling numerical problems, the difficulties of detecting errors in such a system are very considerable because of the possibility that the apparatus associated with the least significant digit may be giving rise to intermittent constant errors, which are troublesome because they are not immediately obvious. In addition, the prior art apparatus, although possessed of great operating power, did not have controlling systems of a power comparable to their improved operating qualities. In addition, such apparatus have employed to the greatest extent the mechanical manipulation of leads, connectors, plug boards and the like for modifying the apparatus to accept differing problems.

When electronic representation is employed, however, advantage may be taken of the tremendous operating speeds attainable therewith, and the apparatus disclosed herein realizes these advantages by imparting quantitative significance to separate entries by spacing them in time rather than employing separate circuits for handling them. In this way, only a single set of information processing apparatus is required to handle any group entry, no matter how many individual elements or digits may be present in the group entry. Time has quantitative significance within the device, that is, the various pulse times have different numerical significance, the earliest pulses corresponding to least significant digits while the later occurring pulses in a combination represent the more significant digits.

In addition to placing numerical quantities in time they are expressed in values of the binary system. The numerals of the binary system are also used as the constituents of a code for which the attached representative code gives an example.

The present invention discloses a novel information translating apparatus for electronically transcribing keyboard information to magnetic recording. It comprises a novel system for not only automatically controlling such transcription, but also for supplementing or suppressing the transcription of keyboard information, parts of which are fully automatic while other parts are automatic only at the option of the operator.

It is, therefore, an object of this invention to provide an apparatus for electronically transcribing keyboard information to magnetic recording including partly or fully automatic devices which control, supplement or suppress such transcription of keyboard information.

It is another object to provide a system of the foregoing type wherein a control pulse successively activates a plurality of devices which automatically control the operation of said apparatus.

It is another object of the invention to provide a blanking system which automatically subdivides the recording into blocks of standard length.

Still another object of the invention is to provide a control loop system which automatically supervises the recording and the spacing of the information in accordance with the programming of the operations.

It is a further object of the invention to synchronize the recording operations both with the motion of the magnetic tape and the motion of a control loop.

A further object of the invention is to provide a number of controlling relays which route the controlling signal in accordance with the programming of the operations.

It is another object of the invention to provide for partly or fully automatic recordings and, to that end, for automatically recycling pulses.

Still another object of the invention is to provide various error detectors to detect typist's errors except wrong characters which actuate an error circuit to stop the recording operations, notify the typist and prevent further typing from being effective.

A further object of the invention is to provide an erase circuit which steps the device backward, erases the current section from the tape and clears the error circuit for the resumption of operations.

Still another object of the invention is to provide an automatic brake and pulley control system which operates in connection with a reel motor circuit.

It is a further object of the invention to arrange the operation of the individual circuits in adequate time sequences.

Other objects of the invention will in part be described and in part be obvious when the following specification is read in conjunction with the drawings in which.

Figure 3:
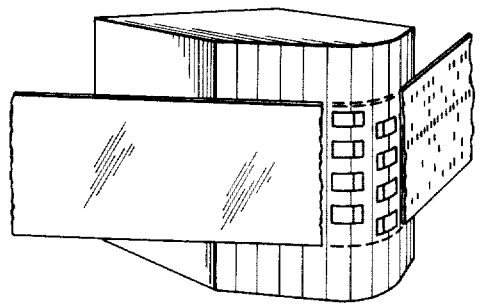
Figure 4B:
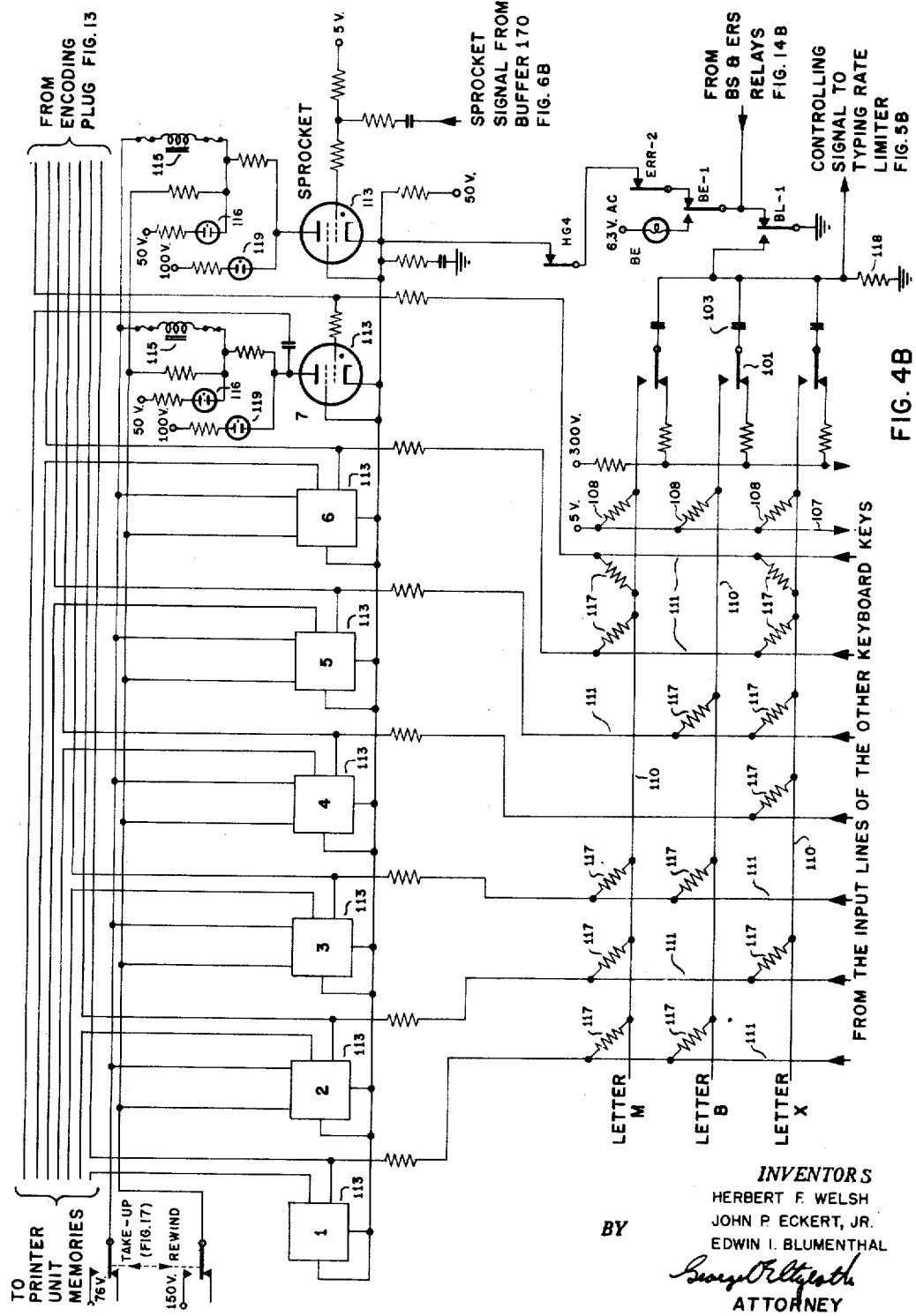
Figure 6B:
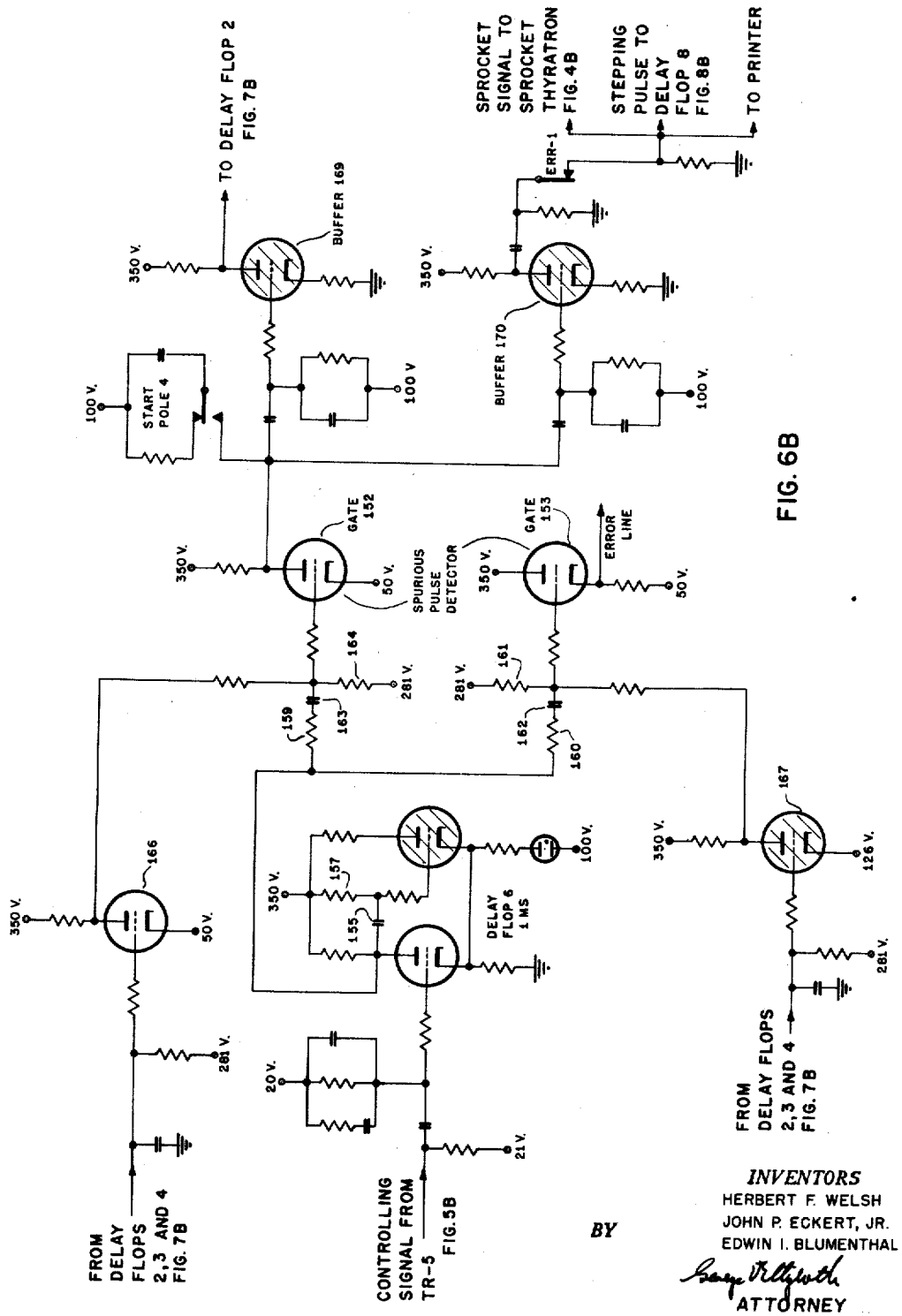
Figure 10B:
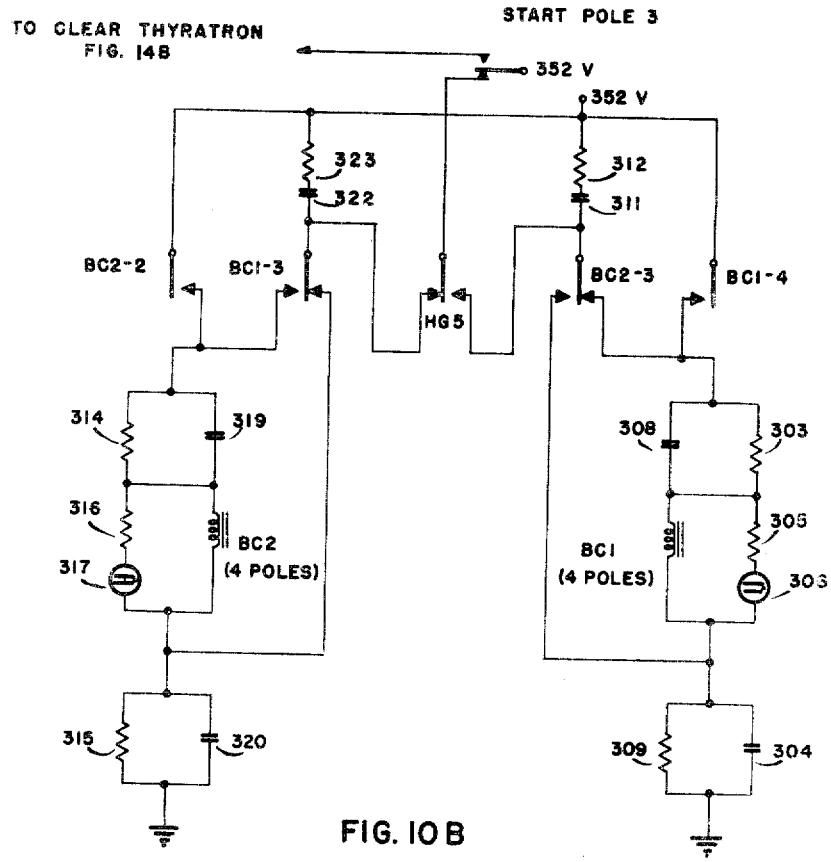
Figure 10C:
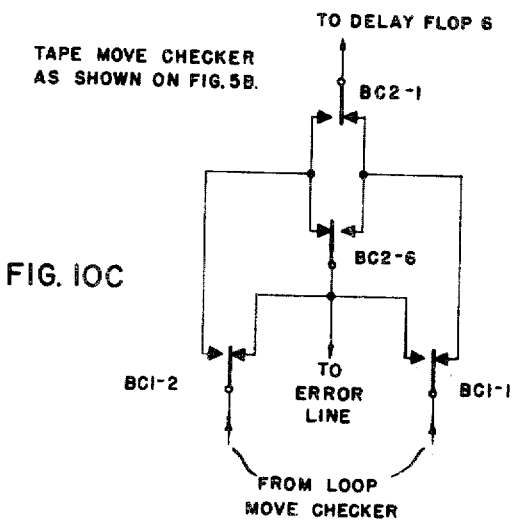
Figure 12:
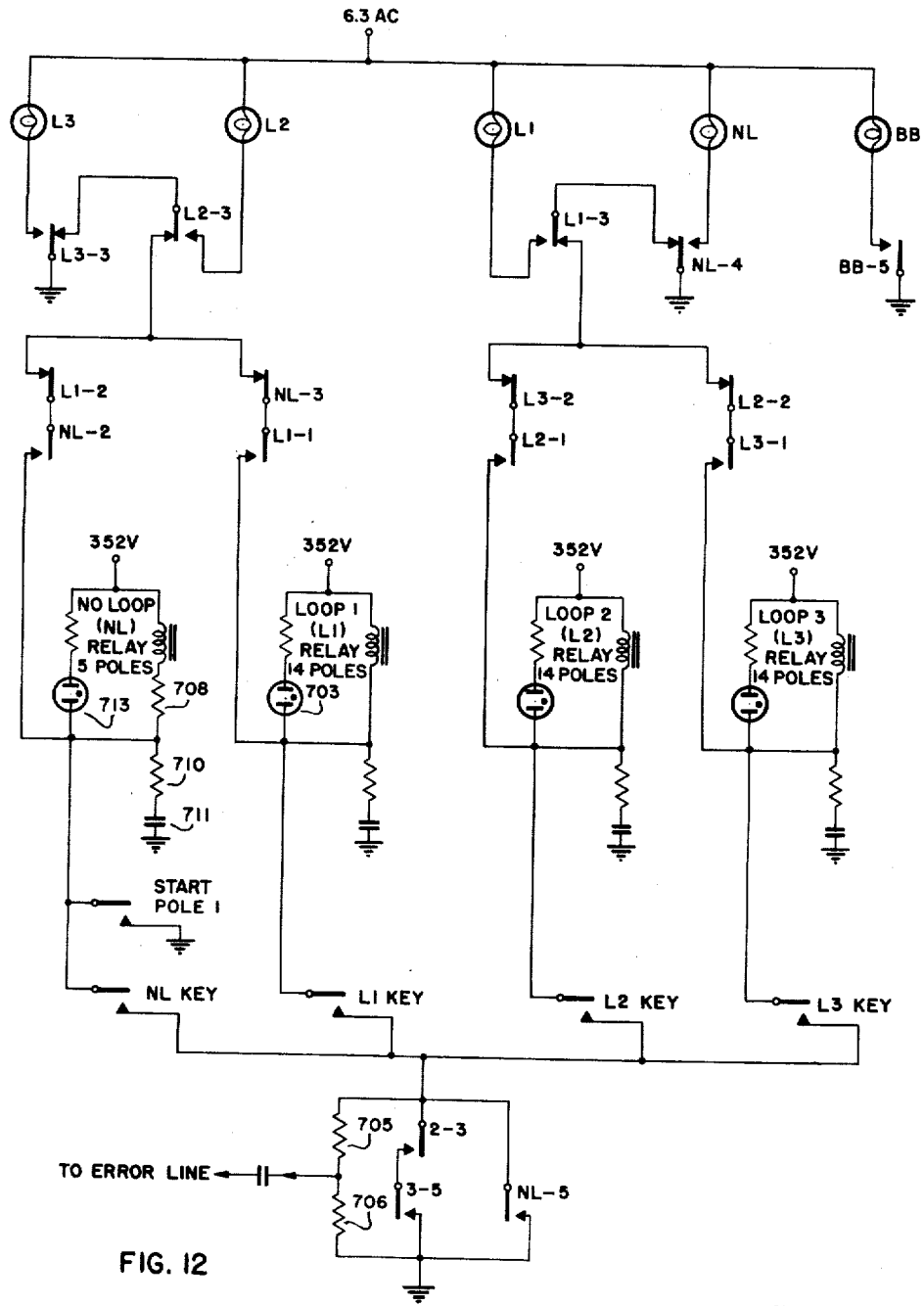
Figure 13:
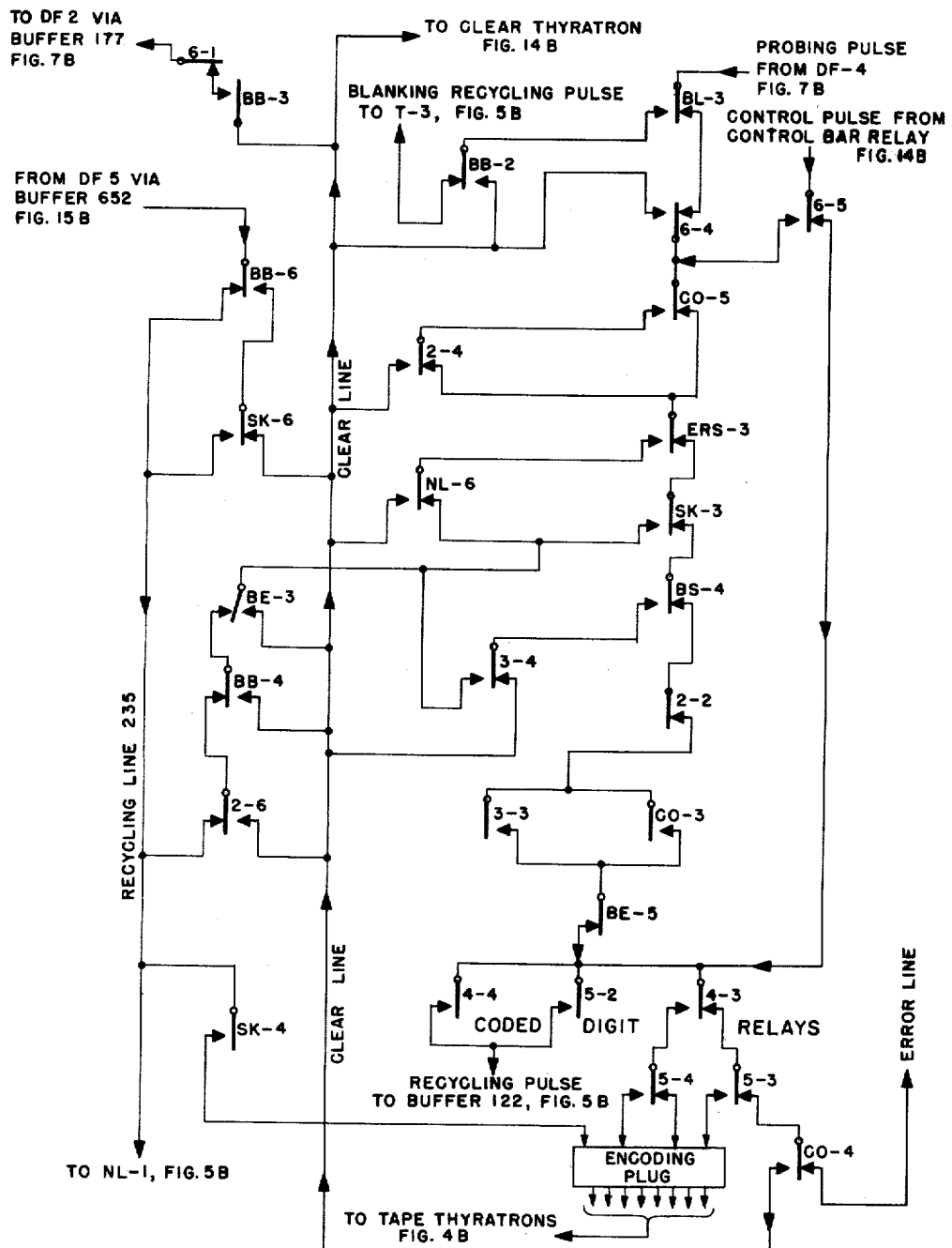
Figures 15B, 16B:
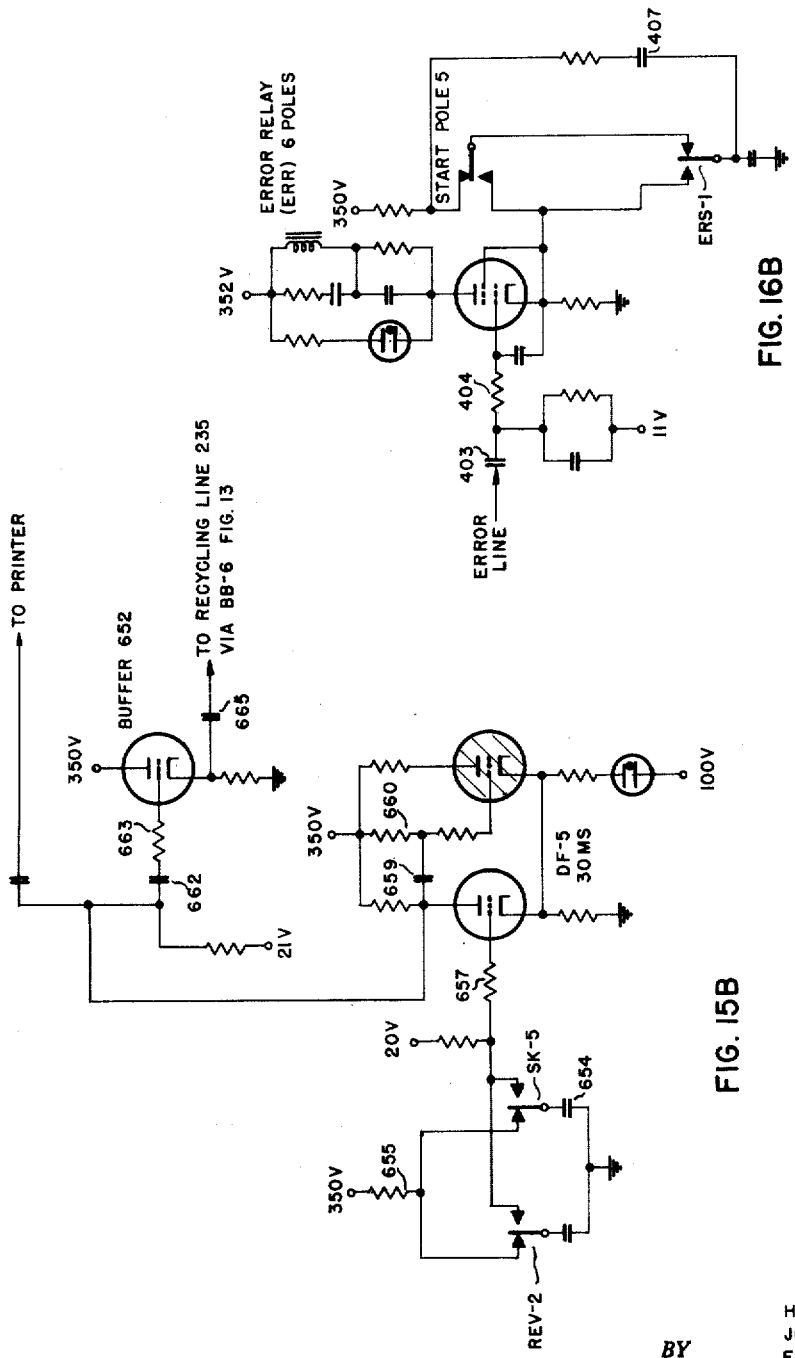
Figure 17:
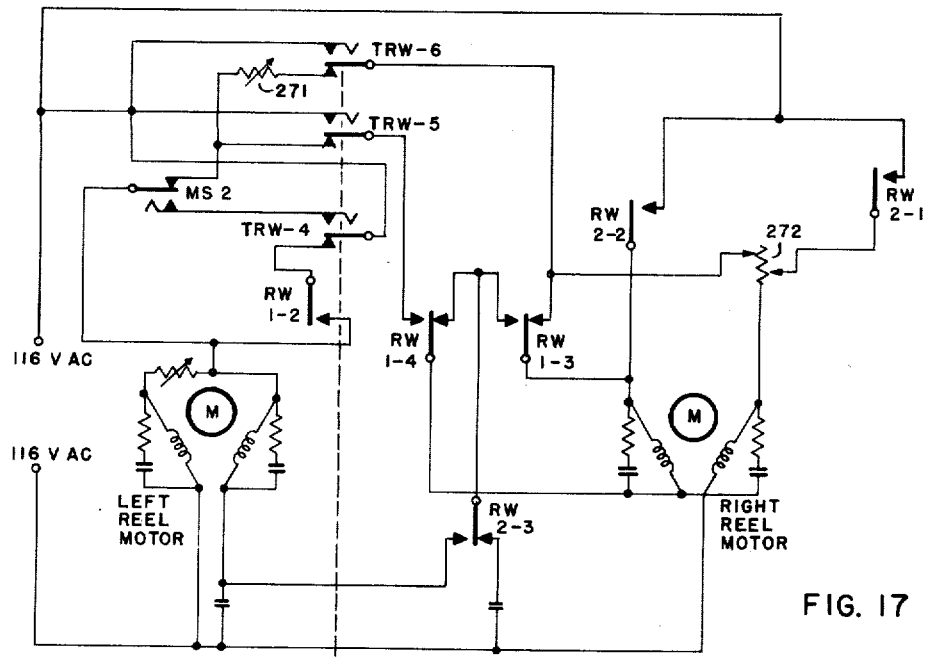
Figure 17A:
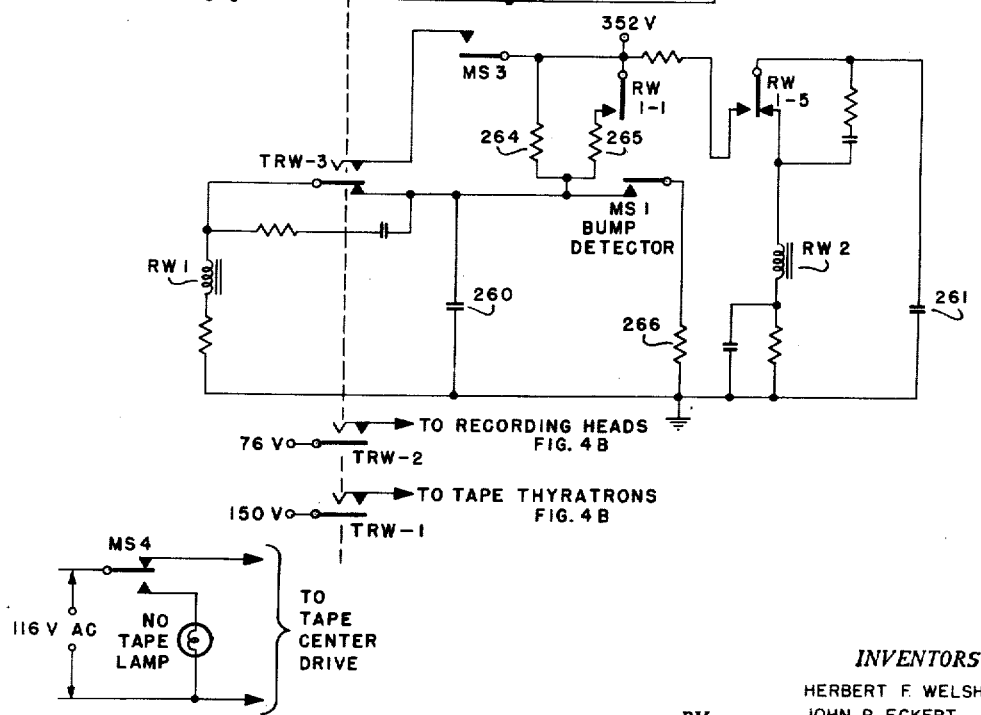

Figure 3 is a perspective view of a magnetic transducer showing also a magnetic tape, Figure 4A is a block diagram of the encoding table and the tape unit memories while Figure 4B shows the same circuits in schematic form, Figure 5A is a block diagram of the typing rate limiter, the loop move checker and the tape move checker while Figure 5B shows the same circuits in schematic form, Figure 6A is a block diagram of the spurious pulse detector while Figure 6B shows the same circuits in schematic form, Figure 7A is a block diagram of the delay flop chain while Figure 7B shows the same circuits in schematic form, Figure 8A is a block diagram of the motor stepping delay flops while Figure 8B shows the same circuits in schematic form, Figure 9A is a block diagram of the tape and loop motor circuits while Figure 9B shows the same circuits in schematic form, Figure 10A is a simplified diagram of the binary counter while Figure 10B shows the same circuits in schematic form, Figure 10C is a reproduction of the binary counter relay poles shown in Figure 5B as parts of the tape move checker, Figure 11A is a block diagram of the loop unit memories while Figure 11B shows the same circuits in schematic form, Figure 12 is a schematic diagram of the loop selection relays, Figure 13 is a schematic diagram of the loop interpreting relays, Figure 14A is a simplified diagram of the controlling relays while Figure 14B shows the same circuits in schematic form, Figure 14C is a simplified diagram of the "reverse" relay, Figure 14D is a schematic diagram of the "reverse" relay, Figure 15A is a simplified diagram of the delay flop 5 while Figure 15B is a schematic diagram of the same circuit, Figure 16A is a simplified diagram of the error relay while Figure 16B shows the circuit in schematic form in greater detail, Figure 17 is a schematic diagram of the reel motor circuit, Figure 17A shows the circuit connections of the microswitch MS4.

Figure 19:
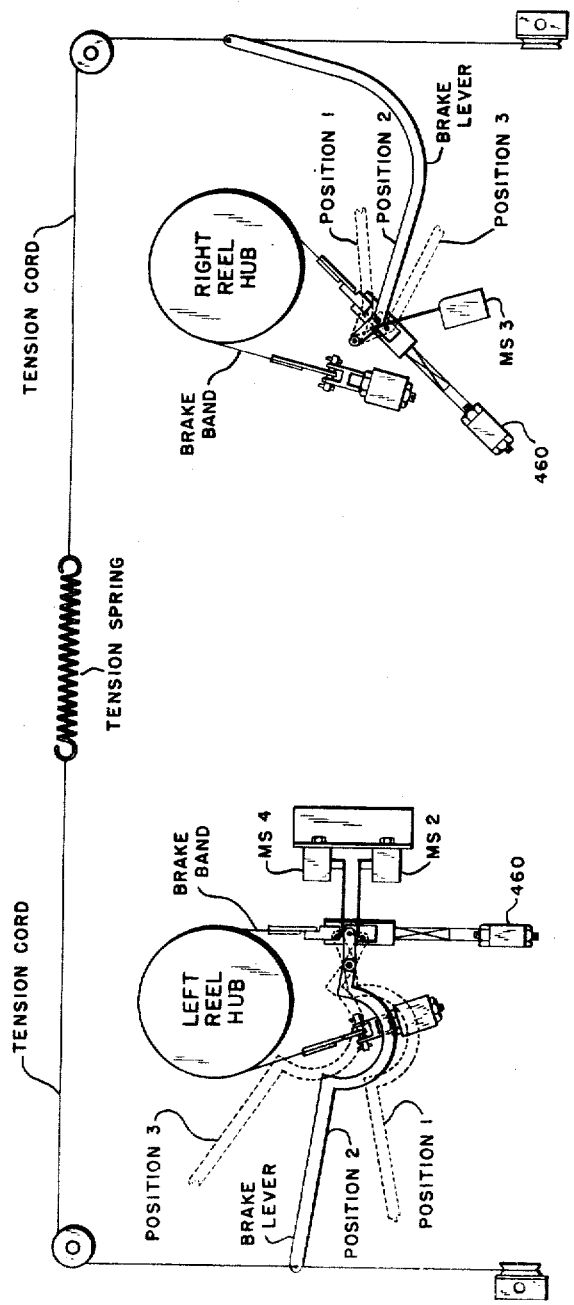
Figure 20:
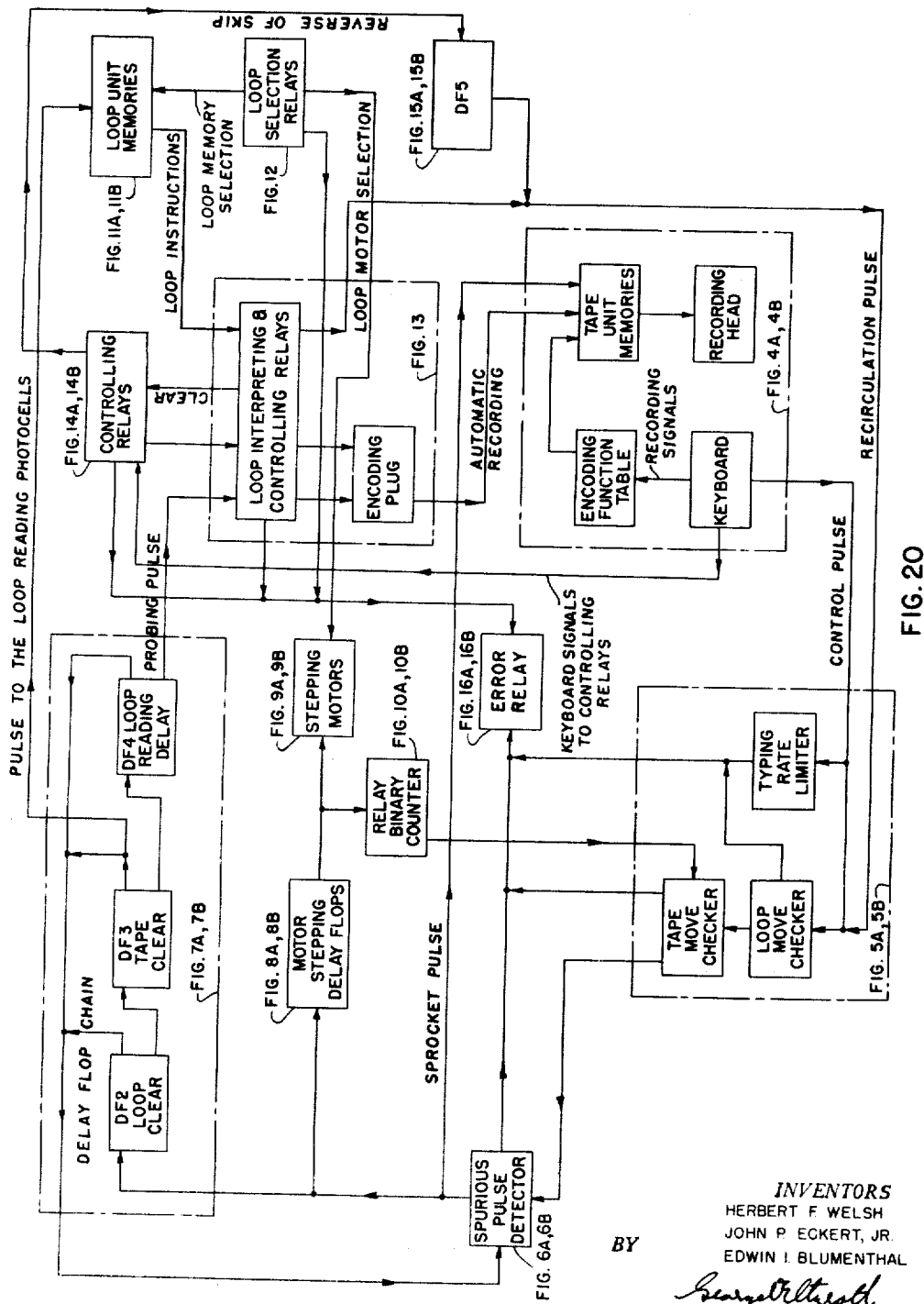
Figure 21:
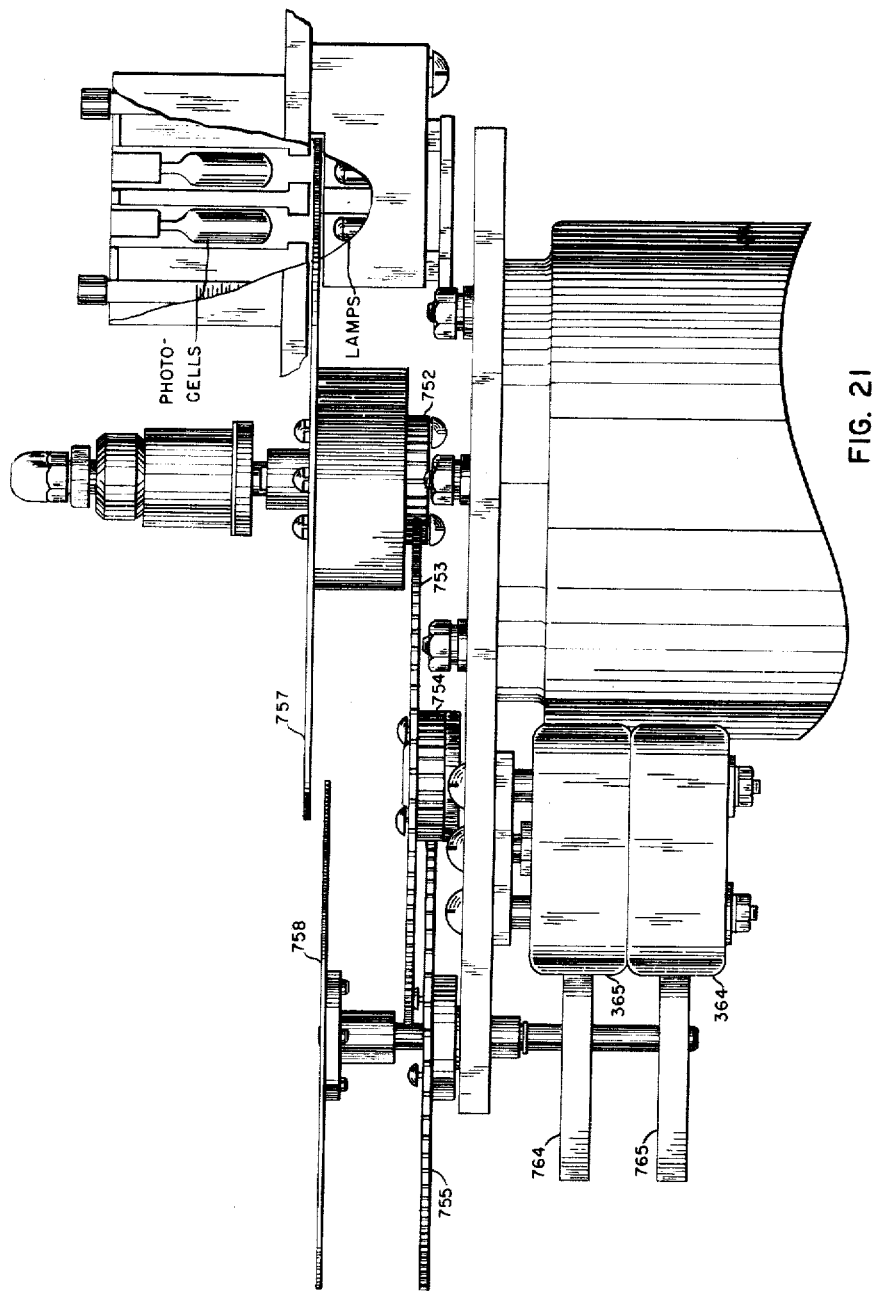
Figure 22:
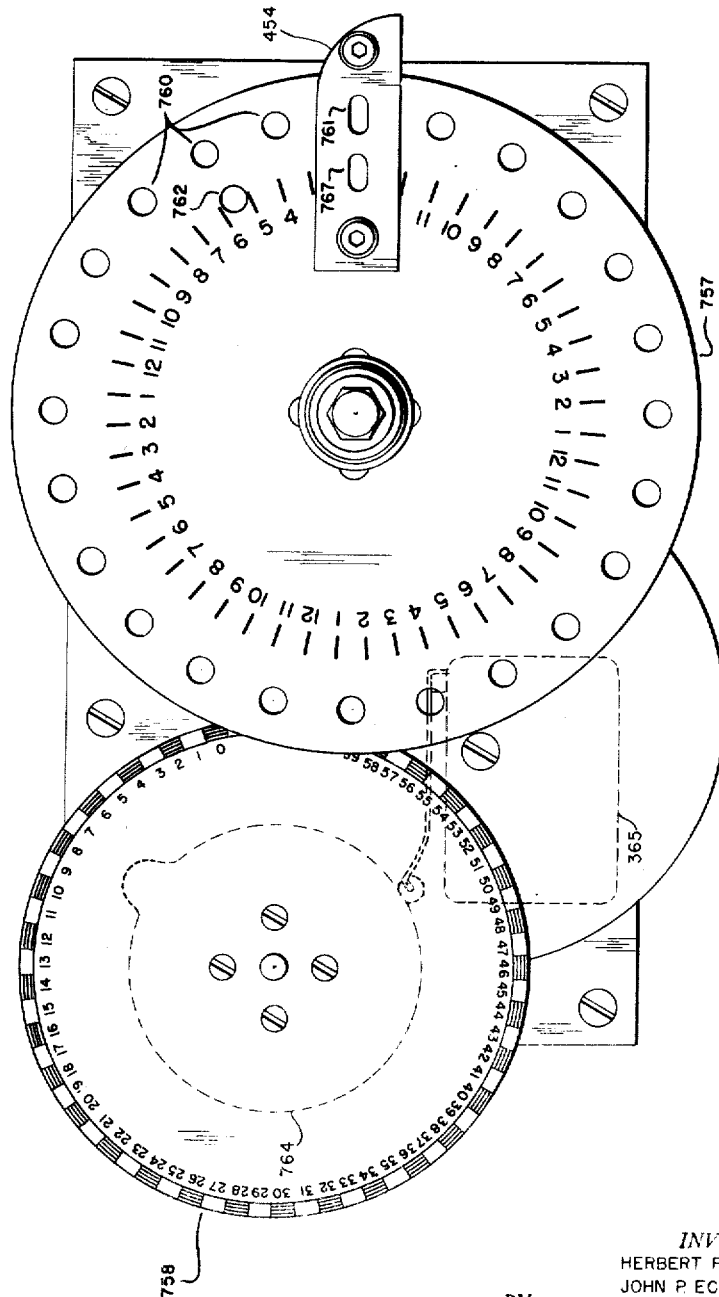
Figure 23:
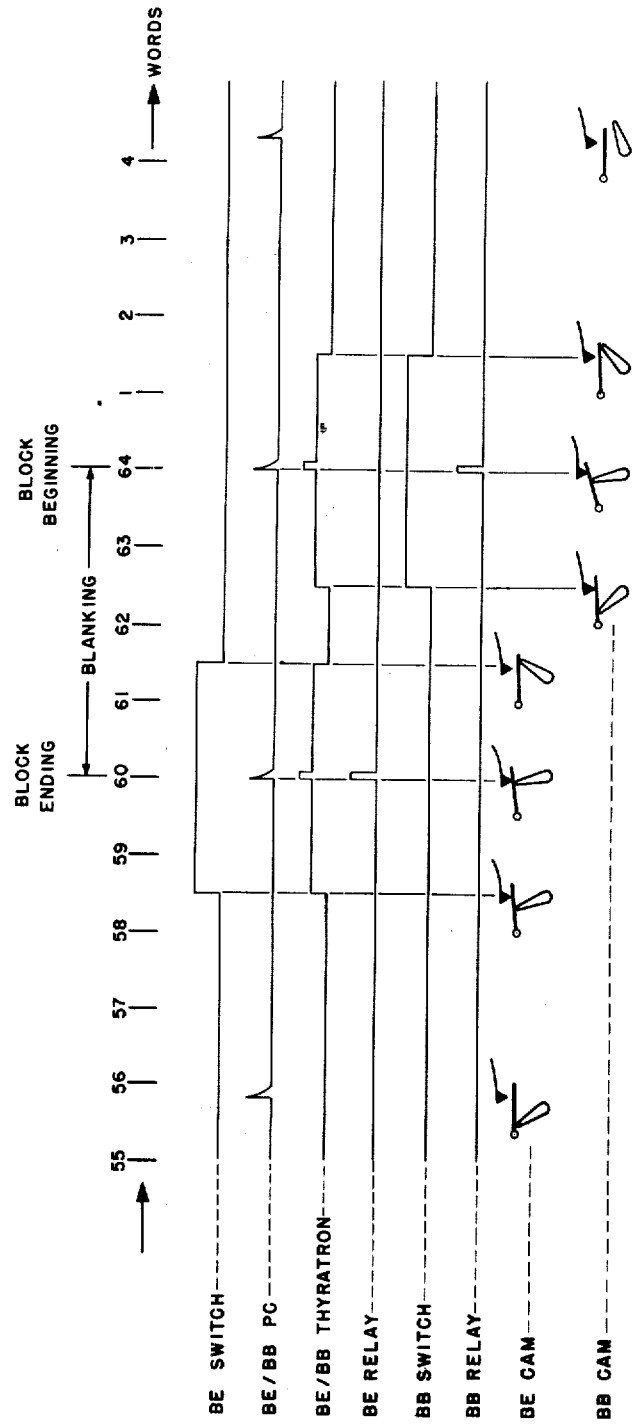

Figures 18 and 19, together, give an exterior and an interior view of the tape panel, Figure 20 is a simplified block diagram showing the interrelationship of Figures 4 to 16, Figures 21 and 22 show a front view and a top view of the tape center drive mechanism, respectively, Figure 23 represents a timing chart of the operation of the cams shown in Figure 21.

Figure 24A:
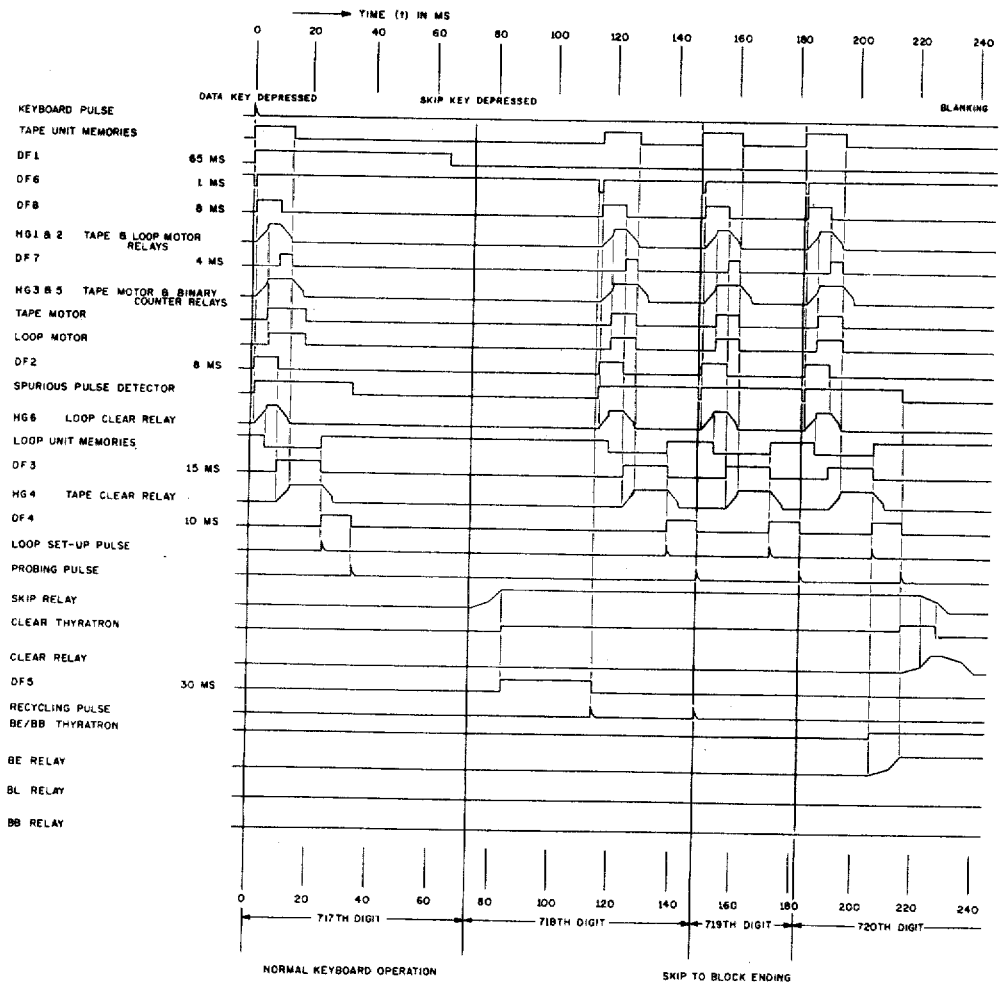
Figure 24B:
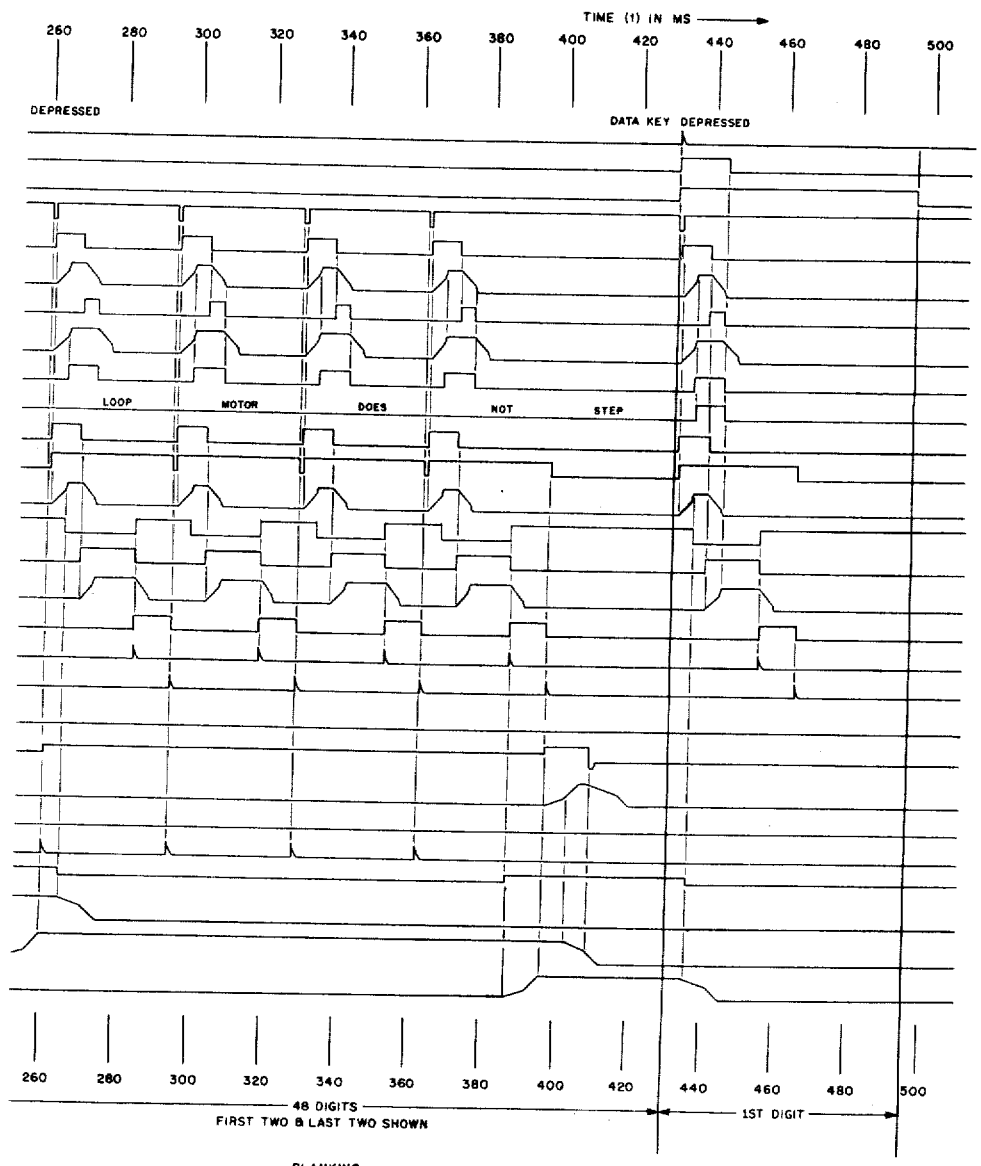

Figures 24A and 24B show a timing chart of the normal keyboard operations, and

Figure 25:
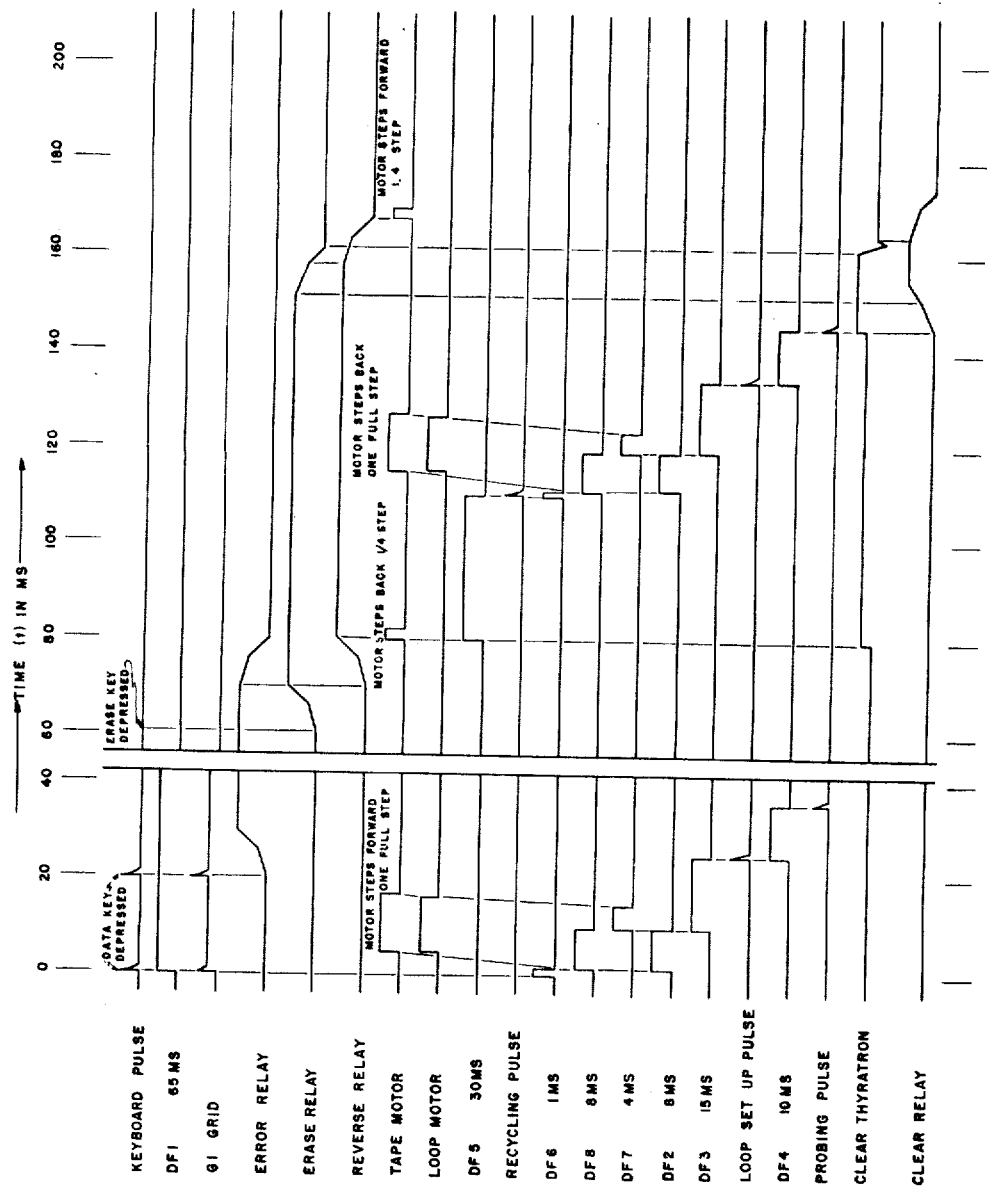

Figure 25 represents a timing chart of the error-erase sequence.

For a clearer understanding of the particular circuit arrangements shown in the accompanying drawings, and for convenience in describing the circuits in detail, typical values for the potentials of the various power sources have been given. Reference to these potentials, is therefore, intended to indicate appropriate power sources. It will be understood, of course, that the potential values are given by way of illustration only, and that they may be varied depending upon the specific circuit conditions. Positive voltage sources are identified by even numbers of like voltage, negative voltage sources by odd numbers of like voltage. All relay poles are shown in the drawings in a de-energized position while all switch poles are presented in a non-operated position.

It should be understood, however, that the invention is represented in the specific function or functions of any individual circuit and in the basic relationships between the different circuits. It may, therefore, be regarded as obvious that any change in the set-up of the apparatus is inessential as long as such change does not affect such functions or basic relationships.

While certain aspects of the invention refer to the use of magnetic tape containing a plurality of recording channels, other aspects could equally relate to different means of magnetic recording. For simplicity of description tape will be referred to with the understanding that this term includes any magnetic recording device with or without multiple channel operations.

Such magnetic tapes are well adapted for the storage of coded information in the way of minute magnetized spots thereon which, for convenience of terminology, will be referred to as pulses; for example, as indicated hereafter, a magnetic tape may very well be provided with multiple lengthwise channels carrying pulses selectively arranged so that a particular combination of pulses existing in corresponding positions in the various channels may represent numbers, letters, punctuation, machine instructions or other information. Figure 3 shows a magnetic head unit and a magnetic tape with marks indicating some minute magnetized spots thereon.

All input data must be grouped in blocks. Each "block" consists of 60 "words." There are 12 characters per "word" and therefore each block contains 720 characters or computer digits. A block is usually subdivided into fields. A field is a convenient grouping of characters within a block used by the problem coder. The size of a field, which has little relation to block length, is determined by the particular problem under consideration.

Although it is possible to prepare the magnetic tapes with only block-ending indications, the "typer" as the apparatus, for convenience, will be called hereafter, has a paper loop indexing system which automatically prevents the typist from typing too many or too few digits in a given field. The loops are individually prepared for each problem as part of the normal programming procedure by punching them with coded hole combinations. As many as seven holes are available in parallel channels. The loop, if used, is synchronized with the magnetic tape such that the paper loop is advanced once for each character recorded on the magnetic tape.

The loop indexing system has, in addition to programming, three main functions:

(1) To permit the typist to erase a complete field by a single operation of an erase key;

(2) To provide an automatic check on two of the most common typographical errors: dropped and superfluous characters;

(3) To fill in automatically the empty space left by entries of variable length within a fixed length field.

Function (1) simplifies the erase operation, since the only other way to erase would be to operate the backspace key once per character. Function (2) provides a mandatory check on dropped or superfluous characters. One of the punched hole combinations (channel 6—forced check) requires that the typist operates a control bar at the end of a field. If the typed data and the loop are not in agreement when this combination is detected, the typer gives an error indication. The typist must then operate the erase key in order to release the circuits. The division of the blocks into fields reduces the amount of retyping in case one of the above mentioned typographical errors should occur. Function (3) reduces the amount of typing required in cases where a field contains entries of variable length such as personal names. Since the number of characters in the field usually must be constant, the empty space must be filled in. Rather than fill in these spaces from the keyboard, the typist can call upon the loop to do it automatically.

The loop indexing system in the typer consists, preferably, of the following seven channels:

(1) Odd-even
(2) Stop
(3) Automatic
(4) Coded digit
(5) Coded digit
(6) Forced check
(7) Printer suppressor The two main modes of the typer operation may be summarized as:

(1) Non-interference, in which the typist can record on the tape without any loop action;

(2) Interference, in which the typist can record on the tape, but only according to loop limitations;

(a) Optional, in which the typist can cause the loop to record automatically a limited selection of fill-in characters in an interval; and (b) Automatic, in which a limited selection of fill-in characters are recorded automatically without any initiating action by the typist.

The length and number of loops are determined by the nature of the problem. Provisions are made for three independent loops, the change-over points being determined by the hole combinations on each loop; that is, change-over cannot occur except when permitted by the loop currently in control.

The following table shows the representative sample code referred to hereinabove.

PULSE COMBINATION CODE

|           |       | Character |       |           |       | Character |       |
|-----------|-------|-----------|-------|-----------|-------|-----------|-------|
| Pulse Code |      | lower case | upper case | Pulse Code |    | lower case | upper case |
| 1 01 0100 | a | A | 1 00 0011 | 0 | ) |
| 0 01 0101 | b | B | 0 00 0100 | 1 | ½ |
| 0 01 0110 | c | C | 1 00 0101 | 2 | " |
| 1 01 0111 | d | D | 1 00 0110 | 3 | # |
| 1 01 1000 | e | E | 0 00 0111 | 4 | $ |
| 0 01 1001 | f | F | 0 00 1000 | 5 | % |
| 0 01 1010 | g | G | 1 00 1001 | 6 | * |
| 1 01 1011 | h | H | 1 00 1010 | 7 | & |
| 0 01 1100 | i | I | 0 00 1011 | 8 | ' |
| 1 10 0100 | j | J | 1 00 1100 | 9 | ( |
| 0 10 0101 | k | K | 1 01 0010 | period | (.) |
| 0 10 0110 | l | L | 1 01 0001 | comma | (,) |
| 1 10 0111 | m | M | 0 01 0011 | (;) | (:) |
| 1 10 1000 | n | N | 0 00 0010 | minus | (—) |
| 0 10 1001 | o | O | 0 11 0100 | * | @ |
| 0 10 1010 | p | P | 0 10 0011 | / | ? |
| 1 10 1011 | q | Q | 1 00 0000 | ignore | |
| 0 10 1100 | r | R | 0 00 0001 | space | |
| 1 11 0101 | s | S | 0 10 0000 | tabulation | |
| 1 11 0110 | t | T | 0 01 0000 | carriage return | |
| 0 11 0111 | u | U | 0 11 1101 | single character shift | |
| 0 11 1000 | v | V | 1 10 1101 | shift lock | |
| 1 11 1001 | w | W | 0 10 1111 | unshift | |
| 1 11 1010 | x | X | | | |
| 0 11 1011 | y | Y | 0 11 0001 | printer breakpoint | |
| 1 11 1100 | z | Z | 1 11 0000 | printer stop | |

Figure 1:
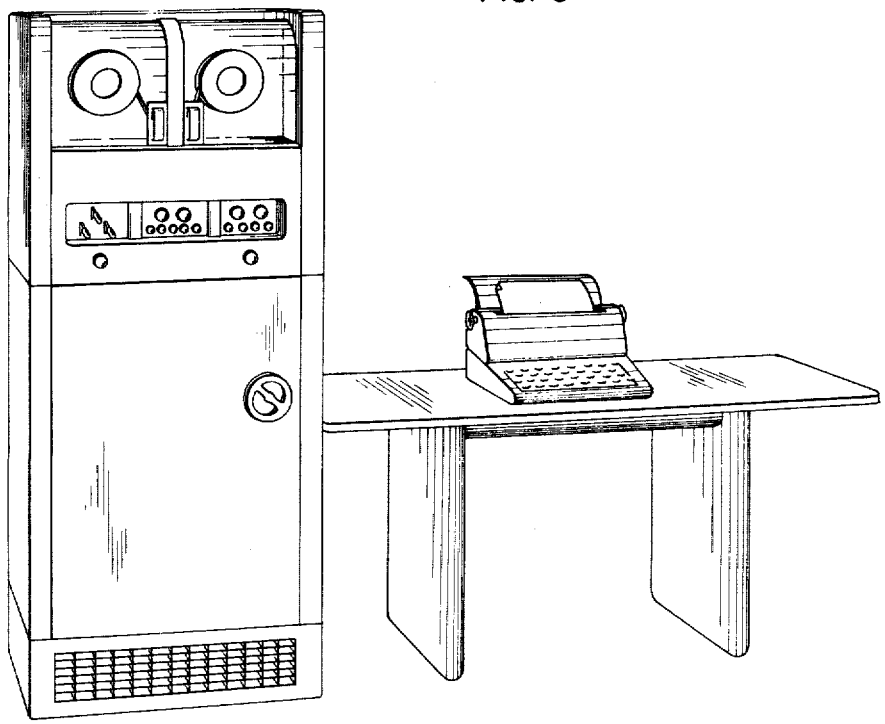
Figure 1 is a perspective view showing a physical embodiment of the invention.
Figure 2:
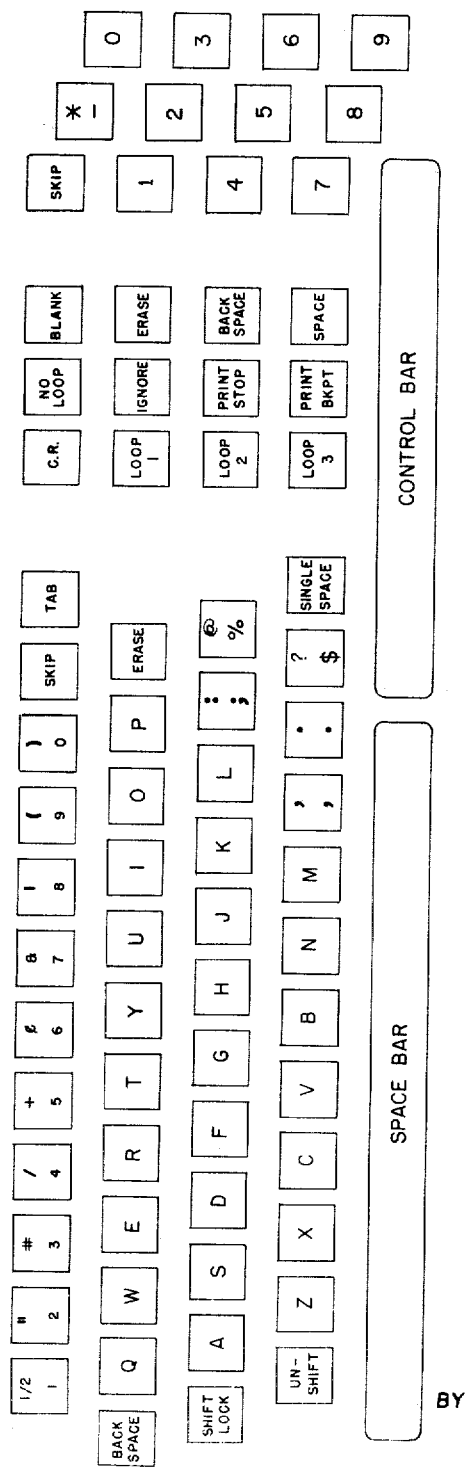
Figure 2 is a layout drawing of a sample keyboard.

The "typer" as the apparatus, for convenience, has been called consists of two units, a keyboard, and a bay of electrical equipment (Figure 1). The keyboard contains the standard alphabetical and numerical keys, an additional set of all numerical keys and a set of control keys. Figure 2 gives a possible example for such a keyboard. There is no printer mechanism attached to the keyboard. The keyboard is connected through a cable to the bay of electrical equipment which records the characters from the keyboard on the magnetic tape.

Before going into the details of the invention and before describing the individual parts of the typer, it might be appropriate to give a summary of the operations of the machine which indicates the coordination of the various functions.

Figure 1 gives an outside picture of the apparatus including the keyboard from which the operations originate. The mechanical action of the keyboard keys (Figure 2) releases electric impulses which are applied as "recording signals" to a resistance-type encoding table and as "controlling signals" to a number of control circuits (Figures 20, 4A and 5A). The encoding table translates the keyboard signals into specific signal combinations in accordance with a binary code an example of which was given hereinabove. These signal combinations are transmitted from the encoding table to a set of seven thyratrons which, together with the eighth or sprocket thyratron, operate as tape unit memories. While the first mentioned seven thyratrons are storing information, the sprocket thyratron receives its "sprocket" pulses from the Spurious Pulse Detector section of the machine (Figures 20 and 6A). The fact that the sprocket thyratron operates independently from any information signals transmitted by the encoding table is of tantamount importance: the sprocket pulse is a timing pulse which indicates when a recording, if any, is supposed to take place or, from the viewpoint of reading the tape afterwards, when the recording ought to have taken place. If any information signals should appear which are not accompanied by a sprocket pulse, this will be proof that these signals are spurious pulses and were not intended to be recorded. Such spurious signals are, therefore, to be discarded. The eight thyratrons (tape unit memories) operate the eight electromagnetic transducers which effect the magnetic recordings in the eight channels of the tape.

Turning now to the control circuits mentioned above, we find in Figures 20 and 5A the Typing Rate Limiter, the Loop Move Checker and the Tape Move Checker. The Typing Rate Limiter prohibits the passage of pulses which are not separated from each other by a time interval of at last 65 milliseconds. The Loop Move Checker prohibits the passage of pulses if the loop, whenever a loop is to be used, has not advanced properly. The Tape Move Checker prohibits the passage of pulses if the magnetic tape has not advanced properly. Pulses which are permitted to pass are transmitted to the Spurious Pulse Detector (Figures 20 and 6A) while the ones which are not permitted to pass are sent into the Error Line (Figures 20 and 16A).

It is the main purpose of the Spurious Pulse Detector to detect any attempt by the keyboard operator to introduce keyboard pulses at a time when the programming instructions on the loop call for automatic operation of the apparatus. In such case, the resulting control pulse is channeled into the Error Line (Figures 20 and 16A). In any other case, the control pulse goes to the chain of delay flops 2, 3 and 4 (Figures 20 and 7A) and also as a sprocket pulse to the sprocket thyratron, as discussed above, and, furthermore, to the Motor Stepping Delay Flops DF8 and DF7 (Figures 20 and 8A). The Spurious Pulse Detector comprises the two gates 152 and 153 which are controlled by the delay flops in the Delay Flop Chain. Gate 152 is normally open and leads into the Delay Flop Chain. Gate 153 is normally closed and leads into the Error Line (Figures 20, 6A and 16A). If any of the controlling delay flops sets, the conditions of these gates are reversed, and they remain reversed until all three of the controlling delay flops are in the restore state.

The control pulse which enters the Delay Flop Chain sets delay flop 2. In its set state, delay flop 2 energizes the Loop Clear Relay HG6 which, in turn, disconnects the thyratron cathodes of the Loop Unit Memories from ground (Figures 7A and 11A). When delay flop 2 restores it sets delay flop 3. In its set state, delay flop 3 energizes the Tape Clear Relay HG4 which, in turn, disconnects the thyratron cathodes of the Tape Unit Memories from ground (Figures 7A and 4B). The restore output of delay flop 3 sets delay flop 4 and, at the same time, sends a Loop Set-Up Pulse to the loop reading photocells (Figures 7A and 11A). The restore output of delay flop 4 sends a probing pulse into the Loop Interpreting Relays (Figures 7A, 7B and 13). If the loop instructions should call for automatic operation, this pulse returns to the Delay Flop Chain through the Coded Digit Relays (Figure 13), the Loop Move Checker, the Tape Move Checker (Figures 5A and 5B) and Delay Flop 6. A similar recirculation takes place, whenever the apparatus is operated without a loop. In such case, the pulse leaves the Loop Interpreting Relays through the Recycling Line 235 (Figure 13) and goes directly into the Tape Move Checker and Delay Flop 6, thus omitting the Loop Move Checker (Figures 5A and 5B). It is the function of Delay Flop 6 to retard any recycling pulse until gate 152 has reopened. Otherwise, a legitimate pulse might go into the error line.

It has been stated above that pulses which enter the

Delay Flop Chain are also transmitted to the Motor Stepping Delay Flops (Figures 20, 6A and 8A). As a result, delay flop 8 sets and, in turn, energizes the Motor Stepping Relays HG1, HG2 and HG3 as well as the Binary Counter Relay HG5. When delay flop 8 restores, its restore output pulse sets delay flop 7. When delay flop 7 sets, it energizes the Motor Stepping Relay HG3 and the Binary Counter Relay HG5. This means that these two relays are energized for both the delay time of delay flop 7, in contrast to the two other relays HG1 and HG2 the operating period of which is confined to the delay time of delay flop 8. Whenever the Motor Stepping Relays are energized, their respective contacts in the tape and loop motor circuits change positions (Figure 9A). As a result, the tape motor and one of the three loop motors advance 1/48th revolution or 2 poles in the forward direction which is all the motion needed for the writing and/or reading operation at any given moment. The cooperation of the two delay flops and their associated Motor Stepping Relays ensures that the tape and loop motors do not vibrate or move in reverse direction after they have advanced the proper distance.

The set output signals both from delay flop 8 and delay flop 7 also energize the Binary Counter Relay HG5 (Figures 8A and 10A) which, through the BC1 and BC2 relays, operates the Tape Move Checker (see above and Figure 5B). It may be well assumed, for all practical purposes, that the Motor Stepping Relays must have been energized, if the Binary Counter Relay has been energized since all these relays are operated by the same delay flops. The Tape Move Checker test, however, does not rely on such an assumption. The tape must have actually moved, too. If the tape has moved, such move is observed by the tape (T) photocell (Figure 11B) through holes which are placed in the tape disc at alternate tape positions. The T-relay thyratron is fired, therefore, in alternate tape advances, and the T-relay changes state with every motion of the tape disc, just the same as the binary counter changes state with every stepping of the motors. If neither the binary counter nor the T-relay have changed position, the pulse goes into the Error Line. (One pole of the start switch which must be actuated at the beginning of any operation causes the binary counter always to assume a state which is normal relative to the T-relay.)

In order to reduce the time required to record input data on the magnetic tape, certain automatic functions have been incorporated into the typer some of which are completely automatic and others are optionally automatic. It is the main purpose of the Controlling Relays (Figures 20 and 14A) and of the Loop Interpreting Relays, together with the Encoding Plug (the latter two are shown in Figure 13), to govern such automatic operations. The Controlling Relays comprise the Skip (SK) relay, the Control (CO) relay, the Back Space (BS) relay, the Erase (ERS) relay, the Blanking (BL) relay and the Reverse (REV) relay. These Controlling Relays are actuated through keyboard operation (optionally automatic), while the so-called Loop Interpreting Relays which are actually relay poles are actuated either through the operation of the Controlling Relays or through the operation of the Loop Unit Memories (Figures 20 and 11A) which, with the help of photocells, energize the seven Loop Channel Relays in accordance with the punched instructions on the loop (completely automatic). It should be noted, in this connection, that three control loops can be associated with the typer. This is the reason why three loop motors are shown in Figures 9A and 9B, as mentioned hereinabove, and why three sets of Loop Unit Memories are illustrated in Figures 11A and 11B. Only one loop, however, is ever effective at any one time, and the Loop Selection Relays (Figures 20 and 12) adjust the operations of the translating apparatus so that it may shift from one loop to another or may operate completely without a loop, if so desired.

Among the automatic functions mentioned in the preceding paragraph, two functions are to be singled out in order to explain the purpose of the device shown in Figures 15A and 15B. These two functions are "Reverse" (REV) and "Skip" (SK). When the Reverse Relay is energized poles REV-3, REV-4 (in the loop motor circuit) and REV-5 and REV-6 (in the tape motor circuit) change position and cause the loop and tape motors to reverse (Figure 9B). But this is not the only effect. The change in the position of REV-5 and REV-6 not only reverses the direction in which the tape motor is going to rotate, but it also adds an extra rotation of one fourth of a cycle to the full cycle backward rotations which follow afterwards. This is brought about by the fact that the direct current applied to one of the stator windings through HG3 and REV-6 is shifted to the other stator winding via HG3 and REV-5. As a result, the motor immediately rotates backward from the first stator winding to the second winding or one fourth of a complete cycle. The same one fourth extra rotation takes place in the opposite direction as soon as the Reverse Relay is de-energized. The purpose of this precalculated one fourth of a cycle displacement is to ensure that the erasure of the last character to be erased has been completed before the motor returns to forward direction.

These two distinct features of the Reverse operation explain two different features of the circuit shown in Figures 15A and 15B. This circuit acts both as a pulse generating device and as a delaying device. The pulse generating device provides a recirculating pulse which takes the place of the keyboard pulse and follows essentially the regular path of the keyboard pulse until it is channeled into a subsequent recirculation. This pulse leaves, however, only after a delay of 30 milliseconds so that the transients of the one fourth cycle shift of the tape motor are allowed to die out before the recirculating pulse induces the Motor Stepping Delay Flops (see above) to move the tape and the loop through full cycle backward rotation of the motors.

This delay is not needed in the case of the Skip operation which causes the tape and the loop to advance over a whole field, bypassing all loop signals, except for a "Stop" signal, but which does not necessitate the extra one fourth cycle rotation of the tape motor. Here the circuit of Figure 15B is only used as a means to provide the recirculation pulse, and the described delaying effect is superfluous, but does no harm.

The foregoing summary has not made any reference, for reasons of simplification, to the devices shown in Figures 17 and 17A, the Reel Motor circuit, Figures 18 and 19, the outside and inside arrangements of and the operations on the Tape Panel, Figures 21 and 22, the Tape Center Drive mechanism, and the Timing Charts of Figures 23, 24A, 24B and 25. These matters shall be discussed in the subsequent detailed description.

*Encoding table—Tape unit memories*

(Figures 4A and 4B)

When a keyboard key as, for example, 101 for the letter "B," is in normal position, its contact connects the +300 volt source from a .05 μf. capacitor 103 to ground. If any key is operated, that is, moved to abnormal position, it disconnects the capacitor from the supply, and the charge previously stored on the chosen capacitor becomes a keyboard pulse which is applied both to a resistance-type encoding table (recording signal) and to a group of control circuits (controlling signal).

The encoding table consists of as many input lines 110 as there are characters on the keyboard and of seven output lines 111. The input lines originate at the keyboard keys while the seven output lines control the grids of seven recording thyratrons 113. The thyratrons, in turn, supply current for the magnetic recording head coils 115. The details shown in Figure 4B in regard to thyratron 7 apply equally to thyratrons 1 to 6. The sprocket thyratron at the upper right is not connected to the encoding table. At selected intersections between the input lines and the seven output lines 100K resistors 117 are placed. Which intersections have resistors and which do not is determined by the seven pulse binary code which assigns to each of the characters on the keyboard a specific binary combination of intersections with and without resistors. The pulse code of each individual character is, therefore, represented by the array of fired and unfired thyratrons. The fired thyratrons effect a "one" while the unfired thyratrons represent a "zero."

To record a "B," for example, for which the representative sample code provides a 0010101, a positive-going pulse is applied to the control grid of the thyratrons 1, 3 and 5. The control grid of each thyratron is biased at −5 v. The positive-going keyboard pulse, which has an amplitude of approximately +16 v., causes 1, 3 and 5 to conduct. When these thyratrons conduct, the neon lights 119 fire. If they do not conduct because a fuse has blown, neon lights 116 light up.

Simultaneously with the delivery of the recording signal to the selected thyratrons, the controlling signal, after passing through a number of control circuits, effects a tape motor drive which moves the tape across the recording head. As the tape moves over the magnetic head, recording takes place. The head, preferably, has eight channels (Figure 3). Each channel comprises a pole piece and coil driven by a unit memory. All coils are continuously energized. A magnetic pulse is recorded on the tape by changing the polarity of a particular pole piece for a portion of the total area assigned to each pulse.

When not conducting, the anode potential of a thyratron rests at about +78 v. A current of approximately 80 ma. flows from the +76 v. supply to the +150 v. supply. This current flowing through the head coil causes flux which saturates all tape channels to the binary "zero" level. As soon as the selected thyratrons fire, they draw current from the +150 v. supply. The anode potential drops to +72 v., and 80 ma. flow through the coils in the reverse direction. The resulting flux saturates the corresponding channels of the tape in the opposite direction, that is, to the binary "one" level. A binary "zero" has no effect on the recording head current. For a binary "one" the current in the corresponding channel is reversed for twenty percent of the cycle.

Since there is always sufficient current to saturate the tape in one direction or the other, any previous recording is erased, if and when the tape is moved backwards over the head as in the case of "backspacing" or "erasing." By that time the unit memories have already been cleared and are no longer conducting. Therefore, all tape channels are reduced to the binary "zero" condition as the tape moves backwards over the head.

In order to preserve a proper duty cycle of the two saturating currents as represented by the pattern of magnetization on the tape, the thyratrons which have been fired, must be restored to unfired state in strict accordance with the acceleration and deceleration characteristics of the tape motor. Concurrently, the tape motor drive must stop pulling the tape at such a time that the proper length of tape has been devoted to the magnetic recording of the single character. Thus, the total recording is a series of magnetically saturated lengths of tape in which the proper areas, rectangular to the lengths of the tape, carry the seven-channel code with the appropriate duty cycle of direction of saturation to be preserved within the areas of such channels which carry a "one." The eight channel always carries a pulse, if and when any combination is intended to appear in the other seven channels. The use of this "sprocket" channel is mandatory because the absence of a sprocket signal in any combination of pulses indicates the existence of spurious pulses in a space where no character should appear. Such spurious pulses may be eliminated through specific controlling devices.

Other details shown in Figures 4A and 4B will be discussed in subsequent chapters.

The typing rate limiter (Figures 5A and 5B)

At the same time as the recording heads are energized by the recording signal, the controlling signal enters a group of control circuits which switch the pulse along various paths according to the condition of the controlling relays.

The path of the keyboard pulse divides at buffers 120 and 121. Via 120 the pulse triggers the typing rate limiter, delay flop DF1. When set, DF1 opens the gate 125. If another key operation pulse should occur during the time DF1 is set, then gate 125 passes the second pulse into the error signal line. The duration of DF1 is 65 milliseconds, during which time the typist may not strike another key on the typer keyboard.

These effects are accomplished as follows:

A negative-going keyboard pulse which is developed across resistor 118 (Figure 4B) causes buffers 120 and 121 to cut off. As soon as 120 is cut off, its anode potential rises from +30 v. to +350 v., and a positive pulse is applied to the grid of the normally nonconducting tube of DF1. This positive-going pulse causes the nonconducting tube to conduct which in turn causes the normally conducting tube of DF1 to cut off. DF1 is now in the set position.

When the normally conducting tube of DF1 cuts off, neon lights 124 in its cathode circuit fires because the cathode potential drops to +20 v. and the potential across the neon lights is +80 v. At the same time the anode potential of the normally conducting tube of DF1 rises from +170 v. to +350 v., and a positive pulse which has an amplitude of +180 v. is applied to the control grid of gate 125. This positive-going pulse does not have sufficient amplitude to overcome the −281 v. bias applied to 125 and drive it into conduction. If another keyboard pulse occurs while DF1 is set, it does not affect the normally nonconducting tube (which now conducts) and is applied to the control grid of 125. The incoming positive-going pulse lifts the grid potential of 125 to a higher positive level. The cathode potential follows the rise in grid potential, and a positive-going pulse passes from the cathode of 125 into the error line.

The anode of the normally-nonconducting tube of DF1 is connected to the control grid of the normally conducting tube. The capacitor 127 and the resistor 128 determine the delay time of DF1 which is 65 milliseconds. DF1, therefore, restores itself 65 milliseconds after it has been set.

Loop move checker—Tape move checker (Figures 5A and 5B)

The keyboard pulse cuts off buffer 121 at the same time as it renders buffer 120 nonconductive. As soon as 121 cuts off, its anode potential rises from +30 v. to +350 v., and a positive-going pulse from its anode is applied to the control grid of cathode follower tube 130 which begins to conduct. From there the pulse reaches the pole of 6—3. Normally the pulse passes through 6—3, BE-2 and NL-1 to 5—1 which is the entrance into the loop move checker. If either the forced check relay (6) or the block-ending (BE) relay is energized, the pulse is switched into the error signal line.

The loop move checker and the tape move checker determine whether the tape and the loop have both advanced after the last character was struck. If either the loop or the tape has not advanced the key pulse is switched into the error line.

The first channel of the paper loop adjusts each combination of holes so that alternate combinations have an odd number of holes while the intervening alternate combinations have an even number of holes. The seven relays, 1 to 7 inclusive, are energized whenever the corresponding channels of the loop contain holes. Six of the seven relays (1, 2, 3, 4, 5 and 7) have one or two poles in the odd-even checking circuit.

The combined effect of the tape (T) relay, relays 1 to 7, and the binary counter checks:

(1) That the loop advanced
(2) That the tape advanced
(3) That the present combination of loop punches is the opposite (oddness or evenness) of the previous combination.

Whenever the loop and the tape motors are pulsed, the binary counter (BC) is tripped into the opposite position. If the tape moved, then the T-relay also reversed position. The tape (T) relay is operated by a photocell which observes the tape disc. A hole is placed in the tape disc at alternate tape positions. Therefore, the T-relay thyratron is fired in alternate tape advances. The two actions cancel each other and a through circuit is maintained. If neither the binary counter nor the T-relay have changed position, the pulse goes into the error line.

Whenever the loop moves, the number of relays (1 to 7) energized must change from an odd number to an even number or vice versa. In order to check this change, some independent element must shift the odd-even circuits. The T-relay is a convenient independent source. Therefore, at each tape advance (and therefore loop advance) the odd-even path is altered by the T-relay. If the relays 1 to 7 do not change position, an error signal results.

As shown, the odd-even check would pass a pulse via 5—1, 1—1, T—2, 7—1, 3—2, 4—1, 2—1, T—3, BC1—1 and BC2—1 to delay flop 6 (Figure 6B). Suppose, for example, that the tape and loop both advanced correctly. The T-relay would pick up, and, for the present purpose, suppose that only channel 1 of the loop is punched. The path of the next pulse would be via 5—1, 1—1, T—1, 7—1, 3—2, 4—1, 2—1, T—3, BC1—2 and BC2—1 to delay flop 6. (The underscore indicates those relays which have changed position.)

Now suppose that the tape moved, but not the loop. The T-relay and the BC relays would change position, but not the loop channel 1 relay. The path would, therefore, be via 5—1, 1—1, T—2, 7—2, 3—1, 4—2, 2—5 to the error line. By similar reasoning it can be shown in every case that the BC relays and the T-relay must alternate position for every keyboard operation and that the loop combination must be alternately odd and even in order to provide a closed path to relay flop 6. If these changes of state do not occur as required, the keyboard pulse is sent to the error line.

After the key pulse passes the loop move checker and the tape move checker, it is first applied to a spurious pulse detector, then to the loop clear delay flop (DF2), and the motor stepping delay flops DF7 and DF8.

The spurious pulse detector serves mainly to detect any attempt by the typist to introduce keyboard pulses during any automatic operation. If such a pulse occurs, it is channelled into the error signal line.

The motor stepping delay flops 7 and 8 are tripped by the keyboard pulse and cause the loop and tape motors to advance one character. At the same time the key pulse sets the loop clear delay flop (DF2) which energizes the loop clear relay HG6. This relay clears the loop thyratrons. After the loop clear delay flop (DF2) resets, the pulse from delay flop 2 sets the tape clear delay flop (DF3) which energizes the tape clear relay HG4. The tape clear relay picks up and clears the tape unit memories. When tape clear delay flop (DF3) resets, it triggers delay flop 4. When delay flop 4 is triggered, it generates a pulse which sets up a new combination in the loop thyratrons. As soon as delay flop 4 resets, it generates a pulse which passes through the loop interpreting relays. The loop interpreting relays switch this pulse to a dead end, if there is no automatic operation, and if all other aspects of the typer operation have been carried out without error.

The loop interpreting relays, however, may be set up in many different combinations. These combinations take care of loop punches, of the operation of the control keys, of automatic functions, and of certain misoperations.

The pulse which finally passes into the loop interpreting relays from delay flop 4 can be considered as the same pulse which originally entered the loop move checker. However, it has been delayed by the series of relay flops.

Between the times that the pulse passes through the loop move checker and the loop interpreting relays, the loop has been advanced. Each keyboard operation pulse checks, therefore, the previous loop combination as it passes through the loop move checker; the next keyboard pulse will, therefore, check the present loop combination, and so forth.

*The spurious pulse detector*

(Figures 6A and 6B)

The spurious pulse detector is located between delay flop 6 and delay flop 2. It consists of gates 152 and 153. Normally 152 is open and 153 closed. Whenever any one of the three delay flops DF2, DF3, or DF4 (Figure 7A) is set, gate 152 is closed and gate 153 is open. If a second pulse sets delay flop 6, the restore pulse from delay flop 6 is switched into the error line via gate 153. The spurious pulse detector detects, in particular, any attempt by the typist to record a character while an automatic operation is in progress.

DELAY FLOP SIX

The time constant of the network consisting of capacitor 155 and resistor 157 is such that delay flop 6 resets itself after one millisecond. If another keyboard pulse should occur while delay flop 6 is in the set position, it is applied to the control grid of the normally nonconducting tube (which now conducts) and hence the pulse does not affect the position of delay flop 6.

When delay flop 6 is in the set position, the anode potential of its normally nonconducting tube drops from +350 v. to +30 v., and a negative-going pulse which has an amplitude of −51 v., is applied to the control grid of gate tubes 152 and 153. However, since 152 and 153 are normally nonconducting tubes, the negative pulse has no effect on them. As soon as delay flop 6 resets, the anode potential of its normally nonconducting tube rises from +30 v. to 350+ v., and a positive-going pulse passes through a differentiating network to the control grid of 152 and 153.

GATES 152 AND 153

The +320 v. signal from delay flop 6 is attenuated by resistors 159 and 160. A differentiator consisting of resistor 161 and capacitor 162 applies a +50 volt signal to the grid of gate 153. Similarly, the differentiator consisting of capacitor 163 and resistor 164 applies a +50 volt signal to gate 152.

As the output of delay flop 6 drops, a negative pulse is applied to these grids. This has no effect since the tubes are not conducting. One millisecond later delay flop 6 recovers. The rising signal is differentiated to apply a positive-going +50 volt pulse to gate 152 and 153.

Gates 152 and 153 are controlled by the delay flop chain DF2, DF3 and DF4 (Figures 7A and 7B), via amplifiers 166 and 167.

In the static condition the output tubes of these delay flops are conducting. These hold the grid of 166 down at −123 v. This opens gate 152. At the same time the nonconducting tubes in the delay flop train hold the grid of amplifier 167 at −95 volts, thus inhibiting gate 153. The incoming +50 volt pulse from delay flop 6 can then pass through gate 152 to the buffers 169 and 170.

If any of the controlling delay flops sets, the conditions of gate 152 and gate 153 are reversed, and they remain reversed until all three of the controlling delay flops are in the restore state. The gate 152 grid drops thus preventing passage of a pulse while the gate 153 grid rises to −91 v. In this condition any spurious pulse from delay flop 6 will now pass 153 into the error line. It is the function of delay flop 6 to retard any recycling pulse coming from delay flop 4 via the loop interpreting relays until gate 152 has reopened. Otherwise, a legitimate pulse might go into the error line.

As soon as gate 152 begins to conduct, a negative-going pulse from its anode is applied to both control grids of the normally conducting buffer tubes 169 and 170.

*Delay flops two, three and four*

(Figures 7A and 7B)

DELAY FLOP TWO

When buffer 169 on Figure 6B is cut off, a positive-going pulse from its anode is applied to the control grid of the normally nonconducting tube of delay flop 2.

As soon as the incoming positive pulse sets delay flop 2, the output voltages inhibit and alert gates 152 and 153, respectively. Neon light 178 in the cathode circuit of the normally conducting tube of delay flop 2 fires as soon as delay flop 2 is set because the cathode potential drops to ground which effectively applies +100 v. across the neon lamp and its series resistor 179. The network which consists of a capacitor 175 and a 2.7M resistor 176 has a time constant such that delay flop 2 restores itself eight milliseconds after it has been set.

LOOP CLEAR RELAY (HG6)

When delay flop 2 is in the set position, a positive-going pulse (from the anode of the normally conducting tube) which has an amplitude of +180 v. is applied to the control grid of pentode 181. The positive-going pulse causes 181, which is biased at −175 v., to conduct. The 181 anode current energizes the mercury relay coil of the loop clear relay HG6. Capacitor 183 and resistor 184 which are connected across the HG6 relay coil protect the coil and the tube from the inductive kick which occurs when HG6 drops out. As soon as 181 starts conduction, neon light 186 fires because of a drop in the 181 anode potential. When relay HG6 picks up, the loop clear relay pole on Figures 11A and 11B disconnects the loop thyratron cathodes from ground. Resistor 361 and capacitor 362 on Figure 11B which are connected across the mercury relay pole suppress sparking at the contact. The length of the interval of eight milliseconds of loop clear delay flop DF2 is determined by the time required for the loop memory thyratrons to cut off.

DELAY FLOP THREE

Delay flop 2 restores eight milliseconds after it has been set, and a positive-going pulse from the anode of its normally nonconducting tube sets delay flop 3. As soon as delay flop 3 is in the set position, it applies inhibitory and permissive voltages to gates 152 and 153, respectively. The neon light in the cathode circuit of the normally conducting tube of delay flop 3 fires as soon as delay flop 3 is set because the cathode potential drops to ground which effectively applies +100 v. across the neon lamp and its series resistor. Capacitor 188 and resistor 189 form a network which has a time constant such that delay flop 3 resets itself 15 milliseconds after it has been set.

TAPE CLEAR RELAY (HG4)

When delay flop 3 is set, a positive-going pulse (from the anode of its normally conducting tube) which has an amplitude of +180 v. is applied to the control grid of pentode 191. This positive-going pulse drives 191, which is biased at −175 v., into conduction, and the anode current of 191 energizes the mercury relay coil of the tape clear relay HG4. Capacitor 193 and resistor 194, which are connected across coil HG4, protect the coil and the tube from the inductive kick which occurs when the relay drops out. Neon lamp 196 fires as soon as 191 conducts because the anode potential drops. The tape clear relay (HG4) pole on Figure 4B disconnects the tape memory cathodes from ground and thereby clears them of the combination. When a unit memory is set up by the keyboard, the current in the corresponding recording head coil is reversed for about nine milliseconds (DF6=1 ms. and DF2=8 ms.). During this interval delay flop 8 has caused the tape motor to advance. It is important that the tape clear relay (HG4) operate at such a time that the recording head current returns to normal direction when the tape has moved through one fifth of the total distance allocated to the recording of one character. (The 8 and 4 millisecond intervals of delay flop 8 and delay flop 7 merely determine the length of time that the motor stepping relays are energized. They have no influence on the length of time during which the tape memory thyratrons remain active.)

DELAY FLOP FOUR

Delay flop 3 restores fifteen milliseconds after it has been set and a positive-going pulse from the anode of its normally nonconducting tube sets delay flop four. When delay flop 4 is in the set position it alerts gate 153 and inhibits gate 152. At the same time the neon lamp in the cathode circuit of the normally conducting tube fires. The network formed by capacitor 203 and resistor 204 has a time constant such that delay flop 4 restores itself ten milliseconds after it has been set.

As soon as delay flop 4 is in the restored condition, the anode potential of its normally nonconducting tube rises from +70 v. to +350 v. and a positive-going pulse is applied to the control grid of cathode follower tube 210, which is biased at −21 v., via a 1.2 M resistor 209. This positive-going pulse causes 210 to conduct and its cathode potential rises from ground to +20 v. A positive-going pulse passes from the cathode of 210 into the loop interpreting relays (Figure 13).

*The motor stepping delay flops*

(Figures 8A and 8B)

DELAY FLOP EIGHT

When buffer 170 on Figure 6B is cut off, a positive-going pulse from its anode is applied to the control grid of delay flop trigger tube 551. As soon as this trigger tube conducts, a negative-going pulse from its anode is applied to the normally conducting tube of delay flop 8. The negative-going pulse cuts off this tube and sets delay flop 8. The same negative-going pulse is also applied to the cathode of delay flop trigger tube 552 and causes this tube to conduct. As soon as this triode conducts, it acts as a lower clamp on the anode of the normally nonconducting tube of delay flop 8 and clamps the anode potential at −101 v. The network which is connected between the anode of the normally conducting tube of delay flop 8 and the control grid of the normally nonconducting tube of the same delay flop consists of capacitor 554 and resistor 555. This capacitor-resistor network has a time constant such that delay flop 8 resets itself eight milliseconds after it has been set. The eight millisecond delay time of delay flop 8 can be adjusted by varying the grid potential of the normally conducting tube. The negative-going pulse, which sets delay flop 8, also passes to the normally nonconducting tube of delay flop 7 and hence has no effect on delay flop 7.

When delay flop 8 is in the set position, a positive-going pulse from the anode of its normally conducting tube passes simultaneously to the control grid of pentode 558 and to the anode of triode buffer tube 565. At the same time, a negative-going pulse from the anode of the normally nonconducting tube of delay flop 8 is applied to the control grid of the normally nonconducting tube of delay flop 7 and hence does not effect delay flop 7.

DELAY FLOP SEVEN

As soon as delay flop 8 restores, 8 milliseconds after it has been set, a positive pulse from the anode of its normally nonconducting tube is applied to the control grid of the normally nonconducting tube of delay flop 7. This positive-going pulse causes conduction in the nonconducting tube and sets delay flop 7. Capacitor 575 and resistor 576 form a network which has a time constant such that delay flop 7 restores itself 4 milliseconds after it has been set.

MOTOR RELAYS

When pentode 558 conducts due to the incoming positive pulses from delay flop 8, its anode current energizes relay coils HG1 and HG2, and neon light 560 fires because the anode potential drops. A capacitor-resistor network consisting of capacitor 562 and resistor 563 is connected across the HG1 and HG2 relay coils. This network protects the coils and the tube from the inductive surge which occurs when the relays drop out.

The positive-going pulse from delay flop 8 is also applied to the anode of buffer tube 565 and causes conduction. The anode of this tube is directly connected to its control grid. As soon as this tube conducts, a positive pulse from its cathode is applied to the control grid of pentode 568 and drives 568 into conduction. The anode current of 568 energizes relay coils HG3 and HG5, and neon light 570 is caused to fire by the drop in anode potential of this tube. Capacitor 572 and resistor 573, which are connected across the relay coils, protect the coils from the inductive surge which occurs when the relays drop out.

When delay flop 7 is in the set position, neon lamp 578 fires because the cathode potential of the normally conducting tube drops to −281 v. The neon light is now connected between −281 v. and a point on the voltage divider (formed by resistors 580 and 581) which is at a potential of −181 v. This potential difference of 100 v. is sufficient to cause the neon light to fire. At the same time a positive-going pulse from the anode of the normally conducting tube passes to the anode of buffer tube 566. The anode of this tube is directly connected to its own control grid. This positive pulse causes buffer tube 566 to conduct. As soon as this tube conducts, a positive pulse from its cathode is applied to the control grid of pentode 568 and drives 568 into conduction. The anode current of 568 causes relay coils HG3 and HG5 to remain energized for an additional period of 4 milliseconds.

HG1, 2 and 3 are motor stepping relays while HG5 steps the binary counter. HG1 and HG2 are energized for the eight milliseconds of delay flop 8 while HG3 and HG5 are picked up for the eight milliseconds of delay flop 8 plus the four milliseconds of delay flop 7.

Tape and loop motor circuits (Figures 9A and 9B)

The three motor control relays are HG1, HG2 and HG3. The tape motor is always connected through HG1 and HG3, but either none or only one of the three loop motors is connected through the HG2 and HG3 relays at any one time. One of the four relays, no loop (NL) loop 1 (L1), loop 2 (L2) or loop 3 (L3), must always be energized.

The three loop motors and the tape motor are synchronous inductor type motors. A synchronous inductor motor consists of a permanent magnetic rotor with two stator windings. The motors used in the typer are 96 pole machines. The common point of the two stator windings is grounded. To hold the motors in a fixed position, one of the two stator windings is supplied with a direct current. For the tape motor this current is supplied from the positive pole of the supply through HG3 and REV-6 (reverse relay). The ground return of the common point between the two stator windings completes the circuit.

The corresponding holding current for, say, loop motor one, is obtained through HG3, but then through BL-6 (blanking relay) and L1-5. (Relay L1 is picked up when loop 1 is in use.) Meanwhile, the two remaining loop motors are held in position by a separate "low holding voltage" supplied via L2-5 and L3-5.

HG1 and HG2 are connected between a potential source and a capacitor. The other side of the capacitor is connected to the remaining stator winding of the tape or loop motor. The capacitor is normally charged with a certain polarity. Specifically, the HG2 capacitor 518 is charged between a negative potential and ground, while the HG1 capacitor 503 is charged between a positive potential and ground. The power supply demand is thus split equitably.

Whenever delay flop 8 is set, HG3 is picked up and reverses the direction of current through the stator winding of the tape motor, which is connected to the D. C. source, and through a corresponding stator winding in one of the loop motors, say L1. Simultaneously, HG1 and HG2 deliver the charges stored in their respective capacitors to the other stator winding of the two motors by reversing the polarity to which the capacitors are returned. Each motor therefore advances 1/48 revolution or 2 poles in the forward direction. Since the currents which flow in the stator windings are predictable and in a determined direction, the rotation of the motor is also in a fixed and predictable direction. HG1 and HG2 drop out after eight milliseconds. HG3 holds for an additional four milliseconds or a total of 12 milliseconds.

When the HG1, HG2 and HG3 relay coils are energized, the corresponding relay contacts which are located in the tape and loop motor circuits change position. When HG1 is in its normal position, it permits the 30 μf. "Pyranol" capacitor 503 to be charged to +90 v. via resistor 505. Capacitor 508 and resistor 509 suppresses sparking at the HG1 contact. As soon as HG1 changes position, −91 v. is applied to the capacitor 503 via resistor 506 and HG1, and the capacitor discharges to ground via a 500 ohm resistor 511, REV-5, and the first one of the two stator windings of the tape motor. Capacitor 513 and resistor 514, which are connected across HG1, suppress sparking at the HG1 contact.

HG2 normally permits the 30 μf. capacitor 518 to be charged to −91 v. via REV-3 and resistor 520. Capacitor 523 and resistor 524 suppress sparking at the HG2 contact. When HG2 changes position, it connects capacitor 518 and +90 volt via REV-4 and resistor 521, and the capacitor discharges to ground via a 15K resistor 526. Capacitor 528 and resistor 529 suppress sparking at the HG2 contact.

HG3 in its normal position applies +90 v. to the second one of the two stator windings of the magnetic tape motor via a 75 ohm resistor 539, a 300 ohm resistor 542, and REV-6. Capacitor 533 and resistor 534 prevent sparking at the HG3 contact. When HG3 changes position it connects −91 v. to the same tape motor winding via a 75 ohm resistor 540, the 300 ohm resistor 542, and REV-6. Capacitor 536 and resistor 537 suppress sparking at the HG3 contact.

Binary counter (BC)

(Figures 10A and 10B)

HG5 controls the position of the binary counter. It is picked up for the 12 milliseconds of delay flop 8 and delay flop 7. The binary counter as shown in Figures 10A and 10B, may be considered in its "zero" state.

As soon as the HG5 relay coil is energized, the HG5 contact changes position and current flows from the +352 v. source to ground via start pole 3, HG5, BC2–3, a 7.5K resistor 303, relay coil BC1 and a 6K resistor 309. HG5 also applies +352 v. to neon light 306 via resistor 303 and a 330K resistor 305 and causes it to fire. When the BC1 coil is energized, BC1–4 applies a holding voltage to the BC1 relay coil. Capacitors 308 and 304 increase the speed of the initial current rise by shorting out the 7.5K and 6K resistors during the initial current surge. Capacitor 311 and resistor 312 prevent sparking at the HG5 contact.

Twelve milliseconds later the HG5 contact returns to its normal position, and current flows from +352 v. to ground via start pole 3, HG5, BC1–3, resistor 314, relay coil BC2 and resistor 315. This energizes BC2. A +352 v. potential is also applied to neon lamp 317 via resistors 314 and 316, and the neon lamp fires. Capacitors 319 and 320 increase the speed of the initial current rise by shorting out resistors 314 and 315 during the initial current surge. Capacitor 322 and resistor 323 prevent sparking at the HG5 contact. As soon as relay coil BC2 is energized, BC2–2 closes and applies a holding voltage to the relay coil.

The binary counter may now be considered in its "one" state.

The next keyboard pulse to set delay flop 7 causes the binary counter to pass from its "one" state back to its "zero" state. When HG5 picks up, it connects the voltage source to the lower end of the BC1 coil via BC2–3. However, since the same potential is also applied to the upper end of the BC1 coil through BC1–4, the BC1 coil is therefore without current flow and de-energized. The resistor 309 limits the current drain from the voltage supply. When BC1 drops out, BC1–4 opens the holding circuit for BC1 and BC1–3 prepares a similar shorting circuit for the BC2 coil. When HG5 drops out, the voltage source is applied to both ends of the BC2 coil via BC1–3 and BC2–2. BC2 therefore drops out. BC2–2 opens the holding circuit, and BC2–3 prepares for the next operation. The binary counter is now in its "zero" state and all relay contacts are as shown in the Figures 10A and 10B.

Thus the sequence of operation is:

HG5 energized, BC1 energized,
HG5 de-energized, BC2 energized,
HG5 energized, BC1 de-energized,
HG5 de-energized, BC2 de-energized.

Figure 10C reproduces, for convenience, that section of Figure 5B which shows, as part of the tape move checker, the remaining poles of the BC1 and BC2 relays, each of these two relays comprising four poles altogether.

*Normal forward operation with loop combination*

(Figures 11A, 11B and 12)

When delay flop 3 restores, it triggers delay flop 4 through a differentiator and, through another differentiator, generates a signal to pulse the loop photocells. The new loop combination is transferred into the seven loop channel thyratrons. The appropriate set of relays 1, 2, 3, 4, 5, 6 and 7 are energized. The 10 millisecond interval of delay flop 4 is required for these relays to set up after receiving the pulse from delay flop 3.

When delay flop 3 recovers, a negative-going pulse from the anode of its normally nonconducting tube is applied to the control grid of the inverter triode 350, via coupling capacitor 353, grid resistor 354 and grid stopper 355. This negative pulse cuts off the inverter tube, and a positive-going pulse from its anode is applied directly to the control grid of a cathode follower triode 351. The positive pulse drives 351 into conduction, and a positive-going pulse from its cathode is applied to the T and BE/BB photocells and the control grids of the loop thyratrons via L1–7, L2–7 or L3–7 (depending upon the loop channel which has been energized), photocells 1 through 7 and loop relay contacts 8 through 14.

While cathode follower tube 351 conducts, its cathode rises to +100 v. If no light shines on a given photocell, the grid of its corresponding thyratron rises from −121 v. to −15 v. If one of the seven loop channels, channel 3 for example, is punched on the paper loop and loop 1 (L1) has been selected, a light shines through the punched hole on the paper loop and reduces the resistance of photocell 3 of loop 1, and the grid of its corresponding thyratron rises from minus 15 v. to plus 15 v. This positive-going pulse causes thyratron 3 to fire. As soon as 3 conducts, its anode current energizes the loop channel 3 relay coil and at the same time the neon lamp fires because the anode potential drops.

To select loop L1, the L1 key shown in Figure 12 must be operated. As soon as the L1 switch is closed, the loop 1 relay coil is grounded and +352 volts are applied across the circuit and across neon lamp 703 shown in Figure 12. The current which flows from the +352 v. source through the L1 relay coil to ground energizes the L1 relay. When the L1 relay picks up, relay contacts L1–1 through L1–14 change position. The corresponding effect takes place, if the L2 key or the L3 key is operated. It should be noted, however, that start pole 1 automatically energizes the no loop relay if none of the four loop keys has been operated.

When the BE/BB photocell is energized its resistance decreases. The grid of the BB/BE thyratron then rises from −121 v. to −15 v. when the cathode of cathode follower tube 351 rises to +100 v. This drives the BB/BE thyratron into conduction, if either the BB or the BE microswitch in its anode circuit is closed, and connects the anode to the +352 v. source. When the BB microswitch 364 closes, the anode current of the BB/BE thyratron energizes the BB relay coil, whereas the BE relay coil is energized while the BE microswitch 365 is closed.

As soon as the T photocell is energized, the T thyratron grid rises from −121 v. to −15 v. to fire the thyratron. The anode current of the T thyratron then energizes the T relay coil.

*Loop change*

(Figure 12)

Three control loops can be associated with the typer. Only one loop is ever effective at one time; however, the loop control system can be entirely disconnected.

There are four loop relays: loop one (L1), loop 2 (L2), loop 3 (L3) and no loop (NL), only one of which can be energized at any time. The control buttons which correspond to the four loop relays are similarly designated.

Before any loop button is closed, the ground side of the buttons must be grounded through either 2—3 and 3—5, or NL–5. Otherwise the +352 voltage, which is connected to the other side of the four relays, appears across the resistor in parallel with 2—3 and 3—5. This voltage is coupled to the error line by a capacitor. Whenever the no loop relay or, in combination, the loop channel 2 and 3 relays are energized, the ground return is directly connected to the loop buttons which prevents this voltage from developing. This means that a change to a loop or from one loop to another is permissible only, if the apparatus is either operating on "no loop" or if the loop presently in use shows, in combination, punches in channels two and three. In any other case an error signal results.

Whenever a loop relay changes, the connections between the loop thyratrons and the photocells are changed to the photocells associated with the new loop (Figure 11B). The 5th and 6th poles of the loop relays also shift the motor voltage to the new motor (Figure 9B).

The holding circuits for the loop relay coils are devised so that only one relay can be energized at a time. The principle of the operation can be demonstrated by one example. The NL relay draws current from a +352 v.

source and is grounded through NL–2, L1–2, L2–3 and L3–3. If any one of the latter three relays is energized, one pole of the newly energized relay opens the NL relay circuit while another one of its pole completes the new relay circuit. In summary, each of the four relay coils is grounded through four poles, each of which is controlled by one of the relays including itself.

Whenever transfer to a new loop occurs, one of the poles of the relay corresponding to the new loop connects a pulse into delay flop 2. (See poles L1–4, L2–4 and L3–4 in Figure 7B.) Then delay flop 3 sends a loop set-up signal to the loop photocells (in Figure 11B) to clear the old combination from the loop thyratrons and read in the first combination on the new loop.

To energize any one of the four loop relay coils L1, L2, L3 or NL, the appropriately marked switch must be operated. For example, to energize the no loop (NL) relay coil, the NL switch is to be closed. Closure of the NL switch grounds the upper end of the coil via NL switch and resistors 705 and 706 and current from the +352 v. supply flows through the coil via resistor 708 and energizes the coil. Resistor 708 limits the drain in the supply to the effect that no error signal will result in this case. It should be noted that no resistor corresponding to 708 is to be found in the L1, L2 and L3 circuits in which case an error signal is inevitable under the corresponding conditions. At the same time neon lamp 713 fires. Resistor 710 and capacitor 711, which are connected from the top of the no loop (NL) coil to ground, protect the coil from the inductive surge which occurs when the NL relay drops out.

As soon as the NL relay coil is energized, holding contact NL–2 changes position and grounds the top of the coil via L1–2, L2–3 and L3–3.

*The loop interpreting relays*

(FIGURE 13)

OPTIONALLY AUTOMATIC OPERATIONS

In order to reduce the time required to record input data on the magnetic tape, certain automatic functions have been incorporated into the typer. Some of these functions are completely automatic while others are optionally automatic.

Three different characters are available at any one time for automatic recording. Generally, these characters are symbols for "space," "ignore" and "zero." "Space" is used to separate characters in the final copy, "zero" fills in numerical quantities, while "ignore" produces no effect on the final copy, but fills out unused character positions in a field. By altering an encoding plug-in unit, any of these three characters can be changed to any other characters available in the electrical output system which prints the final copy, and which for convenience, will be called the "printer."

The three characters are represented in the loop by the 4th and 5th channels. Either channel alone can select one of two characters while both channels together determine the third character. The particular significance of 4, 5, or 4—5, is dependent upon the wiring of the encoding plug-in unit.

Each subdivision or field of an item is, in general, fixed in length. The length of each field is usually determined by the length of the longest entry anticipated. If all the entires are of equal length, no problam arises, but when the entries are variable in length, e. g., personal names, the entire field must be filled out. The optionally automatic functions perform this task.

When the last character of the entry has been typed, the typist strikes the control bar. The loop has been previously prepared with the proper optional characters in each position in this field. The typer does not act upon any punches in the 4 or 5 channels until the control bar is struck. Depending on the particular 4—5 relay combination set up in the loop interpreting relays, one of three possible outputs to the encoding plug-in unit is obtained: 4, 5, or 4—5. The plug-in unit excites the proper combination of recording head unit, memories, as shown in Figures 4A and 4B. A recycling pulse also leaves the loop interpreting relays and passes into the loop move checker (Figures 5A and 5B) and from there to the delay flops which advances the loop and tape. The recycling pulse also clears the loop and recording head unit memories. As this pulse emerges from delay flop 4, it re-enters the loop interpreting relays and again examines for a 4—5 combination. If another 4—5 has been set up, the same process is repeated. The optionally automatic function stops either when a loop channel 2 (stop) punch appears or whenever the last 4, 5, or 4—5 combination is reached.

The process by which the optionally automatic functions are performed can be traced in Figure 13. When delay flop 4 resets, a pulse is sent into the loop interpreting relays. The pulse ends at CO–3 and 3—3.

In order to set the optionally automatic system into operation, the typist must close the control bar switch which energizes the control bar (CO) relay. The rise in voltage at the control bar relay is differentiated and passed through 6—5 to the poles of 4—3, 4—4 and 5—2 of the coded digit relays. The 4—4, 5—2 combination sends the pulse as a controlling signal into the recycling line via buffer 122 and BE–2, as shown in Figures 5A and 5B, while the 4—3 pole sends it as a recording signal to either 5—4 or 5—3 depending on whether or not relay 4 is energized. If 4 is energized, then the pulse passes via 4—3 and 5—4 into the 4 input of the encoding plug-in unit. If relay 5 is energized, then the pulse passes via 4—3 and 5—3 to the 5 input. If both relays, 4 and 5, are energized then the pulse passes via 4—3 and 5—4 to the 4—5 input. The plug-in unit sets up the proper combination in the recording head unit memories, as shown in Figures 4A and 4B. If neither 4 nor 5 is energized, the pulse travels via 4—3, 5—3 and CO–4 (the control bar relay has not pulled in yet) to the grid of the error thyratron.

Meanwhile the controlling signal passes as a recycling pulse from the 4—4, 5—2 combination in the loop interpreting relays via buffer 122 into the loop move checker and then to the train of delay flops which advances the loop and tape and clears the loop and recording head unit memories. Since the control bar (CO) relay has not been cleared, the pulse is switched from DF4 to CO–3 via BL–3, 6—4, CO–5, 2—4, ERS–3, SK–3, BS–4 and 2—2. The 4—5 combination is examined again, and if it is still set up, the previously described process is repeated. If the 4—5 combination is not set up, the pulse travels from CO–3 through BE–5, 4—3, 5—3, CO–4 to the clear thyratrons.

The optionally automatic function stops when a loop channel 2 punch appears. When the loop channel 2 relay is energized, the delay flop 4 pulse is passed into the clear (CL) thyratron via BL–3, 6—4, CO–5 and 2—4.

A loop channel 2 (stop) punch should appear in the position following the last 4—5 combination. Each loop combination is read into the loop relay thyratrons during the last operation, but is used to control the next operation.

Thus the stop or channel 2 punch was read into the loop relays during the same cycle that the last optionally automatic character was being recorded. The pulse which caused the tape to advance for the recording emerges from delay flop 4 and finds the loop channel 2 relay energized. In this case the pulse is switched into the clear line via 2—4. However, if another 4—5 combination appears with the stop channel punch, a second operation of the control bar begins the optional automatics again.

In the case of optionally automatic operations a combination of channel 2 (stop) and channel 6 (forced check) punches may appear. Then the channel 2 punch will be effective if the typist makes use of the automatic operations while the channel 6 punch will be effective in the opposite case. A more detailed discussion of the forced check sequence follows the section which deals with the fully automatic operations. The last recirculation pulse of the optional automatics passes to the delay flop chain and examines the loop photocell circuits. If the operator has used the preceding optional automatics, the control bar relay is still energized. CO-1, when energized, withholds anode voltage from the number six (forced check) thyratron (see Figures 11A and 14A). Thus the forced check relay cannot be energized. Pole 2—4 switches the pulse into the clear line as stated above. If the typist then wants to use any new automatic operations which are provided for by the loop, he must strike the control bar.

If the operator has not used the optional automatics for any preceding recording, the control bar relay is not energized, and the loop channel six thyratron is fired to energize the forced check relay. In this case the operator must strike the control bar once to clear the forced check. Then, to initiate the new optional automatics, he must strike the control bar a second time.

FULLY AUTOMATIC OPERATIONS

Whenever one or more digit positions within a field or item are always to be filled with any of the three available channel 4—5 characters, a fully automatic operation can be performed. The loop channel 3 initiates this function. Some combination of the 4 and 5 channels must always appear with the channel 3 punch. After each keyboard operation, the loop interpreting relays examine for the appearance of a channel 3 punch. If one is present, the next character is recorded on the tape without any action on the part of the typist. At the same time a recycling pulse is also generated which is switched into the loop move checker via buffer 122. This pulse eventually operates delay flop 4 in order to set up the next loop combination.

When delay flop 4 restores, a differentiator generates a probing pulse which passes through the loop interpreting relays. As shown in Figure 13, the loop interpreting relays pass the probing pulse from delay flop 4 via BL–3, 6—4, CO–5, ERS–3, SK–3, BS–4, 2—2 to a dead end at 3—3 and CO–3. The probing pulse does not go any further unless an automatic operation has been set up.

If an automatic function is set up, then the loop channel 3 (automatic) relay is energized. In such a case the probing pulse does not stop any longer at 3—3. If neither loop channel 4 relay, nor loop channel 5 relay, nor both loop channel 4 and 5 relays, the coded digit relays, are energized, the pulse goes into the error line via BE–5, 4—3, 5—3 and CO–4. If however, any of these coded digit relays are energized, the pulse passes as a recording signal into the encoding plug and as a controlling signal into buffer 122 (Figures 5A and 5B) as explained above in the case of optionally automatic operations.

FORCED CHECK SEQUENCE

The forced check sequence occurs whenever the loop channel 6 is punched. A hole in the sixth channel of the loop energizes loop thyratron 6 through the operation of photocell 6, as explained in connection with Figures 11A and 11B. This in turn energizes the forced check (6) relay. As a result, the loop interpreting relays are set in such a manner that the typist must operate the control bar before typing additional characters. Otherwise, any new keyboard pulse is switched into the error line by 6—3 as shown in Figures 5A and 5B. Any pulse coming from delay flop 4 passes BL–3, but dead ends at 6—4 which is now open. The character has been recorded, the tape and loop have advanced, but the loop interpreting relays force the typist to operate the control bar before any further typing can be done.

To release the forced check, the operator closes the control bar switch which then connects the control bar (CO) relay to the +352 volt source via BL–2 as shown in Figures 14A and 14B. The initial change in voltage at the top end of the control bar (CO) relay coil is transmitted via a differentiator to 6—5 as shown in Figure 13. The forced check (6) relay is still energized, and so the pulse passes 6—5 to a junction point connecting the pole of 6—4 to CO–5 and from there through 6—4 to the clear line. Since this pulse occurs before the control bar (CO) relay has had time to pick up, the pulse passes also through ERS–3, SK–3, BS–4, 2—2 to 3—3 and CO–3, where it dead ends because CO–3 and 3—3 are both open. The significant action has been to excite the clear (CL) relay. When the control bar (CO) relay is completely energized, CO–2 provides a holding circuit for the control relay, as shown in Figures 14A and 14B. In addition, CO–1 provides current for the clear relay and disconnects at the same time the loop channel 6 thyratron from its voltage source, as shown in Figures 11B and 14B. As a result, the loop channel 6 (forced check) relay drops out. However, as soon as the clear (CL) relay is energized, CL–1 changes position and thereby removes the voltage from the control bar relay. CO–1 returns to normal position and in turn, clears the clear relay. The relays are back in normal position, and the next character can be typed on the keyboard.

CLEARING OPERATION

When the clear relay thyratron, as shown in Figures 14A and 14B and which is biased at −31 volts, is fired by an incoming probing pulse, it draws anode current from a +100 v. source through resistor 606, the clear relay coil, and resistor 607. However, this anode current is not sufficiently large to energize the clear (CL) relay coil, yet large enough to maintain conduction in the tube. If any one of the relay contacts BL–2, REV–1, SK–1, or CO–1 changes position, then the +352 v. source is connected to the top of the clear (CL) relay coil. This, in turn, causes the clear relay thyratron to draw more anode current which energizes the coil. CL–1 then changes position to remove exciting voltage from the blanking (BL), erase (ERS), backspace (BS), skip (SK) and control bar (CO) relay coils to de-energize them. If both the backspace (BS) and erase (ERS) relays are de-energized, the exciting voltage is also removed from the reverse (REV) relay (Figures 14C and 14D). Thus the contact which energized the clear (CL) relay drops out causing, in turn, the clear (CL) relay to de-energize. The inductive kick developed in the clear (CL) relay coil appears at the anode of the thyratron to extinguish it.

ERROR-ERASE SEQUENCE

When certain errors occur, a pulse is switched into the error (ERR) thyratron. Figure 16A shows eleven different sources of the error signal.

The first six sources of error signals may be found in Figure 5A. There is first a signal coming through gate 125 from the typing rate limiter, if the typing rate is less than 65 milliseconds per character. The second signal comes from BE–2 in case the typist tries to type a new character at the time of a block ending. The third error signal is sent out from 6—3 whenever the typist tries to type a new character without using the control bar in case the forced check relay (6) is energized. The fourth and fifth signals are coming from the loop move checker and tape move checker, respectively, if either the loop or tape have not moved properly. The sixth and last source of an error signal shown in Figure 5A is the timing relay pole TR–5 which operates whenever the printing rate of the "printer" cannot keep up with the speed of any automatic operations on the part of the "typer."

An error signal may also come from gate 153 as shown in Figure 6A which operates as part of a spurious pulse detector.

Another outlet into the error line is to be found in Figure 12 which shows the loop selection relays. The combination of punches in loop channel 2 and 3 is a signal for the typer to permit a change to another loop by the operator. If the operator tries to change loops without the combination of punches in loop channels 2 and 3, or without the no loop (NL) relay being energized, a signal goes into the error line.

The loop interpreting relays shown in Figure 13 have in pole CO–4 an outlet into the error line which operates in two cases: if the loop channel 3 (automatic) is energized, but neither the coded digit loop channels 4 or 5, or 4 and 5, nor loop channel 2 which, in combination with the loop channel 3, permits the change from one loop to another, and if the control bar is used without the loop channel 6 (forced check) being energized. In the latter case the pulse passes through CO–4 before the control bar (CO) relay has had time to pick up.

Figures 14A and 14B show two more sources of error signals. Pole 6—6 sends a signal into the error line, if the skip key is used at a time when the forced check relay is energized and the operator did not use the control bar previously. Pole BE–6 establishes a connection to the error line, if the operator uses the skip key at a time when the ending of a block has been reached.

The error thyratron is fired by a positive-going pulse which is applied to its control grid having a coupling capacitor 403 and a resistor 404 as shown in Figure 16B. As soon as this tube conducts, its anode current energizes the error relay coil. The error relay is cleared either, during operations, through ERS–1 or, before the beginning of operations, through start pole 5, both of which apply a +350 volt charge from capacitor 407 to the cathode of the error thyratron.

As soon as the ERR relay is energized, the ERR–6 pole lights a red light, as shown in Figures 14A and 14B. ERR–2 clears any combination set up in the recording head unit memories, as shown in Figure 4B. ERR–1 prevents the keyboard controlling pulse from setting delay flop 8 and stepping the motors. ERR–3 prevents the pulse from entering the delay flop 2, 3 and 4 chain. Both ERR–1 and ERR–3 are shown in Figure 6A.

If the typer is connected to a "printer," the two poles ERR–4 and ERR–5 keep the "printer" from typing information.

The same effect is obtained through the poles 7—3 and 7—4 if and when the loop channel 7 (printer suppressor) relay is energized for the purpose of omitting certain information from the printed copy.

The error (ERR) relay is released by the erase (ERS) key. When the erase key is closed, the erase (ERS) relay is energized, as shown in Figures 14A and 14B. ERS–2 closes the holding circuit. ERS–1 connects a positive pulse to the cathode of the ERR thyratron which cuts the tube off and de-energizes the error relay, as shown in Figure 16B. ERS–3, as shown in Figure 13, opens a path to NL–6 which, if the typer is operated on no loop, switches the pulse into the clear line. In such a case the erase action stops after one digit has been erased. ERS–5 actuates a carriage return in the "printer," if such printer is connected, while ERS–6 prevents any printing operations, if such connection exists. The ERS–4 pole, energizes the reverse (REV) relay, as shown in Figures 14C and 14D.

When the reverse (REV) relay is energized, poles REV–3, REV–4, REV–5 and REV–6, as shown in Figure 9B, change position and cause the loop and tape motors to reverse. In addition to that, a specific effect is to be noted in regard to the backward rotation of the tape motor which takes place before the delay flops 8 and 7 and the mercury relays HG1, HG2 and HG3 inaugurate the main backward motion of the tape and loop motors. When REV–5 and REV–6 change position, the direct current supplied to one of the two stator windings of the tape motor via HG3 and REV–6 is shifted to the other stator winding via HG3 and REV–5 which rotates the motor backward from one stator winding to the second winding, i. e., for one fourth of a cycle. The same one fourth rotation takes place in the opposite direction when the reverse relay is de-energized. The purpose of the ¼ cycle displacement is to guarantee complete erasure. When the tape is reversed, the current in the recording head coils erases whatever has been recorded. The recording head currents remain unchanged so that all points along each channel are completely erased even though the reverse motion is discrete. However, the ¼ step, which is also ¼ pulse length on the recording, is inserted to insure that the erasure of the last recorded character before returning to forward direction is complete. Since the last ½ pulse length of any recorded pulse is equivalent to erasure, the ¼ pulse intrusion is not detectable.

While the tape motor is reversed through the interchange of the two field coils, as explained above, the loop motor is reversed by changing the polarity of the capacitor charging voltage. When the HG3 relay is energized, the direction of the current in the directly connected field of the loop motor is the same as in forward operation. However, capacitor 518, as shown in Figure 9B, being oppositely charged, provides a current in the opposite direction, thus driving the loop motor through a cycle in the reverse direction.

At the same time REV–2 closes a pulse generating circuit to delay flop 5, as shown in Figures 15A and 15B, and as explained in detail in connection with the skip (SK) operation. The delay is inserted in order to allow the transients of the ¼ cycle shift to die out before moving tape or loop. When delay flop 5 resets after 30 milliseconds, a pulse is buffed via buffer 652 (Figure 15B), pole BB–6 (Figure 13) and the recycling line 235 into the loop move checker and to the chain of delay flops. The motor control relays HG1, HG2 and HG3 are energized during the normal chain of delay flop operations, and the loop and tape motors are pulsed.

As the tape is stepped backward, the current in the recording head coils erases whatever has been recorded on the tape. The erase action is automatic, once it has been initiated, and continues until one of the following two signals occurs:

(1) A stop signal, if loop channel 2 has been punched;
(2) A block beginning (BB) signal, if loop channel 2 has not been punched between the error and the last block beginning.

The action of the delay flops is identical to that for forward motion. Delay flop 3 generates a photocell probing pulse which examines the loop combinations, as shown in Figure 11B. The reset side of delay flop 4 generates a pulse which passes through the loop interpreting relays (Figure 13) via BL–3, 6—4, CO–5, ERS–3, NL–6 and through BE–3, BB–4, 2—6 and the recycling line 235 to the loop move checker. This pulse follows the same path as the pulse from delay flop 5 or from the keyboard when it has reached the loop move checker. The erase action is automatic once it has been initiated.

Since all the combinations of the loop are read during reversal, the effect of the various channels must be examined. The only loop interpreting relay poles through which the pulse passes on its way to the recycling line 235 are 6—4 and 2—6. The 6 relay is the forced check relay. It cannot pick up because the anode supply to the loop channel 6 thyratron is cut off by REV–1, as shown in Figures 11B and 14B. If there is a punch in loop channel 2 (stop), the loop channel 2 (stop) relay causes the pulse to be switched to the clear (CL) relay via 2—6. If there is no punch in loop channel 2 (stop), then the reverse operation goes all the way back to the beginning of the block at which time the block beginning (BB) relay becomes energized. As a result, BB—4 switches the recycling pulse into the clear line to excite the clear (CL) relay for which REV–1 provides the connection to the +352 volt source, as shown in Figures 14A and 14B.

The clear relay, when energized, opens the CL-1 pole and clears the erase (ERS) relay. This, in turn, de-energizes the reverse relay since ERS-4 removes the energizing voltage from the reverse relay coil, as shown in Figures 14C and 14D. When the reverse relay drops out, REV-1 returns to normal and thus clears the clear (CL) relay by removing the anode supply, as shown in Figures 14A and 14B.

When erasure is terminated through a loop channel 2 punch, and loop channel 3 shows also a punch, no automatic action is re-initiated by the loop channel 3 punch since the combination of loop channel 2 and 3 punches permits a change from one loop to another, but does not inaugurate automatic operations. However, when the block beginning (BB) relay terminates erasure, the BB-3 pole, as shown in Figure 13, switches the same pulse, which triggers the clear (CL) relay, into delay flop 2 and from there into delay flops 3 and 4. This leads to a clearing of the tape and loop combinations and to a re-reading of the loop. If a loop channel 3 (automatic) punch should be found, automatic operation is re-initiated.

BACKSPACE (BS) OPERATION

A single character may be erased by operating the backspace key, whenever the typist types a wrong character. The backspace operation causes the loop and type motor to backspace loop and tape one character. The typist may then type the correct character.

When the backspace key is operated, the +300 v. charge from capacitor 603, as shown in Figure 14B, which goes through the erase (ERS) key in its normal position, is applied through the backspace relay coil and contact BL-1, as shown in Figure 4B, to ground. As soon as the backspace relay is energized, holding contact BS-2 connects the upper end of the relay coil to the +352 v. supply via CL-1, as shown in Figure 14B.

The BS-5 pole, as shown in Figure 14C, energizes the reverse (REV) relay. The operation of the reverse (REV) relay and its poles has been described hereinabove and the effects are identical with the effects of its operation in the case of erasing.

The basic difference between backspacing and erasing becomes apparent as soon as the probing pulse coming from delay flop 4 is examined by the loop interpreting relays in Figure 13.

When the probing pulse leaves delay flop 4, it is passed via BL-3, 6—4, CO-5, ERS-3, SK-3 to BS-4. Thence the pulse is passed to 3—4 by BS-4, and from there it is switched via the clear line into the clear relay. The clear line restores all circuits to normal condition, and the typist may then enter the correct character.

If the backspace key is operated at a time when the last recording was automatic, then the 3—4 pole in Figure 13 switches the pulse through BE-3, BB-4, 2—6 and the recycling line 235 to the loop move checker. Via this path the backspace cycle is made repetitive until there is no more punch in loop channel 3 (automatic), i. e., until the last preceding "typed" character is erased. Then the pulse from delay flop 4 finds the 3—4 pole in its normal position and is switched from there into the clear line.

If the backspace (BS) key is operated at the end of an automatic sequence which starts from block beginning, the tape and loop backspace to the block beginning point. Here the block beginning (BB) relay picks up. BB-4, as shown in Figure 13, passes the probing pulse into the clear line to clear the backspace relay and terminate the backspace operation. BB-3 sends the pulse from the clear line back to delay flop 2 and the delay flop chain. Since the first loop combination is an automatic function, the loop channel 3 (automatic) relay cycles the loop and tape forward to the point where the automatic characters end and backspace began.

The backspace relay remains energized until the operation has been completed. Therefore, if the backspace key is depressed again before the operation is complete, no new pulse enters the circuit. This limits the frequency of backspacing.

SKIP (SK) OPERATION

The skip (SK) function causes the loop and tape to advance over a field, by-passing all loop signals, except loop channel 2 (stop), but recording all sprocket pulses and "ignore" symbols on the tape. The rate of the skip (SK) operation is 20 characters per second. When the skip (SK) key is struck the interpreting relays are set up in such a fashion that the pulse is switched from the loop interpreting relays into the skip input of the plug-in unit, and into the sprocket channel. The same pulse also re-enters the loop move checker to repeat the cycle a second time. The cycle continues to repeat until the stop relay is energized by the appearance of a hole in loop channel 2.

When the SK button is closed, the SK relay is energized, unless there is an unreleased forced check. If the skip function is initiated before releasing the forced check, an error is generated. In the latter case 6—6 switches the pulse into the error relay, as shown in Figures 14A and 16A. On the other hand, a forced check (loop channel 6) cannot intrude once the skip relay is in operation since SK-1 removes the anode potential from the loop channel 6 thyratron, as shown in Figures 11B and 14B.

An error signal results, also, if the operator uses the skip key at a time when the ending of a block has been reached. Then pole BE-6 switches the pulse into the error line, as shown in Figure 14B.

When the skip switch is operated, the upper end of the skip (SK) relay coil is connected to a +352 volt source via 6—6, BE-6, SK-switch and BL-2, as shown in Figures 14A and 14B. As soon as the skip (SK) relay coil is energized, SK-2 closes the holding circuit through CL-1. The SK-5 pole, as shown in Figure 15B, changes position, and capacitor 654, which has been charged to +350 volts through resistor 655, discharges and sends a positive-going pulse to the control grid of the normally nonconducting tube of delay flop 5 via resistor 657. The positive pulse drives this tube, which is biased at +20 v., into conduction and sets delay flop 5. Capacitor 659 and resistor 660 form a network which has a time constant such that delay flop 5 restores itself 30 milliseconds after it has been set.

As soon as delay flop 5 restores, the anode potential of its normally nonconducting tube rises from +30 v. to +350 v., and a positive-going pulse which has a swing of +320 v. is applied to the control grid of buffer tube 652, via coupling capacitor 662 and resistor 663. This positive-going pulse drives 652, which is biased at —21 volts, into conduction. As soon as 652 begins to conduct, its cathode potential rises from ground; and this positive-going pulse passes through capacitor 665 and BB-6 to the recycling line 235 and into the loop move checker, as shown in Figures 13 and 5B. From there the pulse passes through the tape move checker to delay flop 6 which sends a sprocket pulse to the sprocket thyratron, as shown in Figure 6A. At the same time the signal enters the delay flop chain. From delay flop 4 the output pulse passes through BL-3, 6—4, CO-5 and ERS-3 to SK-3, as shown in Figure 13. The pulse is switched at SK-3 through BE-3, BB-4 and 2—6 to SK-4 which switches the pulse into the encoding plug. The same pulse also re-enters the loop move checker through recycling line 235, to begin the cycle a second time. The cycle continues to repeat itself until a stop channel punch energizes the loop channel 2 relay.

When a stop punch (loop channel 2) appears, the pulse from delay flop 4 is passed via 2—6 into the clear (CL) relay. When the clear (CL) relay is energized, CL-1 opens and de-energizes the skip (SK) relay. Similarly, SK-1, which supplies the anode potential to the clear (CL) thyraton, opens when the skip (SK) relay is deenergized. Both CL–1 and SK–1 are shown in Figures 14A and 14B.

*Blanking (BL)—Block beginning (BB)—Block ending (BE)*

The block length is 60 "words" or 720 machine digits. As the 720th character is typed the block ending (BE) relay is energized by action of the microswitch and tape disc. The block ending (BE) relay therefore changes position.

A blank section must be left on the tape between each block of information to allow stopping and restarting whenever the tape is used later on in connection with the electrical computer system and the like. The blank section is equal to the length of four words or forty-eight machine digits. A digit counter continuously indicates the number of digits and words recorded at any time.

Figures 21 and 22 show the tape center drive mechanism. There are four gears 752, 753, 754 and 755, which establish a 1:16 gear ratio between two numbered discs, the tape disc 757 and the block disc 758. The tape disc is fixed to the tape drive hub. It has twenty-four holes around its periphery. The drive motor connected to the tape disc advances 1/48 of a revolution per character. The holes 760 in the tape disc are so arranged that they align themselves with the tape (T) photocell 761, also shown in Figure 11B, with every other character. Since there are twelve characters per "word," the tape disc makes one revolution every four words. The block disc therefore makes one revolution every sixty-four words. One revolution of the block disc equals, therefore, the length of one block (60 words) plus the subsequent blanking space (four words). Attached to the block disc are two cams, 764 and 765, each of which engages a microswitch. They are the BE and BB (Block Ending and Block Beginning) microswitches 365 and 364, respectively, also shown in Figures 11A and 11B. The cams are so shaped that the microswitches close and open within one revolution of the tape disc. The BB/BE photocell 767, also shown in Figure 11B, is associated with the tape disc, which contains one additional hole 762 placed inside the circle of twenty-four holes. When hole 762 aligns itself with the BB/BE photocell during the revolution in which one of the two microswitches also is closed, the appropriate relay, block ending (BE) or block beginning (BB) is energized.

The block ending microswitch 365 is switched during the fifty-eighth word by cam 764 while the BB/BE photocell is activated through hole 762 at the end of the sixtieth word. This, in turn, energizes the block ending (BE) relay. During the sixty-second word, the block ending microswitch returns to its normal position and cuts off the anode voltage of the block ending (BE) relay as shown in Figure 11B. During the sixty-third word, cam 765 switches the microswitch 364 while the BB/BE photocell is activated again through hole 762 at the end of the sixty-fourth word. During the second word in the new block microswitch 364 returns to normal position and cuts off the anode voltage of the block beginning (BB) relay as shown in Figure 11B. A timing chart of the operations of the cams is given in Figure 23.

When the digit counter reads one and the word counter reads 60, block ending (BE) occurs. The block ending relay is picked up, which lights a blue BE indicator lamp on the front panel. The operator must then strike the blanking key, which picks up the blanking (BL) relay. This relay grounds any keyboard operation pulses which may occur and prevents the loop from advancing. Blanking continues for four words or forty-eight machine digits. The blanking process is terminated when the block beginning (BB) relay picks up. The typist can then record the first character of the next block.

BE–1, shown in Figures 4A and 4B, closes the circuit which lights the blue indicator light. It also opens the cathode circuits of each of the recording head unit memories, thus preventing any further combinations from setting-up. The BE–2 pole, shown in Figures 5A and 5B switches any new keyboard operation pulse into the error line. In the case of a skipping operation, BE–3, shown in Figure 13, switches the last pulse coming from the delay flop chain (DF2, DF3 and DF4) into the clear line. BE–5, also shown in Figure 13 right above the coded digit relays, opens the circuit to prevent the automatic recording of a character. BE–4 and BE–6, shown in Figures 14A and 14B, when energized, disconnect the blanking key and the skip key from their voltage source, respectively.

Since the block ending (BE) operation can occur at any time within a field, the operation in process when block ending (BE) occurs must be be held up for the blanking operation, and, if there was an automatic function, it must be re-initiated after blanking.

When the blanking key is struck, BL–7, shown on Figures 14A and 14B, closes a holding circuit which must also pass through CL–1. BL–1, shown on Figures 4A and 4B, passes any keyboard operation pulses which may occur to ground and opens also the cathode circuit of the tape memory thyratrons. BL–2, as shown in Figures 14A and 14B, applies +352 volts to the clear (CL) relay. BL–4 and BL–6, shown on Figures 9A and 9B, open the drive circuit for the loop motors, since the loop does not move during blanking. BL–6 applies a low holding voltage to whichever loop motor is operative. BL–5, shown on Figures 5A and 5B, causes a capacitor to discharge into the loop move checker. This discharge generates a pulse which passes through the chain of delay flops and advances the tape. When this pulse leaves delay flop 4, it passes via BL–3 and BB–2, both shown on Figure 13, to T–3. T–3 is found at the entrance into the tape move checker, shown in Figure 5B. From there the pulse goes back into the delay flop chain, and the process is repeated until the block beginning (BB) relay picks up.

During each cycle, all the photocells are pulsed, but only the BB/BE and T photocells perform a significant function. The tape disc alternately energizes the T-relay through the T photocell. (The binary counter keeps also functioning during blanking, thus verifying the motion of the tape at each advance.) Any loop combination which may be opposite the photocells during blanking, triggers the loop channel thyratrons. However, the BL–3 pole at the output of delay flop 4, as shown in Figure 13, switches all pulses to T–3 rather than through the loop interpreting relays. The operation of the loop thyratrons is, therefore, ineffective during blanking.

The blanking (BL) relay remains energized for one revolution of the tape disc which corresponds to 4 words or 48 characters. During this revolution of the tape disc, the block ending (BE) microswitch 365 is opened and the block beginning (BB) microswitch 364 is closed, as shown in Figure 11B. When the BB/BE photocell is pulsed at the completion of the one full revolution of the tape disc, the block beginning (BB) relay picks up.

The block beginning (BB) relay clears the blanking operation and initiates any automatic function which may have been in effect when block ending occurred. BB–2, shown on Figure 13, switches the pulse from delay flop 4 to the clear relay. When the clear relay (CL) is energized, it clears the blanking (BL) relay by opening CL–1, shown on Figures 14A and 14B, which removes the holding voltage from the blank relay coil. In turn, the blanking (BL) relay, when de-energized, clears the clear relay by reversing pole BL–2, as shown on Figures 14A and 14B. BB–3 shown on Figure 13, switches the delay flop 4 pulse into delay flop 2. The delay flop train clears the tape and loop unit memories and probes the photocells for the combination next to be performed. If this combination includes an automatic function, then the pulse from delay flop 4 is directed through the loop interpreting relays to the encoding plug-in unit. If the back space (BS) or erase (ERS) key is depressed, when the typer is at a block beginning, the reverse (REV) relay is energized, and REV–2, shown on Figures 15A and 15B, sets delay flop 5. Thirty milliseconds later the recovery pulse from delay flop 5 is switched into the clear line via BB–6, shown on Figure 13. The clear relay pulls in to de-energize the back space (BS) or erase (ERS) relay. Thus, the tape is not stepped back into the blanking area. Once the blanking operation is begun, there is no way of returning to the previous block. Pole BB–4, shown on Figure 13, switches the pulse, which cycles during erase, into the clear relay when block beginning occurs. At block beginning BE–3, shown on Figure 13, switches the pulse which circulates during skip into the clear line. Thus, the erase or skip operation is limited to no more than one current block.

BB–6 and SK–6, both shown on Figure 13, prevent an attempt to start an erase action at block beginning by sending the delay flop 5 pulse into the clear line. If there is a new skip pulse from delay flop 5 at block beginning, SK–6 sends such pulse into the recycling line 235.

Pole BB–5, as shown in Figure 12, lights a green indicator light on the front panel.

*Take-up and rewind control*

(Figures 17, 17A, 18 and 19)

A take-up and rewind circuit is provided to take-up the tape pulled over the magnetic head by the center drive motor during forward travel of the tape, to step tape backwards when necessary and to rewind the tape after a run has been completed. The rewind speed is higher than the forward speed.

The take-up rewind (TRW) switch, as shown in Figure 17, consists of six mechanically interconnected contacts out of which TRW–2, in the take-up position, applies +76 volts to the recording heads, while TRW–1, in the corresponding position, applies +150 volts to the tape thyratron anode circuits, as shown in Figure 4B. The same current flows through the recording head both during forward travel of the tape and during backspacing or erasing. During rewind, however, the writing circuits are de-energized to prevent any erasing of the recording on the tape.

The tape recorder assembly contains two reel motors, a center drive motor and the recording head mounted on a single panel located in the upper half of the tape recorder frame (Figure 18). Figure 18 shows also a housing 454 for the BB/BE and T photocells mentioned before in connection with Figure 11B.

The reeling system is a mechanical servo. Each reel mount has a band type brake system which automatically applies or releases the brakes whenever the associated loop of tape grows or shrinks beyond preassigned limits (Figure 19). During normal writing operations the right-hand reel motor is continuously supplied with power, but is held by the brake hand until required to reel in the tape. The left-hand reel motor is not energized, except during continuous back stepping. During rewind the brake bands automatically release because the two brake drums rotate in the reverse direction, away from the spring loaded ends 460 of the two brake bands.

Power is applied to both the left-hand and right-hand reels during rewind. Before rewind the center drive pulley must be released from the motor shaft by unscrewing the small knurled locking knob 456 (Figure 18). The tension is maintained on the tape during rewind because the right-hand motor turns the right-hand reel through a gear ratio of 3:1 while the left-hand motor turns the left-hand reel through a direct drive. Rewind takes place at a rate of fifty feet per second.

The right-hand loop of tape determines the position of a floating pulley, called the brake pulley, associated through a tension cord with the brake on the right-hand reel (take-up) motor (Figures 18 and 19). As this loop of tape increases in size, the brake releases to allow the right-hand motor to take up tape. As the motor shortens the loop, the brake is applied to slow down and finally stop the right-hand motor. If the right-hand loop becomes too short, the microswitch MS3 closes to reverse the connections to the right-hand reel motor which then plays out more tape into the loop. The left-hand loop positions a similar brake pulley and brake for the left-hand motor.

Not more than 50 blocks of data can be recorded on a 200 foot tape. To prevent more than the proper amount of tape from passing over the head, rubber bumps are fastened to the end of the tape. The tape passes between a pulley and a post 452, as shown in Figure 18, which are far enough apart to clear the tape, but are too close together to allow the rubber bumps to pass through. When the bumps jam, the left-hand loop shortens until the microswitch MS4 operates (Figure 19). This switch removes power from the center drive and lights the No Tape indicator (Figure 17A).

The take-up rewind switch contact TRW–6 applies in its take-up position power to the capacitor winding of the right reel (take-up) motor through RW1–3, RW1–4 and RW2–3, and to the resistor winding through resistor 272, as shown in Figure 17. No power is supplied during take-up for the left reel motor, except in the case that there is too much tape between the left-hand reel and the center drive. Then the left-hand brake pulley, as shown in Figure 18, moves to the left, and the brake lever operates microswitch MS2 (Figure 19). As a result, current flows through MS2, as shown in Figure 17, to both windings of the left reel motor causing the motor to rotate for a short time in the rewind direction until the automatic brake is applied.

When the take-up rewind switch contact TRW–3 is moved to take-up position, it disconnects capacitor 260 from the rewind relay coil RW1, and capacitor 260 charges to +352 volts, as shown in Figure 17. When the TRW switch is returned to rewind position, capacitor 260 discharges through TRW–3 and the RW1 coil to ground. The rewind relay RW1 pulls in. In its new position pole RW1–1 shunts the one megohm charging resistor 264 with a 10K resistor 265. This supplies holding current for RW1. At the same time pole RW1–5 disconnects the rewind relay coil RW2 from capacitor 261, and this capacitor charges to +352 volts. RW1–2 applies power to both windings of the left reel motor. RW1–3 and RW1–4 reverse the connections to the capacitor winding of the right reel motor. Power to this winding is supplied through TRW–4, RW1–2, MS2, and TRW–5. Power for the resistor winding is applied through TRW–4, RW1–2, MS2, resistor 271, TRW–6 and resistor 272. The motor runs at 1800 R. P. M. in the reverse (counterclockwise) direction. Due to the 3:1 gear ratio of the right hand motor the tape reel runs only at 600 R. P. M.

When the tape rewinding is completed, the rubber bumps at the end of the tape close the "bump detector" microswitch MS1, as shown in Figures 17 and 18. As a result, the +352 volt source is grounded through resistor 266 (100 ohm). RW1 drops out, and capacitor 261 discharges through RW1–5. This energizes the rewind relay coil RW2 for several seconds. RW1–2 removes rewinding power from both motors. But RW2–1 and RW2–2 supply take-up power momentarily for the right-hand motor to stop its motion completely by applying reverse power. RW2–3 increases the capacitance on this motor from 16 µf to 28 µf. When 261 has discharged, RW2 drops out, and all power is finally removed from the motor.

When backspacing or erasing the center drive pulls tape from the right-hand loop. As this loop shortens, it applies the brake on the brake drum and then closes microswitch MS3 (Figure 19). MS3 energizes the rewind relay RW1 which reverses through its poles RW1-4 and RW1-3 the rotation of the right-hand reel motor, as shown in Figure 17. Since the motor pulls against the spring loaded end 460 of the brake band, it can operate. After sufficient tape has been passed into the loop, MS3 opens and the relay RW1 drops out.

As the left hand loop receives tape, the brake pulley moves to the left and the brake lever closes microswitch MS2. This applies power to the left-hand motor causing it to take up the slack. As the loop shortens, MS2 opens, and normal take-up conditions are restored.

START SWITCH

Many typer circuits have two stable states. When power is first turned on, these circuits may assume either state. Before the typer can be operated from the keyboard, these circuits must be set in a specified "normal" state. The start switch performs this function. Its operation will be described according to pole numbers.

Pole 1, as shown in Figure 12, energizes the "No Loop" relay.

Pole 2, not shown on any drawings, sends a signal into the electrical output system, if such system is connected to the typer, to insure that all "printer" thyratrons are cleared before any typing is begun.

Pole 4, as shown in Figures 6A and 6B, generates a pulse which is fed to buffers 169 and 170. One output of 170 triggers delay flop 8 to operate the stepping circuits. These circuits step the tape motor one digit. The output of buffer 169 sets delay flop 2 to energize HG6, the loop clear relay. HG6 clears any loop thyratrons which might be fired. When delay flop 2 restores, it sets delay flop 3. During the time delay flop 3 is set, HG4, the tape clear relay, is energized. HG4 clears any tape thyratrons which might be fired. When delay flop 3 restores, a pulse is sent to read the photocells. Since the typer is on "No Loop," the only photocell circuits which can operate are the T and BB/BE circuits.

Pole 5, as shown in Figures 16a and 16B, clears the error (ERR) thyratron and also de-energizes the timing (TR) relay in the "printer," if such electrical output system is connected to the typer. It insures, furthermore, that the "printer" is in a position to accept any recording signal from the typer and convert it into print.

Pole 6, as shown in Figures 14A and 14B, sends a positive pulse to the grid of the clear (CL) thyratron, while pole 3 of the start switch, as shown in Figures 10A and 10B, supplies 352 volts for its plate and so fires the clear (CL) thyratron which pulls in the clear (CL) relay. The contact of the clear (CL) relay clears the skip (SK), blanking (BL), backspace (BS), erase (ERS) and control bar (CO) relays, if they are energized. When pole 3 of the start switch is in its normal position, it applies +352 volts to HG5, the binary counter relay. The operation of the start switch cuts that power off.

Whether the typer is operating on "no loop" or on any loop, all the other circuits with the exception of two have a "normal" or de-energized position. The two exceptions are the tape (T) relay and the binary counter (BC). These circuits have a normal position only with respect to each other and the digit disk. For instance, when the digit disk reads "3," an odd number, the binary counter (BC), should be in its "one" state, and the tape (T) relay should be "on."

Normally, the binary counter will switch from one state to the other only when HG5 is operated. However, start switch pole 3 removes power from the HG5 contact, and the binary counter (BC) cannot switch therefore. The operation of the start switch will step the digit disk and read the T photocell without switching the binary counter (BC).

Then two situations may arise. The binary counter (BC) and the tape (T) relay may be in a corresponding state, and everything is set for the operation of the typer. If they are not in a corresponding state, however, an error signal coming from the binary counter relays in Figure 5B will result from any keyboard operation, and the start switch has to be pulled a second time. This time the binary counter (BC) and the tape (T) relay are automatically put in a corresponding state.

TIMING RELAY

The timing (TR) relay is a part of the electrical output system which, for convenience, has been called the "printer." A suitable form of such a "printer" is disclosed and claimed by Louis D. Wilson, Herbert Frazer Welsh and John Presper Eckert, Jr., in patent application Serial No. 279,711, filed March 31, 1952, entitled Information Translating Apparatus. If and when the typer and the printer are interconnected, three poles within the typer operate as members of the timing relay within the printer in order to synchronize the operations of the two electrical systems. TR-2, as shown in Figure 5B, applies, when energized, —51 volts to delay flop 1 to jam it into the set position. TR-4, as shown in Figure 7B, opens the circuit between delay flop 3 and delay flop 4. TR-5, as shown in Figures 5A and 5B, opens the circuit between the tape move checker and delay flop 6.

TIMING CHARTS

The timing charts given in Figures 24A, 24B, and 25 show the absolute and relative operating time of the individual devices both within normal operations and within the error-erase sequence.

POWER SUPPLY

The power which is needed for the operation of the typer or its individual parts may be taken from the supply sources which are generally available.

What is claimed is:

1. In combination, an information translating apparatus, including a data transforming and recording system comprising a magnetic recording device and a carrier for magnetic recordings, wherein said carrier is an elongated member, comprising a storage device adapted to supply said elongated member, a controllable apparatus restraining said device from supplying said elongated member, a sensing device adapted for control by a portion of said elongated member and controlling the operation of said controllable apparatus, a second storage device for said elongated member, an apparatus normally urging said second storage device to take-up said elongated member, a restraining device normally restraining said storage device from taking-up said elongated member, and a control system governed by a portion of said elongated member controlling said restraining device.

2. In combination, an information translating apparatus, including a data transforming and recording system, comprising a keyboard having a plurality of information and control keys, the operation of any one of said information keys producing an information signal and a control pulse, a magnetic recording device and a carrier for magnetic recordings, means for delivering said information signal from said keyboard to said recording device, automatic control means operative in response to said control pulse to cause said recording device to record said information signal on said carrier, selective control apparatus coupled to said automatic control means and to said recording device adapted to selectively regenerate said control pulse and to selectively impress an information signal on said recording device independently of the operation of any of said information keys, said selective control apparatus further including means responsive to the operation of said control keys for inhibiting the operation of said selective control apparatus, a medium for carrying control instructions, a sensing device for reading said control instructions, a storage device for storing said control instructions connected to and responsive to signals from said sensing device, and connections from said storage device to said selective control apparatus whereby the operation of said selective control apparatus is governed by the instructions contained on said medium.

3. The combination according to claim 2 comprising, a plurality of media carrying control instructions, a plurality of links, each of said links connecting one of said media carrying control instructions to said selective control apparatus, and a device selectively conditioning one of said links for operation and simultaneously disabling the other links in said plurality of links, said last named device being responsive to signals supplied by said one medium which is operatively connected to said selective control apparatus.

4. The combination according to claim 2 wherein said automatic control means comprises a control device for checking the motion of said medium carrying control instructions, connections from said storage device to said control device, and an error circuit for disabling said automatic control means coupled to said control device, said control device being responsive to a constant alternation between two variations in the number of signals simultaneously transmitted by said storage device and switching said control pulse into said error circuit in the absence of such alternation.

5. In combination, an information translating apparatus, including a data transforming and recording system, comprising a keyboard having a plurality of information and control keys, the operation of any one of said information keys producing an information signal and a control pulse, a magnetic recording device and a carrier for magnetic recordings, means for delivering said information signal from said keyboard to said recording device, and automatic control means operative in response to said control pulse to cause said recording device to record said information signal on said carrier, wherein said automatic control means comprises, a control device for checking the motion of said carrier, a device for sensing the motion of said carrier, and a bistable state device and an error circuit for disabling said automatic control means coupled to said control device, and wherein said control device is connected both to said sensing device and said bistable state device and jointly responsive to signals from said sensing device and the change of state of said bistable state device and switching said control pulse into said error circuit in the absence of a predetermined relationship between the signals from said sensing device and the state of said bistable state device.

6. The combination according to claim 5 wherein said automatic control means include two two-state (set and restore), unistable state (restore) devices, each of said devices having a specific predetermined time for returning to its stable state after actuation to its other state and producing an output in each state said two unistable state devices being connected in a chain, wherein the first device in said chain is actuated to its other state by said control pulse, and the second device in said chain is actuated to its other state by the return of the first device to its stable state; said combination also comprising, medium carrying control instructions, a sensing device for reading said control instructions, a first motor for moving said carrier for magnetic recordings past said magnetic recording device, and a second motor for moving said medium carrying control instructions past said sensing device for reading said control instructions, wherein the operation of said motors is controlled by signals from said two unistable state devices and in which said bistable state device changes state in response to signals emanating from said two unistable state devices.

7. In combination, an information translating apparatus including a data transforming and recording system, comprising a keyboard having a plurality of information and control keys, the operation of any one of said information keys producing an information signal and a control pulse, a magnetic recording device and a carrier for magnetic recordings, means for delivering said information signal from said keyboard to said recording device, and automatic control means operative in response to said control pulse to cause said recording device to record said information signal on said carrier, wherein said automatic control means comprise, a two-state (set and restore) device and a unistable state (restore) device having a specific predetermined time for returning to its stable state after actuation to its other state ensuring a minimum time interval between control pulses emitted from said keyboard, and an error circuit for disabling said automatic control means, wherein said unistable device transfers any control pulses arriving during said minimum time interval to said error circuit.

8. In combination, an information translating apparatus, including a data transforming and recording system, comprising a keyboard having a plurality of information and control keys, the operation of any one of said information keys producing an information signal and a control pulse, a magnetic recording device and a carrier for magnetic recordings, means for delivering said information signal from said keyboard to said recording device, and automatic control means operative in response to said control pulse to cause said recording device to record said information signal on said carrier, wherein said automatic control means comprises a plurality of networks characterized by one stable state and having the property of returning to said stable state a predetermined time after actuation to a second state, wherein said networks are connected in a chain, wherein the first network in said chain is actuated to its second state by said control pulse and in which a subsequent network is actuated to its second state by the return of a preceding network to its stable state and an error circuit actuated by said chain to disable said automatic control means in response to the receipt of a second control pulse during the existence of said second state of any network in said chain.

9. The combination according to claim 8, wherein said means for delivering said information signal from said keyboard to said recording device include a first storage device, and comprising a medium carrying control instructions, a sensing device for reading said control instructions, a second storage device for storing said control instructions responsive to signals from said sensing device, and a selective control apparatus coupled to said automatic control means and to said first storage device adapted to selectively regenerate said control pulse and to selectively transmit an information signal into said first storage device independently of the operation of any of said information keys on said keyboard, said selective control apparatus being connected to said second storage device and responsive to signals from said second storage device, wherein respective members of said plurality of networks clear said first storage device, clear said second storage device, condition said sensing device for operation and transmit said control pulse into said selective control apparatus, respectively.

10. In combination, an information translating apparatus, including a data transforming and recording system, comprising a keyboard having a plurality of information and control keys, the operation of any one of said information keys producing an information signal and a control pulse, a magnetic recording device and a carrier for magnetic recordings, means for delivering said information signal from said keyboard to said recording device, and automatic control means operative in response to said control pulse to cause said recording device to record said information signal on said carrier, comprising mechanical automatic controlling devices including a first reel, a first reel motor connected to said first reel, a first drum connected to said first motor and a first brake band, spring loaded at one end, associated with said first drum, a second reel, a second reel motor connected to said second reel, a second drum connected to said second motor and a second brake band, spring loaded at one end, associ ated with said second drum, said reels respectively supplying and taking-up said carrier for magnetic recordings, wherein each of said brake bands automatically applies or releases a braking torque to its associated drum in response to an increase or decrease beyond preassigned limits of an associated loop of said carrier.

11. The combination according to claim 10 comprising an electromechanical switch which reverses the power connections to one of said motors to reverse the direction of motion of said carrier when the length of said carrier between said reels decreases to a preassigned dimension.

12. The combination according to claim 10 wherein said first motor only is energized for forward operation, said second motor only is energized for reverse operation, and both motors are energized for rewind.

13. In combination, an information translating apparatus, including a data transforming and recording system, comprising a keyboard having a plurality of information and control keys, the operation of any one of said information keys producing an information signal and a control pulse, a magnetic recording device and a carrier for magnetic recordings, means for delivering said information signal from said keyboard to said recording device, automatic control means operative in response to said control pulse to cause said recording device to record said information signal on said carrier, and selective control apparatus coupled to said automatic control means and to said recording device adapted to selectively regenerate said control pulse and to selectively impress an information signal on said recording device independently of the operation of any of said information keys, said selective control apparatus further including means responsive to the operation of said control keys for inhibiting the operation of said selective control apparatus, said means responsive to the operation of said control keys comprising means for producing reverse and skip operations including a two-state (set and restore) device and a unistable state (restore) device having a specific predetermined time for returning to its stable state after actuation to its other state wherein said unistable state device is actuated to its other state by the activation of said last mentioned means and then generates a recirculating control pulse for reverse and skip operations.

14. The combination according to claim 13 comprising driving means for moving said carrier past said recording device in either a forward or a reverse direction and electromagnetic means for erasing previously recorded information signals wherein, during reverse operations, said carrier is moved in reverse direction past said recording device beyond the last information signal to be erased, but not far enough to erase the next preceding previously recorded information signal.

15. In combination, an information translating apparatus, including a data transforming and recording system, comprising a keyboard having a plurality of information and control keys, the operation of any one of said information keys producing an information signal and a control pulse, a magnetic recording device and a carrier for magnetic recordings, means for delivering said information signal from said keyboard to said recording device, automatic control means operative in response to said control pulse to cause said recording device to record said information signal on said carrier, and selective control apparatus coupled to said automatic control means and to said recording device adapted to selectively regenerate said control pulse and to selectively impress an information signal on said recording device independently of the operation of any of said information keys, said selective control apparatus further including means responsive to the operation of said control keys for inhibiting the operation of said selective control apparatus, said combination further comprising driving means for moving said carrier past said recording device, and wherein said means responsive to the operation of said control keys include a blanking apparatus operable after a predetermined number of data recordings (blocks) for producing a blank section on said carrier by moving a predetermined length of said carrier past said recording device.

16. The combination according to claim 15 comprising block ending circuits operatively connected to and controlled by said driving means and including switching means for automatically terminating the operation of said data transforming and recording system at the end of said blocks, and block beginning circuits operatively connected to and controlled by said driving means and including switching means for automatically stopping the operation of said blanking apparatus when said predetermined length of said carrier has been moved past said recording device and for automatically reinitiating after blanking such automatic operations as have been in effect before blanking or permitting the production of information or control signals through the operation of any one of said keys on said keyboard in the absence of such automatic operations.

17. The combination according to claim 16 wherein said switching means of said block ending circuits and of said block beginning circuits automatically terminate any skip or reverse operations without subsequent reinitiation, respectively.

18. The combination according to claim 2 further comprising a forced check circuit including switching means for automatically interrupting the operation of said automatic control means and of said selective control apparatus in response to a forced check control instruction on said medium carrying control instructions, and said means responsive to the operation of said control keys being adapted to deenergize said circuit.

19. The combination according to claim 18 further comprising circuit connections to said storage device rendering said storage device insensitive to forced check control instructions during blanking, reverse and skip operations.

20. In combination, an information translating apparatus, including a data transforming and recording system, comprising a keyboard having a plurality of information and control keys, the operation of any one of said information keys producing an information signal and a control pulse, a magnetic recording device and a carrier for magnetic recordings, means for delivering said information signal from said keyboard to said recording device, automatic control means operative in response to said control pulse to cause said recording device to record said information signal on said carrier, and selective control apparatus coupled to said automatic control means and to said recording device adapted to selectively regenerate said control pulse and to selectively impress an information signal on said recording device independently of the operation of any of said information keys, said selective control apparatus further including means responsive to the operation of said control keys for inhibiting the operation of said selective control apparatus, wherein said selective control apparatus comprises a stop circuit including switching means for automatically stopping automatic operations whereby the selective regeneration of said control pulse and the impression of an information signal on said recording device by said selective control apparatus is automatically terminated.

21. In combination, an information translating apparatus, including a data transforming and recording system, comprising a keyboard having a plurality of information and control keys, the operation of any one of said information keys producing an information signal and a control pulse, a magnetic recording device and a carrier for magnetic recordings, means for delivering said information signal from said keyboard to said recording device, and automatic control means operative in response to said control pulse to cause said recording device to record said information signal on said carrier said combination further comprising driving means for moving said carrier past said recording device, electromechanical switching means connected to said driving means, and a mechanical device for actuating said electromechanical switching means connected to the end of said carrier, wherein said electromechanical switching means render said driving means inoperative in response to pressure exerted by said mechanical device.

22. The combination according to claim 10 wherein said means for delivering said information signal from said keyboard to said recording device include a storage device, and said combination further comprising circuits for energizing said reel motors and a take-up rewind switch for controlling the operation of said circuits, wherein said switch in its take-up position conditions said storage device and said recording device for operations.

23. The combination according to claim 8 further comprising a transmission line for said control pulse, a first gate and a second gate, said first gate being interposed between said transmission line and the input into the first network in said plurality of networks, said second gate being interposed between said transmission line and said error circuit, wherein said control pulse, after passing through said first gate, actuates said first network to its second state, and wherein the second state output of each network in said plurality of networks closes said first gate and opens said second gate.

24. The combination according to claim 23, wherein said means for delivering said information signal from said keyboard to said recording device include a storage device, and said combination further comprising a connection between the output terminal of said first gate and said storage device, and wherein said control pulse, after passing through said first gate, is transmitted through said connection to said storage device for storing and subsequent recording as a timing signal together with said information signal delivered from said keyboard.

25. The combination according to claim 23 further comprising a second plurality of networks characterized by one stable state and having the property of returning to said stable state a predetermined time after actuation to a second state, said networks being connected in a chain, and a subsequent network being actuated to its second state by the return of a preceding network to its stable state, a connection between the output terminal of said first gate and the input into the first network in said second plurality of networks, a driving device for displacing said carrier for magnetic recordings, and a bi-table state device as a means for checking the motion of said carrier, wherein said control pulse, after passing through said first gate, actuates said first network in said second plurality of networks to its second state, and wherein the operation of said driving device and the change of state of said bistable state device are controlled by signals from the networks in said second plurality of networks.

26. The combination according to claim 25 further comprising a medium carrying control, instructions and a driving device for displacing said medium, wherein the operation of said last mentioned driving device is controlled by signals from the networks in said second plurality of networks.

27. The combination according to claim 9 wherein the second state output of one network in said plurality of networks clears said first storage device.

28. The combination according to claim 9 wherein the second state output of one network in said plurality of networks clears said second storage device.

29. The combination according to claim 9 wherein the output of one network in said plurality of networks which is caused by its return to its stable state conditions said sensing device for operation.

30. The combination according to claim 9 wherein the output of one network in said plurality of networks which is caused by its return to its stable state is transmitted as said control pulse into said selective control apparatus.

31. In combination, an information translating apparatus, including a data transforming and recording system, comprising a keyboard having a plurality of information and control keys, the operation of any one of said information keys producing an information signal and a control pulse, an encoding table connected to said keyboard and selectively transforming said information signal into a combination of pulses in predetermined code positions for simultaneous transmission, said encoding table having a specific output terminal for every individual code position, a plurality of storage devices, each device in said plurality connected to one specific output terminal on said encoding table and storing a signal arriving from said terminal, a plurality of electromagnetic transducers, each transducer in said plurality connected to one specific storage device in said plurality of storage devices and stimulated by a signal from its associated storage device, and a carrier for multiple-channel magnetic recordings; control means connected to said keyboard and responsive to said control pulse, an additional storage device connected to said control means for storing a timing pulse transmitted from said control means, and an additional electromagnetic transducer connected to said additional storage device and stimulated by a signal from this storage device, wherein said control means cause the stimulated ones among said transducers including said additional transducer to record simultaneously a magnetic signal on said carrier.

32. The combination according to claim 31 wherein said automatic control means comprise a plurality of chain-connected delay flops.

References Cited in the file of this patent

UNITED STATES PATENTS

| | | |
|---|---|---|
| 1,632,298 | Kleinschmidt | June 14, 1927 |
| 2,034,364 | Whitney et al. | Mar. 17, 1936 |
| 2,183,147 | Moore et al. | Dec. 12, 1939 |
| 2,525,995 | Barbara et al. | Oct. 17, 1950 |
| 2,537,260 | Dale | Jan. 9, 1951 |
| 2,546,819 | Gooderham | Mar. 27, 1951 |
| 2,547,525 | Hague | Apr. 3, 1951 |
| 2,550,427 | Potts | Apr. 24, 1951 |
| 2,554,835 | Mallina | May 29, 1951 |
| 2,586,669 | Lake | Feb. 19, 1952 |
| 2,590,950 | Eckert et al. | Apr. 1, 1952 |
| 2,614,169 | Cohen et al. | Oct. 14, 1952 |
| 2,647,581 | Gardinor | Aug. 4, 1953 |
| 2,739,299 | Burkhart | Mar. 20, 1956 |

OTHER REFERENCES

"Mathematical Tables and Other Aids to Computation, 1950, "Automatic Computing Machinery," pages 31 to 39.